US012708900B2

(12) United States Patent
Fernandez et al.

(10) Patent No.: US 12,708,900 B2
(45) Date of Patent: Aug. 18, 2026

(54) WELLS FOR OPTIMIZED SAMPLE LOADING IN MICROFLUIDIC CHIPS

(71) Applicant: Stilla Technologies, Villejuif (FR)

(72) Inventors: Nicolas Fernandez, Paris (FR); Étienne Fradet, Arcueil (FR); Rémi Dangla, Paris (FR)

(73) Assignee: Stilla Technologies, Villejuif (FR)

( * ) Notice: Subject to any disclaimer, the term of this patent is extended or adjusted under 35 U.S.C. 154(b) by 793 days.

(21) Appl. No.: 17/297,263

(22) PCT Filed: Nov. 27, 2019

(86) PCT No.: PCT/EP2019/082748
§ 371 (c)(1),
(2) Date: May 26, 2021

(87) PCT Pub. No.: WO2020/109388
PCT Pub. Date: Jun. 4, 2020

(65) Prior Publication Data

US 2021/0394188 A1 Dec. 23, 2021

Related U.S. Application Data

(60) Provisional application No. 62/771,784, filed on Nov. 27, 2018, provisional application No. 62/771,916, filed on Nov. 27, 2018.

(30) Foreign Application Priority Data

Mar. 29, 2019 (EP) .................................... 19305420
Mar. 29, 2019 (EP) .................................... 19305421

(51) Int. Cl.
*B01L 3/00* (2006.01)

(52) U.S. Cl.
CPC ... *B01L 3/502784* (2013.01); *B01L 2200/025* (2013.01); *B01L 2200/027* (2013.01);
(Continued)

(58) Field of Classification Search
CPC ......... B01L 3/502784; B01L 2200/025; B01L 2200/027; B01L 2200/0605;
(Continued)

(56) References Cited

U.S. PATENT DOCUMENTS

2005/0266582 A1 12/2005 Modlin et al.
2010/0173394 A1 7/2010 Colston et al.
(Continued)

FOREIGN PATENT DOCUMENTS

CN 108004136 A 5/2018
CN 108535239 A 9/2018
(Continued)

OTHER PUBLICATIONS

Walsh, E.J., Feuerborn, A., Wheeler, J.H.R et al. Microfluidics with fluid walls. Nat Commun 8, 816 (2017). https://doi.org/10.1038/s41467-017-00846-4 (Year: 2017).*
(Continued)

*Primary Examiner* — Dean Kwak
(74) *Attorney, Agent, or Firm* — Panitch Schwarze Belisario & Nadel LLP; Erin M. Dunston

(57) ABSTRACT

The present invention relates to a loading well (320) comprising a lateral wall part (3211) in cross-section parallel to the base plan (x/y) and/or a bottom wall part comprising at least one sloped bottom section (32121). The present invention also relates to a microfluidic chip comprising the same: systems comprising the same configured to reduce the dead volume of a drop of sample to be loaded in the microfluidic chip and/or to trap a drop in a defined location; and methods using the same.

14 Claims, 45 Drawing Sheets

(52) U.S. Cl.
CPC . *B01L 2200/0605* (2013.01); *B01L 2300/027* (2013.01); *B01L 2300/0609* (2013.01); *B01L 2300/0851* (2013.01); *B01L 2300/0858* (2013.01); *B01L 2400/02* (2013.01)

(58) Field of Classification Search
CPC ....... B01L 2300/027; B01L 2300/0609; B01L 2300/0851; B01L 2300/0858; B01L 2400/02; B01L 2200/0673; B01L 2200/0642; B01L 2200/0684; B01L 2300/0829; B01L 2400/0688; B01L 2400/0605; B01L 2300/049; B01L 2300/0877; B01L 2300/0819; C12Q 1/686; C12Q 2563/159; C12Q 2565/629
See application file for complete search history.

(56) References Cited

U.S. PATENT DOCUMENTS

| | | | | |
|---|---|---|---|---|
| 2011/0259742 | A1 | 10/2011 | Li et al. | |
| 2012/0152369 | A1 | 6/2012 | Hiddessen et al. | |
| 2012/0190032 | A1* | 7/2012 | Ness | G01N 35/085 435/6.12 |
| 2012/0208241 | A1 | 8/2012 | Link | |
| 2012/0219947 | A1 | 8/2012 | Yurkovetsky et al. | |
| 2013/0078164 | A1* | 3/2013 | Baroud | B01F 35/712 422/502 |
| 2014/0272996 | A1 | 9/2014 | Bemis | |
| 2015/0352513 | A1 | 12/2015 | Davies et al. | |
| 2016/0167053 | A1 | 6/2016 | Gray | |
| 2016/0339438 | A1 | 11/2016 | Griffin | |
| 2018/0037934 | A1 | 2/2018 | Baroud | |
| 2018/0171377 | A1 | 6/2018 | Simon et al. | |
| 2018/0297025 | A1 | 10/2018 | Dangla et al. | |
| 2019/0046987 | A1 | 2/2019 | Ness et al. | |

FOREIGN PATENT DOCUMENTS

| | | | |
|---|---|---|---|
| WO | WO-2014078100 | A1 | 5/2014 |
| WO | WO-2015081102 | A1 | 6/2015 |

OTHER PUBLICATIONS

International Preliminary Report On Patentability, issued Feb. 25, 2021, for PCT Application No. PCT/EP2019/082748, filed Nov. 27, 2019, 25 pages.

International Search Report and Written Opinion, mailed Mar. 27, 2020, for PCT Application No. PCT/EP2019/082748, filed Nov. 27, 2019, 10 pages.

* cited by examiner

WELLS FOR OPTIMIZED SAMPLE LOADING IN MICROFLUIDIC CHIPS

CROSS REFERENCE TO RELATED APPLICATIONS

This application is a national stage application under 35 U.S.C. § 371 of International Application No. PCT/EP2019/082748, filed internationally on Nov. 27, 2019 which claims priority benefits to U.S. Provisional Application No. 62/771,784 filed Nov. 27, 2018, U.S. Provisional Application No. 62/771,916 filed Nov. 27, 2018, EP Application Serial No. 19305421.0 filed Mar. 29, 2019, and EP Application Serial No. 19305420.2 filed Mar. 29, 2019, the contents of each of which are incorporated herein by reference in their entirety.

FIELD OF INVENTION

The present invention relates to a microfluidic chip, for the generation of aqueous droplets for nucleic acid amplification and analysis.

BACKGROUND OF INVENTION

Microfluidic processes often employ the use of an emulsion, which contains droplets of a dispersed liquid phase surrounded by an immiscible continuous liquid phase. Droplets may be used as reaction vessels for chemical or biological reactions, as storage vessels, and/or as a method to isolate and compartmentalize molecules, such as chemical or biological elements. With proper chemistry such as surfactants on the surface of the droplets, droplets may be made "stable", meaning they are substantially prevented from mixing and merging when in contact with each other. This stability allows one to create a population or library of droplets composed of different chemical or biological components that may be stored in the approximately same volume of space without mixing or contamination between and/or among the components of one droplet and another.

Current microfluidic technologies make use of wells which tend to shrink upon cooling after manufacture. This shrinkage creates sink marks at the bottom of the wells, which could affect the microfluidic networks located underneath. For this reason, current wells used in microfluidic chips have a small diameter, and microfluidic networks are typically located far from these wells, thereby minimizing their surface on the microfluidic chip.

The microfluidic device disclosed herein has substantial advantages over other approaches to forming and collecting droplets. The advantages may include:

(1) the ability to optimize, i.e., to increase, loading of a sample into a microfluidic chip, thereby decreasing sample wasting, e.g., by reducing the dead volume of dispersed phase;

(2) the ability to flow a continuous phase in a microfluidic chip without disrupting the integrity of a population of droplets;

(3) the ability to homogenize a locally static continuous phase throughout droplet loading or generation in a microfluidic chip;

(4) the ability to generate a stable population of droplets without renewal of the continuous phase;

(5) the ability to optimize reproducibility and accuracy of the assays, in particular the number of generated droplets per assay;

(6) the ability to increase the droplet/surface ratio in a droplet chamber;

(7) the ability to prevent warpage of sensitive microfluidic channels in close proximity with loading wells in microfluidic channels, and/or (8) the ability to optimize space occupancy of microfluidic elements.

SUMMARY

The present invention relates to a microfluidic chip (300) comprising an upper slab (310) extending according to a base plane (x/y) and forming a base of at least one loading well (320) and at least one microfluidic channel, wherein the loading well (320) comprises a wall (321) comprising a bottom wall part (3212) globally extending according to a bottom plane (wbp) parallel to a base plane (x/y) and a lateral wall part (3211) extending along a well lateral direction (wld) disposed according to an angle 0°≤α≤180° relatively to the bottom plane (wbp), wherein the at least one microfluidic channel is extending parallel to and located below the bottom wall part (3212) of the loading well (320) and wherein the bottom wall part (3212) and the at least one microfluidic channel in projection within the base plane (x/y) are such that the microfluidic channel is included within the bottom wall part (3212) of the loading well (320).

In some embodiments, the at least one microfluidic channel has a precision level of plus or minus 5% over its smallest dimension ranging from about 10 μm to about 200 μm.

In some embodiments, the at least one microfluidic channel is a droplet generator (340).

In some embodiments, the microfluidic chip (300) further comprises a continuous phase (312).

In some embodiments, the microfluidic chip (300) is manufactured in molded plastic, injection-molded plastic or injection-compression-molded plastic.

The present invention relates to a system for preventing warpage of sensitive microfluidic channels in close proximity with loading wells (320), the system comprising at least one microfluidic chip (300) according to the present invention, wherein the system is configured to avoid warpage of sensitive microfluidic channels.

The present invention relates to a method of preventing warpage of sensitive microfluidic channels in close proximity with loading wells (320), the method comprising:

manufacturing a microfluidic chip (300) wherein:

the microfluidic chip (300) comprises an upper slab (310) extending according to a base plane (x/y) and forming a base of at least one loading well (320) and at least one microfluidic channel, the loading well (320) comprises a wall (321) comprising a bottom wall part (3212) globally extending according to a bottom plane (wbp) parallel to a base plane (x/y) and a lateral wall part (3211) extending along a well lateral direction (wld) disposed according to an angle 0°≤α≤180° relatively to the bottom plane (wbp), the at least one microfluidic channel is extending parallel to and located below the bottom wall part (3212) of the loading well (320) and the bottom wall part (3212) and the at least one microfluidic channel in projection within the base plane (x/y) are such that the microfluidic channel is included within the bottom wall part (3212) of the loading well (320), thereby avoiding warpage of sensitive microfluidic channels.

The present invention relates to a system for optimizing space occupancy of microfluidic elements in a microfluidic chip, the system comprising at least one microfluidic chip (300) according to the present invention, wherein the system is configured to avoid sink marks on microfluidic channels.

The present invention relates to a method of optimizing space occupancy of microfluidic elements in a microfluidic chip, the method comprising:

manufacturing a microfluidic chip (300) wherein:
- the microfluidic chip (300) comprises an upper slab (310) extending according to a base plane (x/y) and forming a base of at least one loading well (320) and at least one microfluidic channel,
- the loading well (320) comprises a wall (321) comprising a bottom wall part (3212) globally extending according to a bottom plane (wbp) parallel to a base plane (x/y) and a lateral wall part (3211) extending along a well lateral direction (wld) disposed according to an angle $0° \leq \alpha \leq 180°$ relatively to the bottom plane (wbp),
- the at least one microfluidic channel is extending parallel to and located below the bottom wall part (3212) of the loading well (320) and
- the bottom wall part (3212) and the at least one microfluidic channel in projection within the base plane (x/y) are such that the microfluidic channel is included within the bottom wall part (3212) of the loading well (320), thereby optimizing space occupancy of microfluidic elements in the microfluidic chip.

DETAILED DESCRIPTION

The present disclosure provides means, devices, systems, apparatuses and methods for performing droplet-based assays using microfluidic chips. For example, these may involve, among others, preparing a sample (such as a clinical or environmental sample) for analysis; separating components of the sample(s) by partitioning them into droplets or other partitions, each containing only one or a few components (such as, e.g., a single copy of a nucleic acid target or other analyte of interest); amplifying or otherwise reacting the components within the droplets; detecting the amplified or reacted components, or characteristics thereof; and/or analyzing the resulting data. In this way, complex samples may be converted into a plurality of simpler, more easily analyzed samples, with concomitant reductions in background and assay times.

The following detailed description will be better understood when read in conjunction with the drawings. For the purpose of illustrating, the devices, systems and apparatuses are shown in the preferred embodiments. It should be understood, however that the present disclosure is not limited to the precise arrangements, structures, features, embodiments, and aspect shown. The drawings are not drawn to scale and are not intended to limit the scope of the claims to the embodiments depicted.

Figure 1:
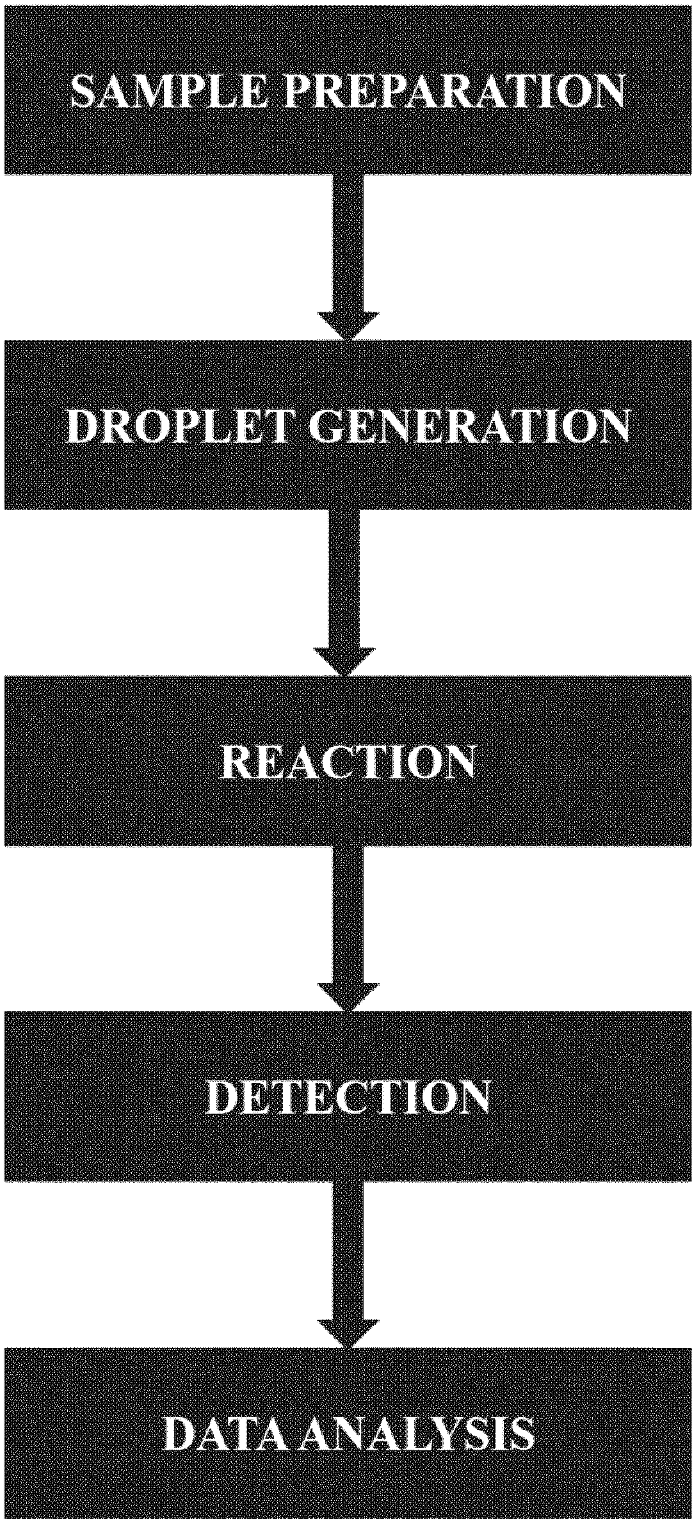
FIG. 1 is a flowchart listing exemplary steps that may be performed in a method of sample analysis by droplet-based assays, in accordance with aspects of the present disclosure.

FIG. 1 shows exemplary steps that may be performed in a method of sample analysis by droplet-based assays. In brief, the droplet-based assays may include one or more of the following steps: sample preparation, droplet generation, reaction (e.g., amplification), detection and data analysis. The assays may be utilized, e.g., to perform a digital polymerase chain reaction (PCR) analysis.

More specifically, sample preparation may involve collecting or providing a sample (such as a clinical or environmental sample), treating the sample to release associated nucleic acids and/or forming a reaction mixture involving the nucleic acids (e.g., for amplification of a target nucleic acid).

Droplet generation may involve encapsulating the nucleic acids in droplets, for example, with one or a few copies of each target nucleic acid per droplet, where the droplets are suspended in a continuous phase, such as oil, to form an emulsion.

Reaction may involve subjecting the droplets to a suitable reaction, such as thermal cycling to induce PCR amplification, so that target nucleic acids, if any, within the droplets are amplified to form additional copies.

Detection may involve detecting some signal(s) from the droplets, indicative of whether or not amplification was achieved.

Finally, data analysis may involve estimating a concentration of the target nucleic acid in the sample based on the percentage of droplets in which amplification occurred.

These and other aspects of the devices, systems, apparatuses and methods are described below. In particular, a variety of aspects for use in microfluidic devices such as microfluidic chips are provided herein, including, but not limited to, means and methods for reducing the dead volume of a dispersed phase to be injected in the microfluidic chip; for optimizing space occupancy of microfluidic elements by preventing warpage of precision microfluidic channels; for optimizing the 2-dimensional (2D) lattice pattern of a layer of dispersed phase droplets in a droplet chamber; for increasing the dispersed phase droplet:surface ratio in a droplet chamber; for controlling a fluid carrier flow.

Definitions

In the present invention, the following terms have the following meanings:

The term "about", as used herein before a figure or value, refers to a margin or error in said figure or value that the one skilled in the art can readily appreciate. In particular, the term "about" may refer to a margin of error of 1%, 2%, 5% or 10%.

The term "amplicon" refers to a product of an amplification reaction. An amplicon may be single-stranded or double-stranded, or a combination thereof. An amplicon corresponds to any suitable segment or the entire length of a nucleic acid target.

The term "amplification" refers to a reaction in which replication occurs repeatedly over time to form multiple copies of at least one segment of a template molecule. Amplification may generate an exponential or linear increase in the number of copies as amplification proceeds. Typical amplifications produce a greater than 1,000-fold increase in copy number and/or signal. Exemplary amplification reactions for the droplet-based assays disclosed herein may include the polymerase chain reaction (PCR) or ligase chain reaction, each of which is driven by thermal cycling. The droplet-based assays also or alternatively may use other amplification reactions, which may be performed isothermally, such as branched-probe DNA assays, cascade rolling circle amplification (cascade-RCA), helicase-dependent amplification, loop-mediated isothermal amplification (LAMP), nucleic acid based amplification (NASBA), nicking enzyme amplification reaction (NEAR), PAN-AC, Q-beta replicase amplification, rolling circle amplification (RCA), self-sustaining sequence replication, strand-displacement amplification, and the like. Amplification may utilize a linear or circular template. Amplification may be performed with any suitable reagents. Amplification may be performed, or assayed for its occurrence, in an amplification mixture, which is any composition capable of generating multiple copies of a nucleic acid target molecule, if present, in the composition. An "amplification mixture" may include any combination of at least one primer or primer pair, at least one probe, at least one replication enzyme (e.g., at least one polymerase, such as at least one DNA and/or RNA polymerase), and deoxynucleotide (and/or nucleotide)triphosphates (dNTPs and/or NTPs), among others.

The term "analyte" refers to a component(s) or potential component(s) of a sample that is analyzed in an assay. An "analyte" is a specific subject of interest in an assay where the "sample" is the general subject of interest. An analyte may, for example, be a nucleic acid, protein, peptide, enzyme, cell, bacteria, spore, virus, organelle, macromolecular assembly, drug candidate, lipid, carbohydrate, metabolite, or any combination thereof, among others. An analyte may be assayed for its presence, activity and/or other characteristic in a sample and/or in partitions thereof. The presence of an analyte may relate to an absolute or relative number, concentration, binary assessment (e.g., present or absent), or the like, of the analyte in a sample or in one or more partitions thereof. In some examples, a sample may be partitioned such that a copy of the analyte is not present in all of the partitions, such as being present in the partitions at an average concentration of about 0.0001 to 10000, 0.001 to 1000, 0.01 to 100, 0.1 to 10, or one copy per partition.

The term "assay" refers to a procedure(s) and/or reaction(s) used to characterize a sample, and any signal(s), value(s), data, and/or result(s) obtained from the procedure(s) and/or reaction(s). Exemplary droplet-based assays are biochemical assays using aqueous assay mixtures. More particularly, the droplet-based assays may be enzyme assays and/or binding assays, among others. The enzyme assays may, for example, determine whether individual droplets contain a copy of a substrate molecule (e.g., a nucleic acid target) for an enzyme and/or a copy of an enzyme molecule. Based on these assay results, a concentration and/or copy number of the substrate and/or the enzyme in a sample may be estimated.

The term "channel" refers to an elongate passage for fluid travel. A channel generally includes at least one inlet, where fluid enters the channel, and at least one outlet, where fluid exits the channel. The functions of the inlet and the outlet may be interchangeable (i.e., fluid may flow through a channel in only one direction or in opposing directions, generally at different times). A channel may include walls that define and enclose the passage between the inlet and the outlet. A channel may, for example, be formed by a tube (e.g., a capillary tube), in or on a planar structure (e.g., a chip), or a combination thereof. A channel may or may not branch. A channel may be linear or nonlinear. Exemplary nonlinear channels include a channel extending along a planar flow path (e.g., a serpentine channel), a nonplanar flow path (e.g., a helical channel to provide a helical flow path). Any of the channels disclosed herein may be a microfluidic channel, which is a channel having a characteristic transverse dimension (e.g., the channel's average diameter) of less than about one millimeter. Channels also may include one or more venting mechanisms or dead-ends to allow fluid to enter/exit without the need for an open outlet. Examples of venting mechanisms include, but are not limited to, hydrophobic vent openings or the use of porous materials to either make up a portion of the channel or to block an outlet if present. Examples of dead-ends include, but are not limited to, air tanks.

The term "continuous phase", also referred to as "carrier phase", "carrier", and/or "background phase", refers to a liquid or semi-liquid material into which an immiscible material, such as a dispersed phase, is dispersed, such as, e.g., to form an emulsion.

Examples of continuous phase for use in microfluidic systems are well known to the one skilled in the art and include, without limitation, oils, such as fluorinated oils, silicon oil, hydrocarbon oil and the like.

Examples of suitable fluorinated oils include, but are not limited to, perfluoro-hexane, perfluoro-cyclohexane, perfluoro-decaline, perfluoro-perhydrophenantrene, poly-hexafluoropropylene oxide (such as poly-hexafluoropropylene oxide with carboxylic end group), perfluoro polytrimethylene ether, poly perfluoroalkylene oxide, fluorinated amines (such as N-bis(perfluorobutyl)-N-trifluoromethylamine, tri (perfluoropentyl)amine, mixture of perfluorooctane amine and perfluoro-1-oxacyclooctane amine, or perfluorotripropylamine), fluorinated ethers (such as mixture of methyl nonafluorobutyl ether and methyl nonafluoroisobutyl ether), 3-ethoxy-1,1,1,2,3,4,4,5,5,6,6,6-dodecafluoro-2-(trifluoromethyl)-hexane, 2,3,3,4,4-pentafluorotetrahydro-5-methoxy-2,5-bis [1,2,2,2-tetrafluoro-1-trifluoromethyl)ethyl]-furan, and mixtures thereof.

In some embodiments, the continuous phase may further comprise a surfactant, in particular a fluorinated surfactant (i.e., comprising at least one fluorine atom). Examples of suitable surfactant include, but are not limited to, perfluoro-octanol, 1H,1H,2H,2H-perfluoro-1-octanol, perfluoro-decanol, 1H,1H,2H,2H-perfluoro-1-decanol, perfluoro-tetradecanoic acid, perfluoro-tetradecanoic oligo ethylene glycol, perfluoropolyether, perfluoropolyether-polyethylene glycol, perfluoropolyether-polyethylene glycol-perfluoropolyether, perfluoropolyether-dimorpholinophosphate, polyhexafluoropropylene oxide carboxylate, polyhexafluoropropylene oxide-polyethylene glycol-polyhexafluoropropylene oxide, polyhexafluoropropylene oxide-polyether-polyhexafluoropropylene oxide, polyhexafluoropropylene oxide-polypropylene glycol-polyethylene glycol-polypropylene glycol-polyhexafluoropropylene oxide, and mixtures thereof. Other exemplary surfactants include, without limitation, Span80 (Sigma), Span80/Tween-20 (Sigma), Span80/Triton X-100 (Sigma), Abil EM90 (Degussa), Abil we09 (Degussa), polyglycerol polyricinoleate PGPR90 (Danisco), Tween-85, 749 Fluid (Dow Corning), the ammonium carboxylate salt of Krytox 157 FSL (Dupont), the ammonium carboxylate salt of Krytox 157 FSM (Dupont), and the ammonium carboxylate salt of Krytox 157 FSH (Dupont).

Exemplary oil formulations to generate PCR-stable emulsions for flow-through assays are commercially available and well known by the skilled artisan. An example of such formulation includes the following mix: Dow Corning 5225C Formulation Aid (10% active ingredient in decamethylcyclopentasiloxane), 20% w/w, 2% w/w final concentration active ingredient; Dow Corning 749 Fluid (50% active ingredient in decamethylcyclopentasiloxane), 5% w/w, 2.5% w/w active ingredient; and poly(dimethylsiloxane) Dow Corning 200® fluid, viscosity 5.0 cSt (25° C.), 75% w/w. Exemplary oil formulations to generate PCR-stable emulsions for batch assays are commercially available and well known by the skilled artisan. An example of such formulation includes the following mix: Dow Corning 5225C Formulation Aid (10% active ingredient in decamethylcyclopentasiloxane), 20% w/w, 2% w/w final concentration active ingredient; Dow Corning 749 Fluid (50% active ingredient in decamethylcyclopentasiloxane), 60% w/w, 30% w/w active ingredient; poly(dimethylsiloxane) Dow Corning 200® fluid, viscosity 5.0 cSt (25° C.), 20% w/w.

In some embodiments, the surface tension of the continuous phase/air interface (at room temperature and atmospheric pressure) is larger than about 1 $mN \cdot m^{-1}$, about 2 $mN \cdot m^{-1}$, about 5 $mN \cdot m^{-1}$, about 10 $mN \cdot m^{-1}$, about 20 $mN \cdot m^{-1}$, about 30 $mN \cdot m^{-1}$, about 40 mN·m 1, about 50 $mN \cdot m^{-1}$, about 75 $mN \cdot m^{-1}$, about 100 $mN \cdot m^{-1}$, about 250 $mN \cdot m^{-1}$, about 500 $mN \cdot m^{-1}$. In some embodiments, the surface tension at the continuous phase/air interface (at room temperature and atmospheric pressure) ranges from about 1 $mN \cdot m^{-1}$ to about 100 $mN \cdot m^{-1}$, preferably from about 1 $mN \cdot m^{-1}$ to about 50 $mN \cdot m^{-1}$, more preferably from about 1 $mN \cdot m^{-1}$ to about 25 $mN \cdot m^{-1}$, even more preferably from about 5 $mN \cdot m^{-1}$ to about 20 $mN \cdot m^{-1}$.

The term "dead volume" denotes a volume of fluid, namely a volume of dispersed phase such as a sample, that is not efficiently drained into the microfluidic network upon loading, and remains thus in the loading well. Dead volumes of dispersed phase are often encountered when working with small amounts of fluids, which may not be integrally drained into the microfluidic network and are therefore lost or wasted.

The term "digital PCR" or "dPCR" refers to a PCR assay performed on portions of a sample to determine the presence/absence, concentration, and/or copy number of a nucleic acid target in the sample, based on how many of the sample portions support amplification of the target. Digital PCR may (or may not) be performed as endpoint PCR. Digital PCR may (or may not) be performed as real-time PCR for each of the partitions. PCR theoretically results in an exponential amplification of a nucleic acid sequence (analyte) from a sample. By measuring the number of amplification cycles required to achieve a threshold level of amplification (as in real-time PCR), one can theoretically calculate the starting concentration of nucleic acid. In practice, however, there are many factors that make the PCR process non-exponential, such as varying amplification efficiencies, low copy numbers of starting nucleic acid, and competition with background contaminant nucleic acid. Digital PCR is generally insensitive to these factors, since it does not rely on the assumption that the PCR process is exponential. In digital PCR, individual nucleic acid molecules are separated from the initial sample into partitions, then amplified to detectable levels. Each partition then provides digital information on the presence or absence of each individual nucleic acid molecule within each partition. When enough partitions are measured using this technique, the digital information can be consolidated to make a statistically relevant measure of starting concentration for the nucleic acid target (analyte) in the sample. The concept of digital PCR may be extended to other types of analytes, besides nucleic acids. In particular, a signal amplification reaction may be utilized to permit detection of a single copy of a molecule of the analyte in individual droplets, to permit data analysis of droplet signals for other analytes (e.g., using an algorithm based on Poisson statistics). Exemplary signal amplification reactions that permit detection of single copies of other types of analytes in droplets include enzyme reactions.

The term "droplet" refers to a small volume of liquid (such as a dispersed phase), typically with a spherical shape, encapsulated by an immiscible fluid (such as a continuous phase). The volume of a droplet and/or the average volume of a population of droplets, may, e.g., be less than about 1 μL (and is therefore termed "microdroplet"), less than about 1 nL, or less than about 1 pL. A droplet (or a population of droplets) may have a diameter (or an average diameter) of less than about 1000 μm, about 100 μm, about 10 μm; or ranging from about 10 μm to about 1000 μm. A droplet may be spherical or non-spherical. A droplet may be a simple droplet or a compound droplet (i.e., a droplet encapsulating at least one droplet). The droplets of an emulsion may have any uniform or non-uniform distribution in the continuous phase. If non-uniform, the concentration of the droplets may vary to provide one or more regions of higher droplet density and one or more regions of lower droplet density in the continuous phase. For example, droplets may sink or float in the continuous phase, may be clustered in one or more packets along a channel or in a storage chamber, may be focused toward the center or perimeter of a flow stream, or the like. In some embodiments of the present invention, a droplet has a diameter (or an average diameter) ranging from about 10 μm to about 150 μm, preferably from about 25 μm to about 125 μm, more preferably from about 50 μm to about 100 μm, even more preferably from about 65 μm to about 80 μm. In some embodiments of the present invention, a droplet has a diameter (or an average diameter) of about 10 μm±5 μm, 20 μm±5 μm, 30 μm±5 μm, 40 μm±5 μm, 50 μm±5 μm, 60 μm±5 μm, 70 μm±5 μm, 80 μm±5 μm, 90 μm±5 μm, 100 μm±5 μm, 110 μm±5 μm, 120 μm±5 μm, 130 μm±5 μm, 140 μm±5 μm, 150 μm±5 μm. In some embodiments of the present invention, a droplet has a diameter (or an average diameter) of about 72 μm±5 μm. The diameter of a droplet can also be mathematically defined as a function of its volume, with the following formula:

$$\text{diameter} = \sqrt[3]{\text{volume} \times \frac{6}{\pi}}.$$

In some embodiments of the present invention, a droplet has a volume (or an average volume) ranging from about 1 pL to about 1 nL, preferably from about 50 pL to about 750 pL, more preferably from about 100 pL to about 500 pL, even more preferably from about 150 pL to about 250 pL. In some embodiments of the present invention, a droplet has a volume (or an average volume) of 1 pL, 10 pL, 25 pL, 50 pL, 75 pL, 100 pL, 125 pL, 150 pL, 175 pL, 200 pL, 225 pL, 250 pL, 275 pL, 300 pL, 400 pL, 500 pL, 600 pL, 700 pL, 800 pL, 900 pL, 1 nL. In some embodiments of the present invention, a droplet has a volume (or an average volume) of 220 pL±20 pL. It will be readily understood by the one skilled in the art that such diameters and/or volumes are subject to a fair margin of error.

The term "emulsion" refers to a composition comprising at least one liquid droplet, in particular a population of liquid droplets, disposed in an immiscible carrier fluid, which also is liquid. The carrier fluid, also termed background fluid, forms the "continuous phase". The droplets are formed by at least one droplet fluid (typically, a sample), also termed a foreground fluid, which is a liquid forming the "dispersed phase". The dispersed phase is immiscible with the continuous phase, which means that the dispersed phase and the continuous phase do not mix to attain homogeneity. In some embodiments, the density of the dispersed phase is at least about 1% smaller, preferably at least about 5% smaller, about 10%, about 20%, about 30%, about 40%, about 50%, about 75%, about 100%, about 150%, about 200% smaller than the density of the continuous phase. The droplets are isolated from one another by the continuous phase and encapsulated (i.e., enclosed or surrounded) by the continuous phase. Any of the emulsions disclosed herein may be monodisperse, that is, composed of a population of droplets of at least generally uniform size, or may be polydisperse, that is, composed of a population of droplets of various sizes. If monodisperse, the droplets of the emulsion may, e.g., vary in volume by a standard deviation that is less than about plus or minus 100%, 50%, 20%, 10%, 5%, 2%, or 1% of the average droplet volume. Droplets generated from an orifice or from a droplet generator may be monodisperse or polydisperse. An emulsion may have any suitable composition. The emulsion may be characterized by the predominant liquid compound or type of liquid compound in each phase. The predominant liquid compounds in the emulsion may be water and oil. For example, any of the emulsions disclosed herein may be a water-in-oil (W/O) emulsion (i.e., aqueous droplets in a continuous oil phase). Any other suitable components may be present in any of the emulsion phases (dispersed and/or continuous), such as at least one surfactant, reagent, sample (i.e., partitions thereof), other additive, label, particles, or any combination thereof. Standard emulsions become unstable when heated (e.g., to temperatures above 60° C.) when they are in a packed state (e.g., each droplet is near a neighboring droplet), because heat generally lowers interfacial tensions, which can lead to droplet coalescence. Thus, standard packed emulsions do not maintain their integrity during high-temperature reactions, such as PCR, unless emulsion droplets are kept out of contact with one another or additives (e.g., other oil bases, surfactants, etc.) are used to modify the stability conditions (e.g., interfacial tension, viscosity, steric hindrance, etc.). For example, the droplets may be arranged in single file and spaced from one another along a channel to permit thermal cycling in order to perform PCR. However, following this approach using a standard emulsion does not permit a high density of droplets, thereby substantially limiting throughput in droplet-based assays. Any emulsion disclosed herein may be a heat-stable emulsion. A "heat-stable emulsion" is any emulsion that resists coalescence when heated to at least 50° C. A heat-stable emulsion may be a PCR-stable emulsion, which is an emulsion that resists coalescence throughout the thermal cycling of PCR (e.g., to permit performance of digital PCR). Accordingly, a PCR-stable emulsion may be resistant to coalescence when heated to at least 80° C. or 90° C., among others. Due to heat stability, a PCR-stable emulsion, in contrast to a standard emulsion, enables PCR assays to be performed in droplets that do not coalesce during thermal cycling. Accordingly, digital PCR assays with PCR-stable emulsions may be substantially more quantitative than with standard emulsions. An emulsion may be formulated as PCR stable by, e.g., proper selection of carrier fluid and surfactants, among others.

The term "endpoint PCR" refers to a PCR-based analysis in which amplicon formation is measured after the completion of thermal cycling.

The term "interface", when referring to the interface between a continuous phase and a dispersed phase, between a continuous phase and an air phase (simply referred to as air) or between a dispersed phase and an air phase, describes a surface forming the common boundary between two adjacent immiscible or partially immiscible phases.

The term "label" refers to an identifying and/or distinguishing marker or identifier connected to or incorporated into any entity, such as a compound, biological particle (e.g., a cell, bacteria, spore, virus, or organelle), or droplet. A label may, for example, be a dye that renders an entity optically detectable and/or optically distinguishable. Exemplary dyes used for labeling are fluorescent dyes (fluorophores) and fluorescence quenchers.

The term "microfluidic channel" refers to a confined channel provided within or on a substrate, where at least one cross-sectional dimension of the channel ranges from about 0.1 μm to about 1 mm. In particular, the term "precision microfluidic channel" as used herein refers to a microfluidic channel having a precision level of +5% over its smallest dimension ranging from about 0.1 μm to about 200 μm.

The term "microfluidic chip" refers to a substrate containing microfluidic channels, wherein volumes down to picoliters (pL) are handled within the microfluidic channels of the microfluidic chip. A wide variety of methods and materials exists and will be known and appreciated by the one skilled in the art for construction of microfluidic channels and networks thereof. For example, the microfluidic channel may be constructed using simple tubing, but may further involve scaling the surface of one slab comprising etched open channels to a second flat slab. Materials into which microfluidic channels may be formed include silicon, glass, polydimethylsiloxane (PDMS), and plastics (such as polymethylmethacrylate, cyclic olefin polymer [COP], cyclic olefin copolymer [COC], polypropylene, among others). The same materials can also be used for the second sealing slab. Compatible combinations of materials for the two slabs depend on the method employed to seal them together. The microfluidic channel may be encased as necessary in an optically clear material to allow for optical excitation (resulting in, e.g., fluorescence) or illumination (resulting in, e.g., selective absorption) of a sample as necessary, and to allow for optical detection of spectroscopic properties of light from a sample in the microfluidic chip. Preferred examples of such optically clear materials that exhibit high optical clarity and low autofluorescence include, but are not limited to, borosilicate glass (e.g., SCHOTT BOROFLOAT® glass [Schott North America, Elmsford NY]) and cyclo-olefin polymers (COP) (e.g., ZEONOR® [Zeon Chemicals LP, Louisville KY]).

The term "microfluidics network" refers to an assembly for manipulating fluid, generally by transferring fluid between compartments of the assembly and/or by driving flow of fluid along and/or through one or more flow paths defined by the assembly. A microfluidics network may include any suitable structure, such as one or more channels, chambers, wells, reservoirs, valves, pumps, thermal control devices (e.g., heaters/coolers), sensors (e.g., for measuring temperature, pressure, flow, etc.), or any combination thereof, among others. Microfluidic networks may be constructed using simple tubing, but may further involve scaling the surface of one slab comprising etched open structures as defined above, to a second flat slab.

The term "nucleic acid" refers to both DNA or RNA, whether it be a product of amplification, synthetically created, products of reverse transcription of RNA or naturally occurring. Typically, nucleic acids are single- or double-stranded molecules and are composed of naturally occurring nucleotides. Double-stranded nucleic acid molecules can have 3' or 5' overhangs and as such are not required or assumed to be completely double-stranded over their entire length. Furthermore, the term nucleic acid can be composed of non-naturally occurring nucleotides and/or modifications to naturally occurring nucleotides. Examples are listed herein, but are not limited to, phosphorylation of 5' or 3' nucleotides to allow for ligation or prevention of exonuclease degradation/polymerase extension, respectively; amino, thiol, alkyne, or biotinyl modifications for covalent and near covalent attachments; fluorphores and quenchers; phosphorothioate, methylphosphonates, phosphoroamidates and phosphorotiester linkages between nucleotides to prevent degradation; methylation; and modified bases such as deoxyinosine, 5-bromo dU, deoxyuridinc, 2-aminopurine, dideoxycytidine, 5-methyl dC, locked nucleic acids (LNA's), iso-dC and -dG bases, 2'-O-methyl RNA bases and fluorine modified bases.

The term "nucleotide" in addition to referring to the naturally occurring ribonucleotide or deoxyribonucleotide monomers, shall herein be understood to refer to related structural variants thereof, including derivatives and analogs, that are functionally equivalent with respect to the particular context in which the nucleotide is being used (e.g., hybridization to a complementary base), unless the context clearly indicates otherwise.

The term "oil" refers to any liquid compound or mixture of liquid compounds that is immiscible with water and that has a low polarity. In some embodiments, oil also may have a high content of carbon, hydrogen, fluorine, silicon, oxygen, or any combination thereof, among others. Suitable examples of oil include, but are not limited to, silicone oil, mineral oil, fluorocarbon oil, vegetable oil, or a combination thereof, among others.

The term "operatively coupled" is used herein to describe the connection between two or more individual instruments being part of the system according to the present description. Two or more individual instruments are "operatively coupled" if they are arranged such that two or more methods are performed by the two or more individual instruments and said two or more methods appear as one single workflow. In addition, a full integration of two or more individual instruments in a third integrated instrument is possible as well. Another possibility is to integrate different key features of the individual instruments mentioned above in a dedicated integrated device (e.g., a single microfluidic chip containing areas for microfluidic droplet generation, PCR amplification and droplet read-out).

The term "partition" refers to a separated portion of a bulk volume. The partition may be a sample partition generated from a sample, such as a prepared sample, that forms the bulk volume. Partitions generated from a bulk volume may be substantially uniform in size or may have distinct sizes (e.g., sets of partitions of two or more discrete, uniform sizes). Exemplary partitions are "droplets". Partitions may also vary in size with a predetermined size distribution or with a random size distribution.

The term "PCR" or "polymerase chain reaction" refers to a nucleic acid amplification assay that relies on alternating cycles of heating and cooling (i.e., thermal cycling) to achieve successive rounds of replication. PCR may be performed by thermal cycling between two or more temperature set points, such as a higher melting (denaturation) temperature and a lower annealing/extension temperature, or among three or more temperature set points, such as a higher melting temperature, a lower annealing temperature, and an intermediate extension temperature, among others. PCR may be performed with a thermostable polymerase, such as Taq DNA polymerase (e.g., wild-type enzyme, a Stoffel fragment, FastStart polymerase, etc.), Pfu DNA polymerase, S-Tbr polymerase, Tth polymerase, Vent polymerase, or a combination thereof, among others. PCR generally produces an exponential increase in the amount of a product amplicon over successive cycles. Any suitable PCR methodology or combination of methodologies may be utilized in the droplet-based assays disclosed herein, such as allele-specific PCR, assembly PCR, asymmetric PCR, digital PCR, endpoint PCR, hot-start PCR, in situ PCR, intersequence-specific PCR, inverse PCR, linear after exponential PCR, ligation-mediated PCR, methylation-specific PCR, mini-primer PCR, multiplex ligation-dependent probe amplification, multiplex PCR, nested PCR, overlap-extension PCR, polymerase cycling assembly, qualitative PCR, quantitative PCR, real-time PCR, RT-PCR, single-cell PCR, solid-phase PCR, thermal asymmetric interlaced PCR, touchdown PCR, or universal fast walking PCR, among others.

The term "primer" refers to a polynucleotide capable of acting as a point of initiation of template-directed nucleic acid synthesis when placed under conditions in which polynucleotide extension is initiated (e.g., under conditions comprising the presence of requisite nucleoside triphosphates (as dictated by the template that is copied) and a polymerase in an appropriate buffer and at a suitable temperature or cycle(s) of temperatures (e.g., as in a polymerase chain reaction)). To further illustrate, primers can also be used in a variety of other oligonucleotide-mediated synthesis processes, including as initiators of de novo RNA synthesis and in vitro transcription-related processes (e.g., nucleic acid sequence-based amplification (NASBA), transcription mediated amplification (TMA), etc.). A primer is typically a single-stranded oligonucleotide (e.g., oligodeoxyribonucleotide). The appropriate length of a primer depends on the intended use of the primer but typically ranges from 6 to 40 nucleotides, more typically from 15 to 35 nucleotides. Short primer molecules generally require cooler temperatures to form sufficiently stable hybrid complexes with the template. A primer need not reflect the exact sequence of the template but must be sufficiently complementary to hybridize with a template for primer elongation to occur. In certain embodiments, the term "primer pair" means a set of primers including a 5' sense primer (sometimes called "forward") that hybridizes with the complement of 5' end of the nucleic acid sequence to be amplified and a 3' antisense primer (sometimes called "reverse") that hybridizes with 3' end of the sequence to be amplified (e.g., if the target sequence is expressed as RNA or is an RNA). A primer can be labeled, if desired, by incorporating a label detectable by spectroscopic, photochemical, biochemical, immunochemical, or chemical means. For example, useful labels include 32P, fluorescent dyes, electron-dense reagents, enzymes (as commonly used in ELISA assays), biotin or haptens and proteins for which antisera or monoclonal antibodies are available.

The term "probe" refers to a nucleic acid connected to at least one label, such as at least one dye. A probe may be a sequence-specific binding partner for a nucleic acid target and/or amplicon. The probe may be designed to enable detection of target amplification based on fluorescence resonance energy transfer (FRET). An exemplary probe for the nucleic acid assays disclosed herein includes one or more nucleic acids connected to a pair of dyes that collectively exhibit fluorescence resonance energy transfer (FRET) when proximate one another. The pair of dyes may provide first and second emitters, or an emitter and a quencher, among others. Fluorescence emission from the pair of dyes changes when the dyes are separated from one another, such as by cleavage of the probe during primer extension (e.g., a 5' nuclease assay, such as with a TAQMAN probe), or when the probe hybridizes to an amplicon (e.g., a molecular beacon probe). The nucleic acid portion of the probe may have any suitable structure or origin, for example, the portion may be a locked nucleic acid, a member of a universal probe library, or the like. In other cases, a probe and one of the primers of a primer pair may be combined in the same molecule (e.g., AMPLIFLUOR primers or SCORPION primers). As an example, the primer-probe molecule may include a primer sequence at its 3' end and a molecular beacon-style probe at its 5' end. With this arrangement, related primer-probe molecules labeled with different dyes can be used in a multiplexed assay with the same reverse primer to quantify target sequences differing by a single nucleotide (single nucleotide polymorphisms (SNPs)). Another exemplary probe for droplet-based nucleic acid assays is a Plexor primer.

The term "qualitative PCR" refers to a PCR-based analysis that determines whether or not a target is present in a sample, generally without any substantial quantification of target presence. In exemplary embodiments, digital PCR that is qualitative may be performed by determining whether a packet of droplets contains at least a predefined percentage of positive droplets (a positive sample) or not (a negative sample).

The terms "quantitative PCR", "qPCR", "real-time quantitative polymerase chain reaction" or "kinetic polymerase chain reaction" refer to a PCR-based analysis that determines a concentration and/or copy number of a target in a sample. This technique simultaneously amplifies and quantifies target nucleic acids using PCR wherein the quantification is by virtue of an intercalating fluorescent dye or sequence-specific probes which contain fluorescent reporter molecules that are only detectable once hybridized to a target nucleic acid.

The term "reaction" refers to a chemical reaction, a binding interaction, a phenotypic change, or a combination thereof, which generally provides a detectable signal (e.g., a fluorescence signal) indicating occurrence and/or an extent of occurrence of the reaction. An exemplary reaction is an enzyme reaction that involves an enzyme-catalyzed conversion of a substrate to a product. Any suitable enzyme reactions may be performed in the droplet-based assays disclosed herein. For example, the reactions may be catalyzed by a kinase, nuclease, nucleotide cyclase, nucleotide ligase, nucleotide phosphodiesterase, polymerase (DNA or RNA), prenyl transferase, pyrophospatase, reporter enzyme (e.g., alkaline phosphatase, beta-galactosidase, chloramphenicol acetyl transferse, glucuronidase, horse radish peroxidase, luciferase, etc.), reverse transcriptase, topoisomerase, etc.

The term "reagent" refers to a compound, set of compounds, and/or composition that is combined with a sample in order to perform a particular assay(s) on the sample. A reagent may be a target-specific reagent, which is any reagent composition that confers specificity for detection of a particular target(s) or analyte(s) in an assay. A reagent optionally may include a chemical reactant and/or a binding partner for the assay. A reagent may, for example, include at least one nucleic acid, protein (e.g., an enzyme), cell, virus, organelle, macromolecular assembly, potential drug, lipid, carbohydrate, inorganic substance, or any combination thereof, and may be an aqueous composition, among others. In exemplary embodiments, the reagent may be an amplification reagent, which may include at least one primer or at least one pair of primers for amplification of a nucleic acid target, at least one probe and/or dye to enable detection of amplification, a polymerase, nucleotides (dNTPs and/or NTPs), divalent magnesium ions, potassium chloride, buffer, or any combination thereof, among others.

The term "real time PCR" refers to a PCR-based analysis in which amplicon formation is measured during the reaction, such as after completion of one or more thermal cycles prior to the final thermal cycle of the reaction. Real-time PCR generally provides quantification of a target based on the kinetics of target amplification.

The term "replication" refers to a process forming a copy (i.e., a direct copy and/or a complementary copy) of a nucleic acid or a segment thereof. Replication generally involves an enzyme, such as a polymerase and/or a ligase, among others. The nucleic acid and/or segment replicated is a template (and/or a target) for replication.

The term "reporter" refers to a compound or set of compounds that reports a condition, such as the extent of a reaction. Exemplary reporters comprise at least one dye, such as a fluorescent dye or an energy transfer pair, and/or at least one oligonucleotide. Exemplary reporters for nucleic acid amplification assays may include a probe and/or an intercalating dye (e.g., SYBR Green, ethidium bromide, etc.).

The terms "reverse transcription PCR" or "RT-PCR" refer to a PCR assay utilizing a complementary DNA template produced by reverse transcription of RNA. RT-PCR permits analysis of an RNA sample by (1) forming complementary DNA copies of RNA, such as with a reverse transcriptase enzyme, and (2) PCR amplification using the complementary DNA as a template. In some embodiments, the same enzyme, such as Tth polymerase, may be used for reverse transcription and PCR.

The term "sample" refers to a compound, composition, and/or mixture of interest, from any suitable source(s). A sample is the general subject of interest for an assay that analyzes an aspect of the sample, such as an aspect related to at least one analyte that may be present in the sample. Samples may be analyzed in their natural state, as collected, and/or in an altered state, for example, following storage, preservation, extraction, lysis, dilution, concentration, purification, filtration, mixing with one or more reagents, pre-amplification (e.g., to achieve target enrichment by performing limited cycles (e.g., <15) of PCR on sample prior to PCR), removal of amplicon (e.g., treatment with uracil-d-glycosylase (UDG) prior to PCR to eliminate any carry-over contamination by a previously generated amplicon (i.e., the amplicon is digestable with UDG because it is generated with dUTP instead of dTTP)), partitioning, or any combination thereof, among others. Clinical samples may include nasopharyngeal wash, blood, plasma, cell-free plasma, buffy coat, saliva, urine, stool, sputum, mucous, wound swab, tissue biopsy, milk, a fluid aspirate, a swab (e.g., a nasopharyngeal swab), and/or tissue, among others. Environmental samples may include water, soil, aerosol, and/or air, among others. Research samples may include cultured cells, primary cells, bacteria, spores, viruses, small organisms, any of the clinical samples listed above, or the like. Additional samples may include foodstuffs, weapons components, biodefense samples to be assayed for bio-threat agents, suspected contaminants, and so on. Samples may be collected for diagnostic purposes (e.g., the quantitative measurement of a clinical analyte such as an infectious agent) or for monitoring purposes (e.g., to determine that an environmental analyte of interest such as a bio-threat agent has exceeded a predetermined threshold).

In some embodiments, the sample may comprise one or several reagents, such as, e.g., an amplification mixture.

In some embodiments, a drop of sample has a diameter ranging from about 1 mm to about 5 mm, preferably from about 1 mm to about 4.5 mm, more preferably from about 1 mm to about 4 mm, even more preferably from about 1 mm to about 3.5 mm, even more preferably from about 2 mm to about 3 mm. In some embodiments, a drop of sample has a diameter of about 1 mm, 1.1 mm, 1.2 mm, 1.3 mm, 1.4 mm, 1.5 mm, 1.6 mm, 1.7 mm, 1.8 mm, 1.9 mm, 2 mm, 2.1 mm, 2.2 mm, 2.3 mm, 2.4 mm, 2.5 mm, 2.6 mm, 2.7 mm, 2.8 mm, 2.9 mm, 3 mm, 3.1 mm, 3.2 mm, 3.3 mm, 3.4 mm, 3.5 mm, 3.6 mm, 3.7 mm, 3.8 mm, 3.9 mm, 4 mm, 4.1 mm, 4.2 mm, 4.3 mm, 4.4 mm, 4.5 mm, 4.6 mm, 4.7 mm, 4.8 mm, 4.9 mm, 5 mm or more. In some embodiments, a drop of sample has a diameter of about 2.5 mm±0.2 mm.

In some embodiments, a drop of sample has a volume ranging from about 1 μL to about 75 μL, preferably from about 1 μL to about 50 μL, more preferably from about 1 μL to about 40 μL, even more preferably from about 1 μL to about 20 μL, even more preferably from about 5 μL to about 10 μL. In some embodiments, a drop of sample has a volume of about 1 μL, 2 μL, 3 μL, 4 μL, 5 μL, 6 μL, 7 μL, 8 μL, 9 μL, 10 μL, 11 μL, 12 μL, 13 μL, 14 μL, 15 μL, 20 μL, 25 μL, 30 μL, 35 μL, 40 μL, 45 μL, 50 μL, 55 μL, 60 μL, 65 μL, 70 μL, 75 μL or more. In some embodiments, a drop of sample has a volume of about 8 μL±2 μL.

The term "surfactant" refers to a surface-active agent capable of modifying the surface tension between two phases. A surfactant, which also or alternatively may be described as a detergent and/or a wetting agent, incorporates both a hydrophilic portion and a hydrophobic portion, which collectively confer a dual hydrophilic-lipophilic character on the surfactant. The emulsions disclosed herein and/or any phase thereof, may include at least one hydrophilic surfactant, at least one lipophilic surfactant, or a combination thereof. Alternatively, or in addition, the emulsions disclosed herein and/or any phase thereof, may include at least one nonionic (and/or ionic) detergent. Furthermore, an emulsion disclosed herein and/or any phase thereof may include a surfactant comprising polyethyleneglycol, polypropyleneglycol or Tween 20, among others.

Microfluidic Chip Architecture

Figure 2A:
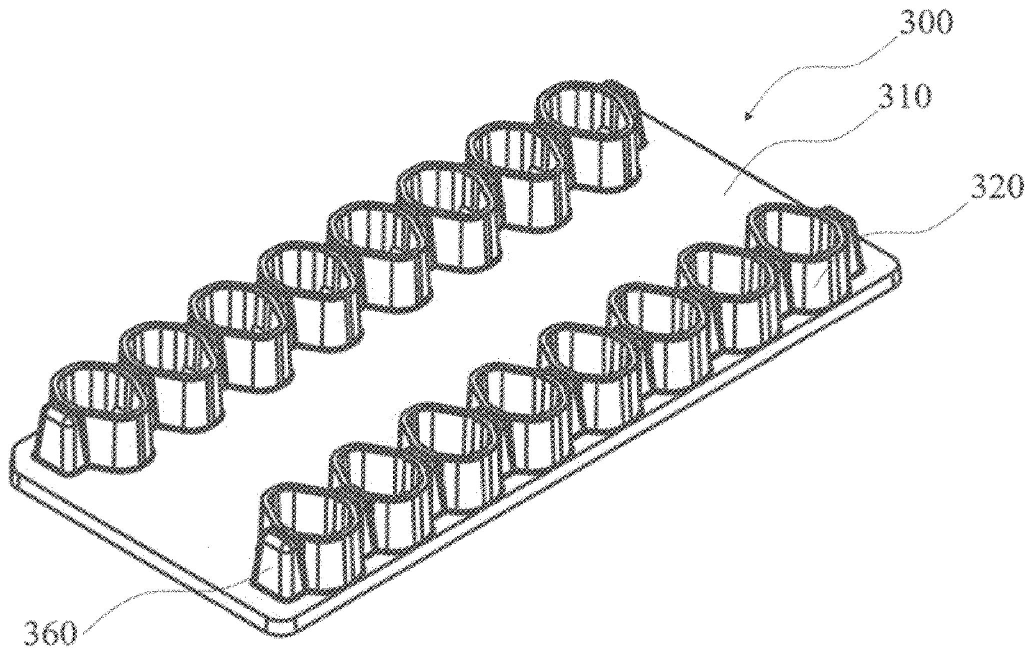
FIG. 2A is a perspective top view of an exemplary embodiment of a microfluidic chip 300 of the present invention.
Figure 2B:
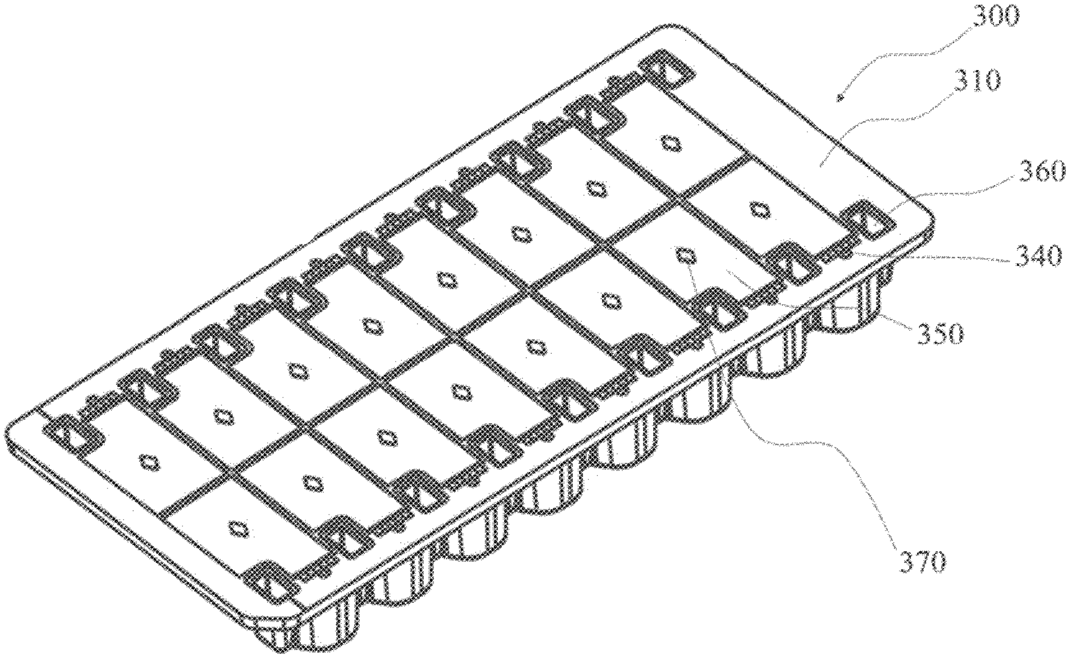
FIG. 2B is a perspective bottom view of an exemplary embodiment of a microfluidic chip 300 of the present invention.

This section describes the architecture of illustrative means, devices and systems suitable for droplet-based assays in microfluidic chips. The means, devices and systems described herein can be used in isolation, combined to one another, or adapted to any number of different microfluidic chips configurations. One such microfluidic chip is depicted in FIGS. 2A and 2B. It should be recognized that the microfluidic chip 300 of FIGS. 4-7 is not intended to limit the invention. For example, aspects of the microfluidic chip 300 of FIGS. 2A and 2B can be used in separation from other aspects of the microfluidic chip while using the inventive configurations described herein.

FIGS. 2A and 2B show, in a perspective view, an exemplary embodiment of a microfluidic chip 300 according to the present invention.

In the embodiment shown in FIGS. 2A and 2B, the microfluidic chip 300 comprises an array of 16 microfluidic units, each comprising, either molded and/or etched in an upper slab 310, a loading well 320 with an inlet port 330, leading to a droplet generator 340 operatively coupled to a droplet chamber 350 and an air tank 360. The droplet chamber 350 further comprises a chamber pillar 370.

Accordingly, it should be understood that where features mentioned in the appended claims are followed by reference signs, such signs are included solely for the purpose of enhancing the intelligibility of the claims and are in no way limiting on the scope of the claims.

Figure 3A:
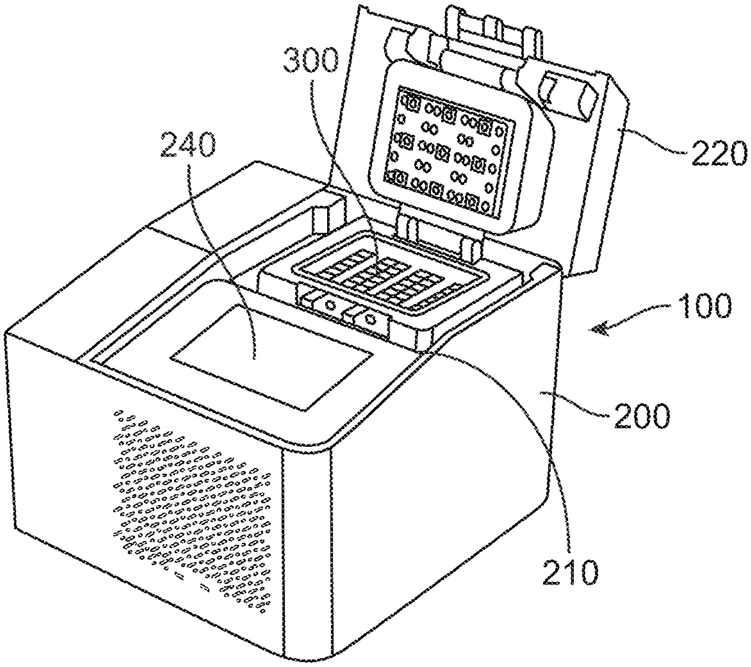
FIG. 3A is a perspective view of an exemplary embodiment of a system 100 for performing droplet-based assays, with the system 100 comprising an instrument 200 and 3 microfluidic chips 300.
Figure 3B:
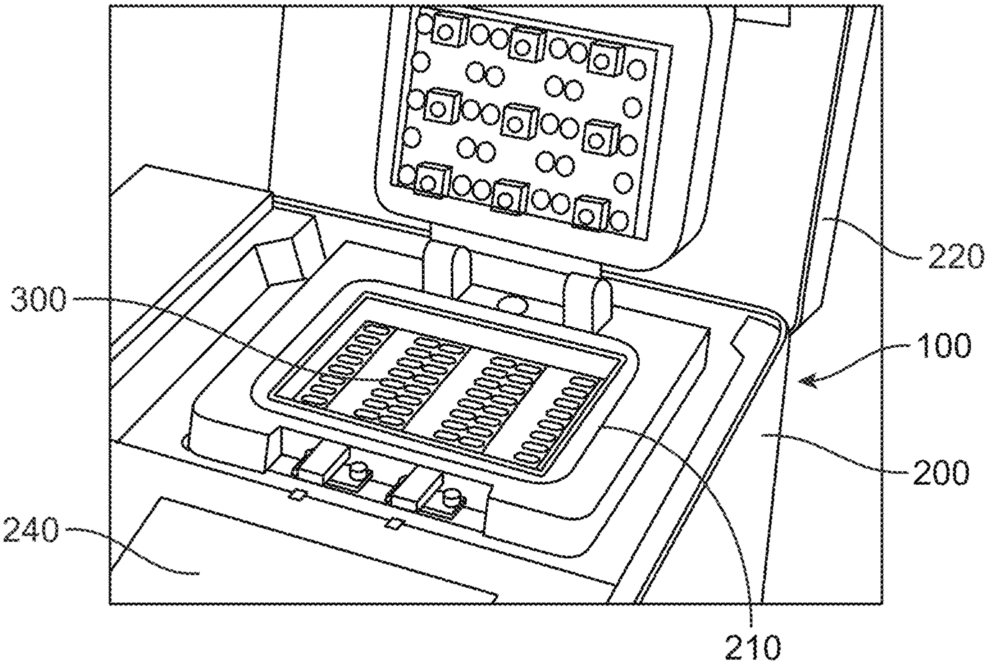
FIG. 3B is a detailed view of the receiving area 210 of the instrument 200 seen in FIG. 2A, comprising 3 microfluidic chips 300.
Figure 4:
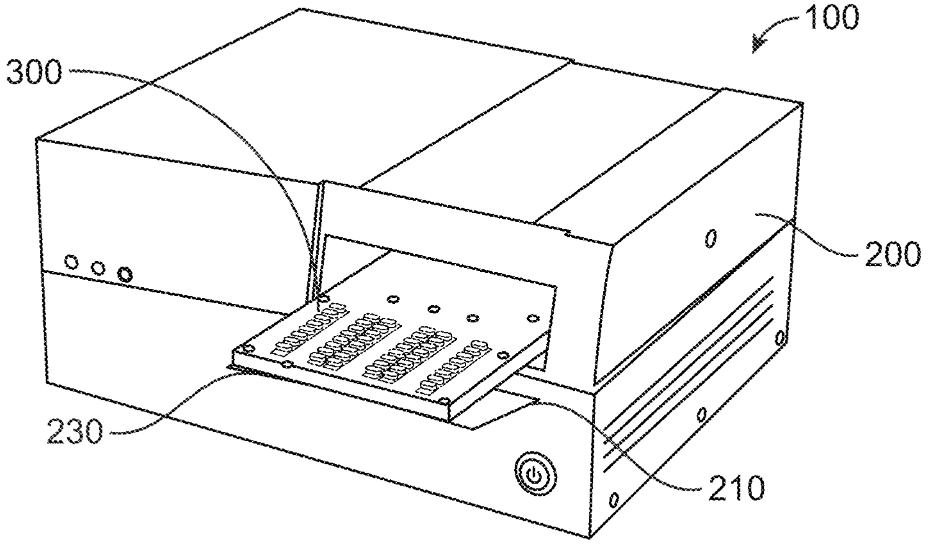
FIG. 4 is a perspective view of an exemplary embodiment of a system 100 for performing droplet-based assays, with the system 100 comprising an instrument 200 and 3 microfluidic chips 300.

FIGS. 3A, 3B and 4 show exemplary embodiments of a suitable system 100 in the sense of the present invention. Such system may include an instrument 200 and a microfluidic chip 300 received by the instrument. The instrument 200 may be equipped with a receiving area 210 which permits placement of at least one or several microfluidic chips 300 into the instrument. In the embodiments shown in FIGS. 3A, 3B and 4, the microfluidic chip 300 is capped at the loading well 320 level.

The instrument 200 may have an open configuration for receiving one or several microfluidic chips 300 and a closed conformation that restricts microfluidic chips 300 introduction and removal (e.g., during instrument actuation of loaded microfluidic chips 300). For example, the instrument may comprise a lid 220, a tray 230 or any other suitable means such. In some embodiments, the lid, tray or any other suitable means may be operated manually, or be coupled to a drive mechanism automatically driving the opening and/or closing of the receiving area 210. In some embodiments, the lid, tray or any other suitable means may be heated. This is particularly suitable for PCR assays where both the thermal cycler (usually located below the microfluidic chip 300) and the lid, tray or any other suitable means are heated, thereby providing a more homogeneous temperature across the sample.

The instrument 200 may further be equipped with a user interface 240 as depicted in FIGS. 3A and 3B. The instrument may be equipped with various other means such as a pressure manifold, a thermal cycler, a detector, pipettes and pipette controllers, a communication interface, control electronics, an algorithm, among others.

In the embodiments shown in FIGS. 3A, 3B and 4, three microfluidic chips 300 are depicted in the receiving area 210.

In some embodiments, the instrument 200 may apply pressure to the microfluidic chip 300 to drive droplet generation, in accordance with aspects of the present disclosure. In some embodiments, an actuation signal may be inputted to the instrument 200, to cause the instrument 200 to apply pressure to the microfluidic chip 300, to drive droplet generation, in accordance with aspects of the present disclosure.

In some embodiments, application of the pressure may be maintained during the assay. In some embodiments, application of the pressure may be stopped when an endpoint of droplet generation has been reached.

Figure 5:
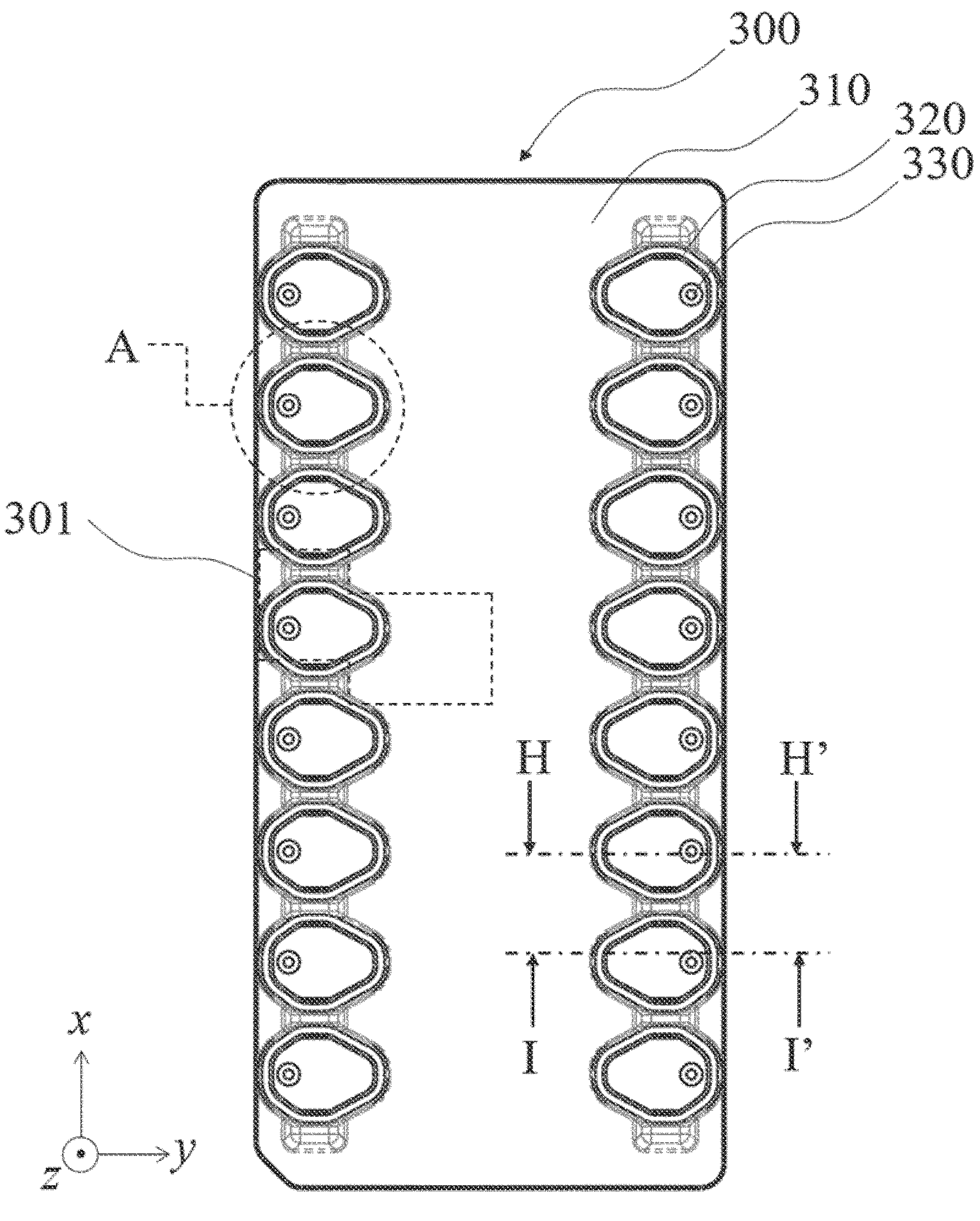
FIG. 5 is a top view of an exemplary embodiment of a microfluidic chip 300 incorporating an array of microfluidic units 301 of the present invention.
Figure 6:
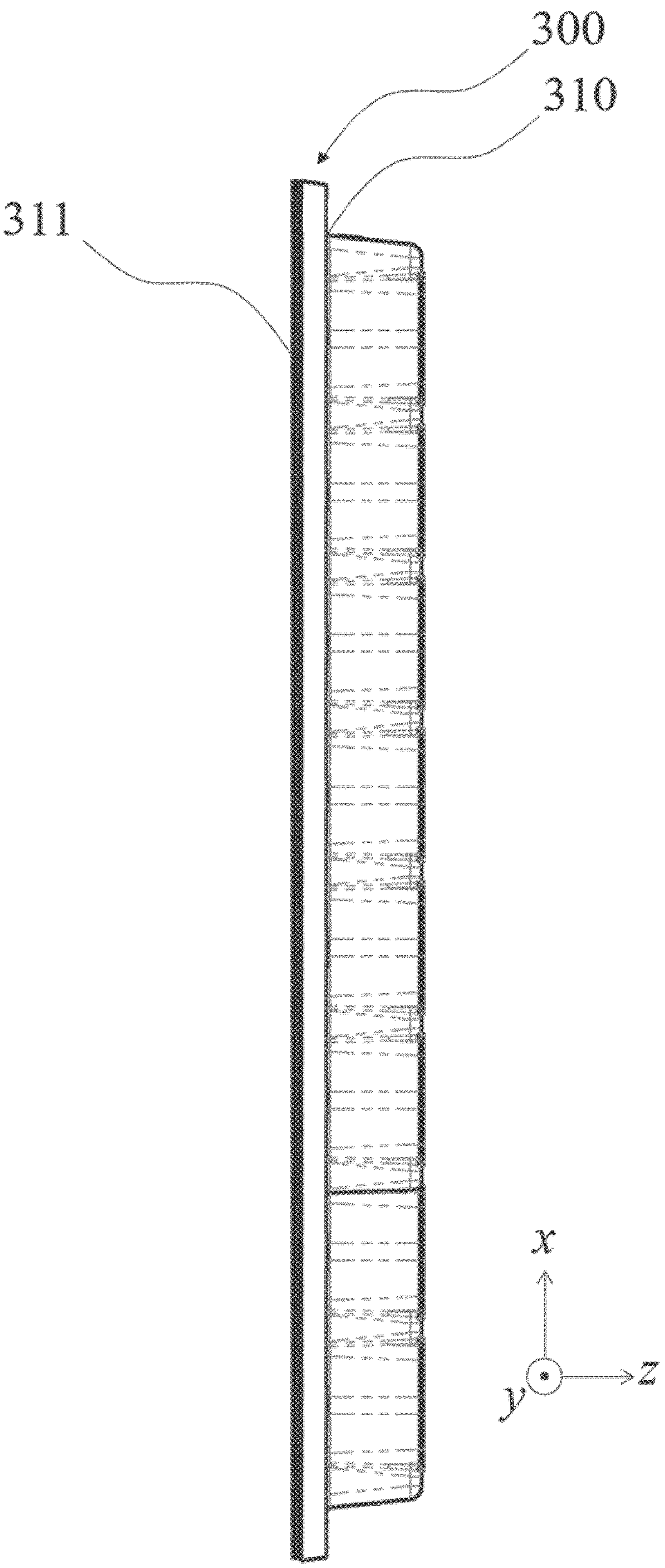
FIG. 6 is a side view of an exemplary embodiment of a microfluidic chip 300 incorporating an array of microfluidic units of the present invention.
Figure 7:
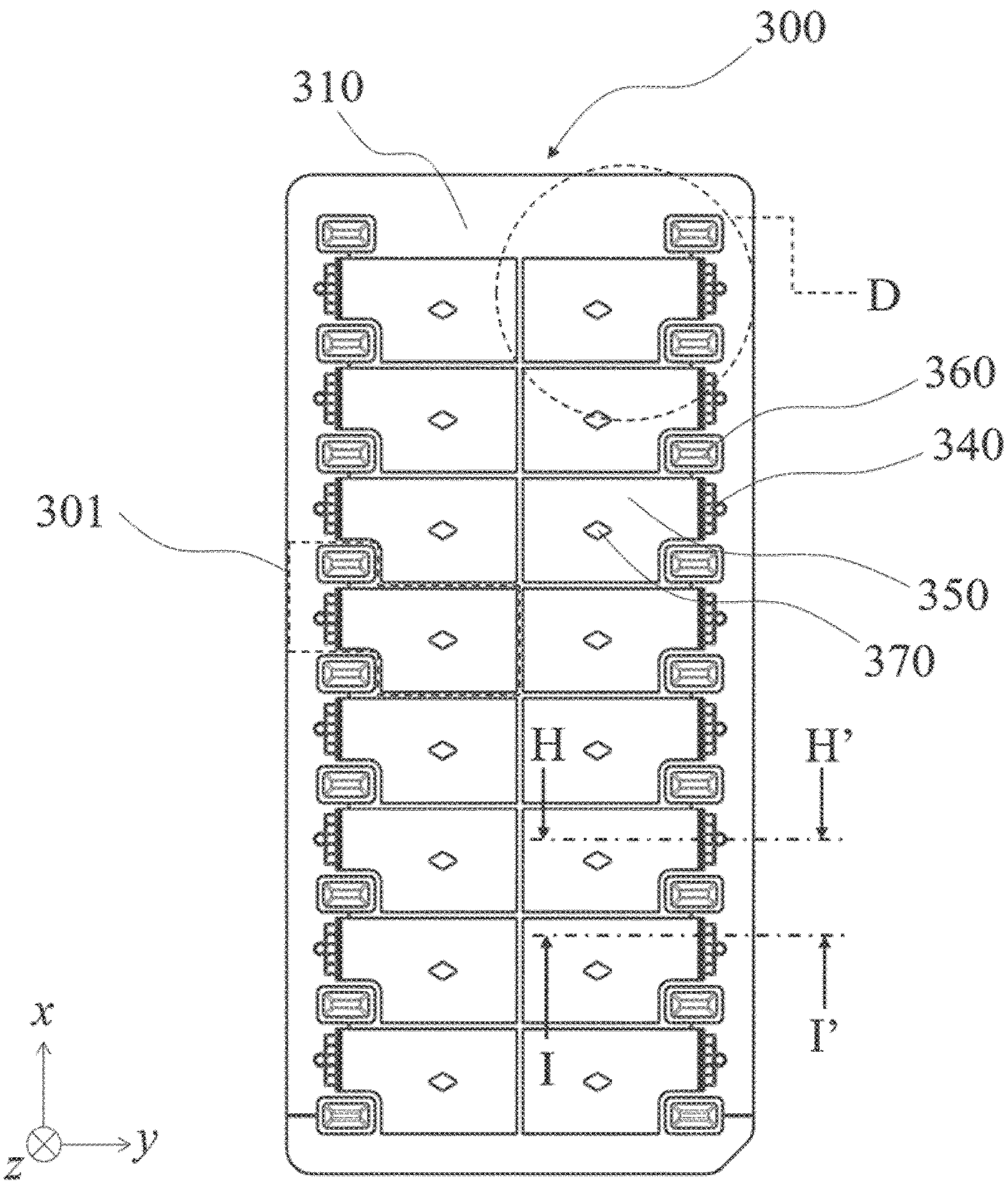
FIG. 7 is a bottom view of an exemplary embodiment of a microfluidic chip 300 incorporating an array of microfluidic units 301 of the present invention.

In the embodiment of FIGS. 5-7, the microfluidic chip 300 of FIGS. 2A and 2B is shown. The microfluidic chip 300 comprises an array of 16 microfluidic units 301, each comprising a loading well 320 with an inlet port 330, leading to a droplet generator 340 operatively coupled to a droplet chamber 350 and an air tank 360. The droplet chamber 350 further comprises a chamber pillar 370.

In particular, the microfluidic chip 300 depicted in FIGS. 5-7 comprises an array of 16 microfluidic units 301. The present invention however encompasses embodiments where the microfluidic chip comprises only one microfluidic unit, as well as embodiments where the microfluidic chip comprises several microfluidic units such as 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48 or more microfluidic units such as 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95 or 96. In particular, the microfluidic chip may comprise 8, 16, 24, 32, 40, 48, 56, 64, 72, 80, 88 or 96 microfluidic units.

In some embodiments, the microfluidic chip 300 may consist of two overlaid slabs, glued, bonded or otherwise attached to one another. In some embodiments, the microfluidic chip comprises an upper slab 310, wherein the bottom of the upper slab 310 is in contact with a lower slab 311. For the convenience of illustrative depiction of the microfluidic chip 300, the lower slab 311 is represented in FIG. 6 only. In the embodiment shown in FIG. 6, elements of the microfluidic chip 300 seen by transparency are illustrated in dotted grey lines.

In the embodiment shown in FIG. 7, the bottom side of the upper slab 310, i.e., the side of the upper slab 310 in contact with the lower slab 311, is etched so as to define a microfluidic network between the two slabs when overlaid. In that respect, the lower slab 311 is flat.

In some embodiments, the lower slab 311 is light-transparent. In some embodiments, the lower slab 311 is light-transparent, so as to be suitable for or configured to observe the microfluidic network defined by the overlaying upper 310 and lower 311 slabs, by means of transparency. By "light-transparent", it is meant that the lower slab 311 has an optical transmittance of light of more than about 50%, preferably more than about 60%, about 70%, about 80%, about 85%, about 90%, about 95%, about 96%, about 97%, about 98%, about 99% or more, over a light wavelength included in a range of at least about 100 nm, preferably at least about 200 nm, about 300 nm, about 400 nm, about 500 nm, about 600 nm or more in the 200-800 nm spectrum.

In some embodiments, the lower slab 311 may further be fluorescence-free. By "fluorescence-free", it is meant that the lower slab 311 does not or does substantially not emit fluorescence when exposed to light. In some embodiments, "does not or does substantially not emit fluorescence" means that the emitted fluorescence is less than about 100 AU, preferably less than about 80 AU, about 60 AU, about 40 AU, about 25 AU, about 20 AU, about 15 AU, about 10 AU, about 5 AU or less, over an excitation wavelength included in a range of at least about 50 nm, preferably at least about 100 nm, about 200 nm, about 300 nm or more in the 300-600 nm spectrum.

In some embodiments, the lower slab 311 may be, for example, a foil, a film, a microscope slide, a glass slide, a molded polymer part, or any other suitable material.

In some embodiments, the lower slab 311 may be in plastic, glass, or any other suitable material.

An example of material suitable for the lower slab 311 being light-transparent and fluorescence-free is cyclic olefin polymer (COP), cyclic olefin copolymer (COC), polypropylene, polymethylmethacrylate or any other suitable material.

In some embodiments, the upper slab 310 of the microfluidic chip 300 forms a base supporting at least one loading well 320.

Figure 8:
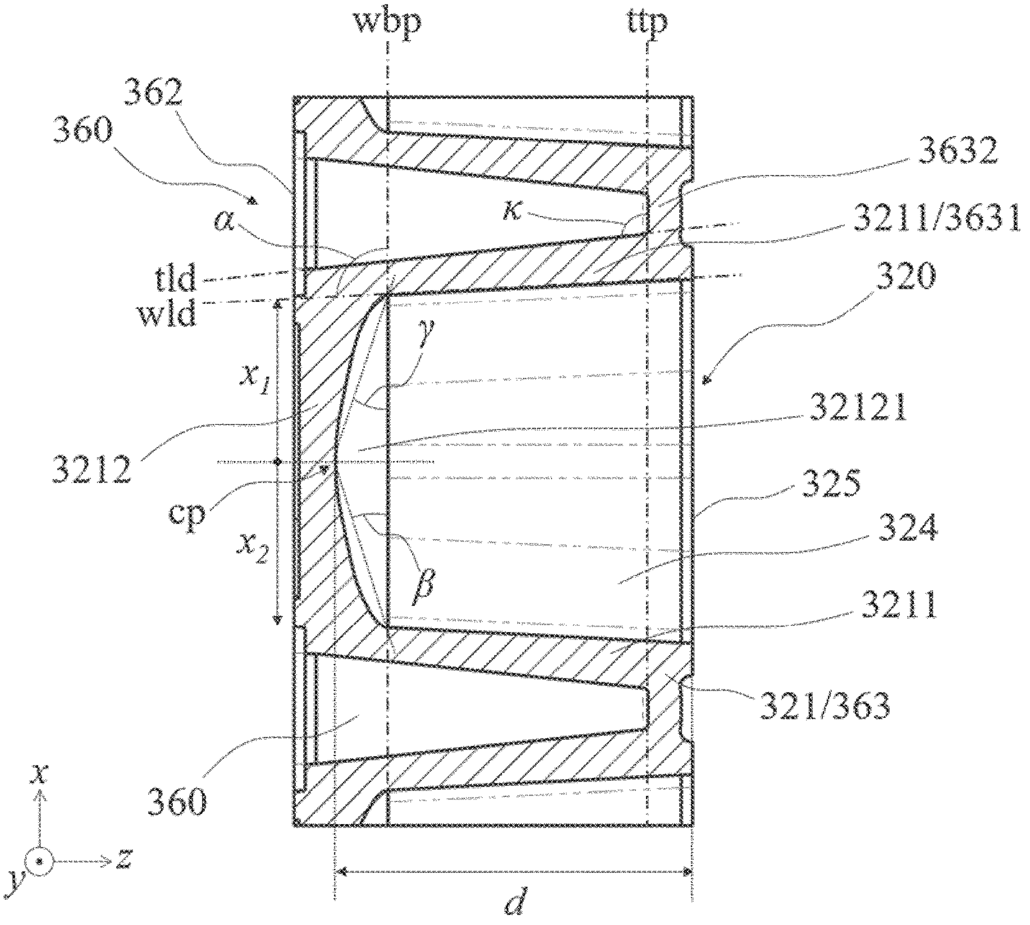
FIG. 8 is a side cross-section view of a loading well 320 according to plane B-B' in FIG. 10.
Figure 9:
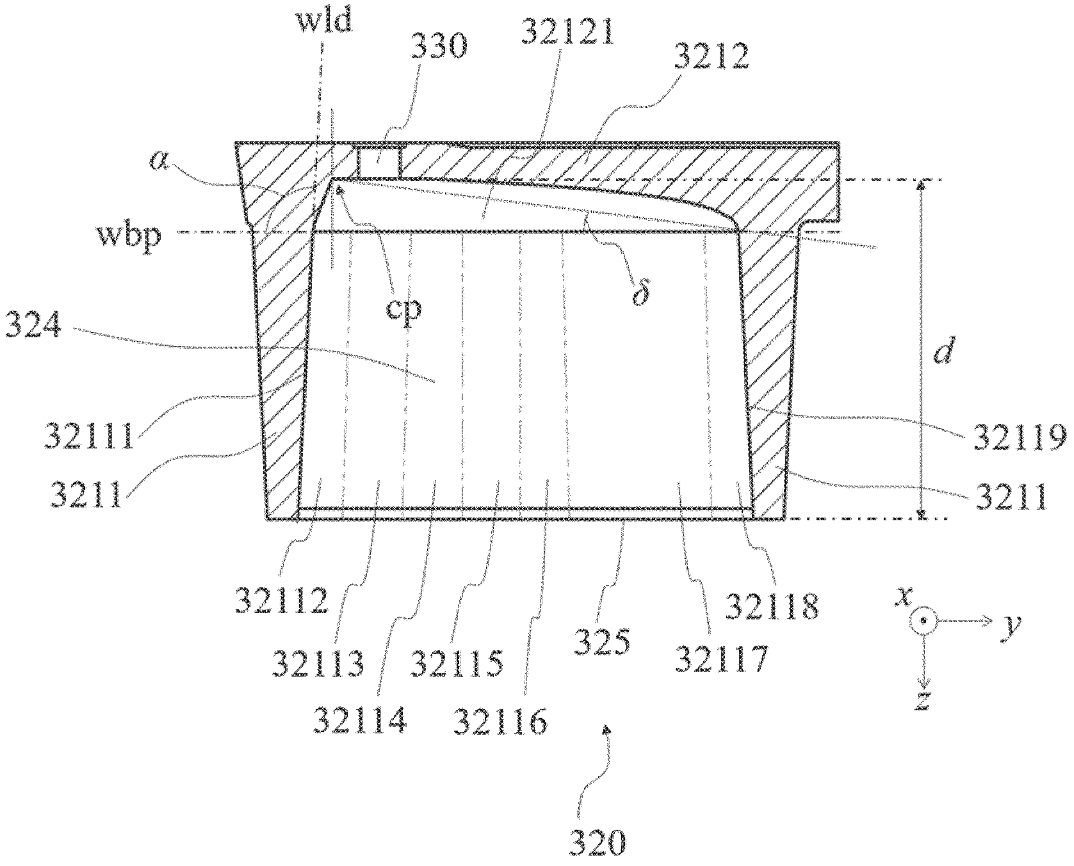
FIG. 9 is a side cross-section view of a loading well 320 according to plane C-C' in FIG. 10.
Figure 10:
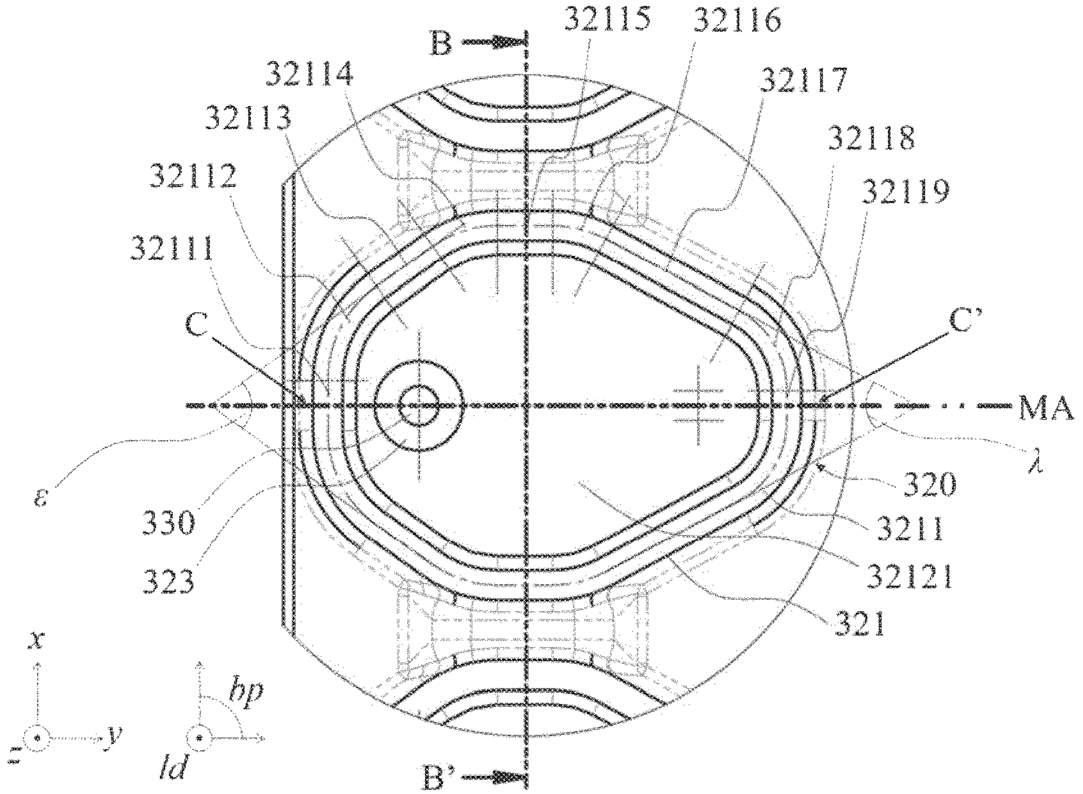
FIG. 10 is a top view of a loading well 320 depicted in an enlarged fashion from the region indicated at “A” in FIG. 5.

In the embodiment shown in FIGS. 8-10, the loading well 320 is an open cavity 324 comprising a loading opening 325. The loading well 320 is bounded by a wall 321 comprising a bottom wall part 3212 coupled to a lateral wall part 3211.

In some embodiments, the bottom wall part 3212 globally extends according to a well bottom plane wbp substantially parallel to the base plane (x/y).

In some embodiments, the lateral wall part 3211 extends along a well lateral direction wld (in the z-axis) disposed according to an angle $\alpha$ relatively to the well bottom plane wbp, as seen on FIGS. 8-9. In some embodiments, the angle $\alpha$ has a value ranging from about 80° to about 105°, preferably from about 86° to about 100°, more preferably from about 90° to about 96°. In some embodiments, the angle $\alpha$ has a value of about 80°, about 85°, about 90°, about 95°, about 100°, about 105° or more. In some embodiments, the angle $\alpha$ has a value of about 93°.

In some embodiments, the lateral wall part 3211 has a thickness (at the level of the well bottom plane wbp) ranging from about 0.25 mm to about 2.5 mm, preferably from about 0.5 mm to about 2 mm, more preferably from about 0.75 mm to about 1.75 mm, even more preferably from about 1 mm to about 1.5 mm. In some embodiments, the lateral wall part 3211 has a thickness (at the level of the well bottom plane wbp) of about 0.2 mm, about 0.3 mm, about 0.4 mm, about 0.5 mm, about 0.6 mm, about 0.7 mm, about 0.8 mm, about 0.9 mm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, about 2 mm, about 2.1 mm, about 2.2 mm, about 2.3 mm, about 2.4 mm, about 2.5 mm or more. In some embodiments, the lateral wall part 3211 has a thickness (at the level of the well bottom plane wbp) of about 1.2 mm.

In some embodiments, the loading opening 325 is defined by a free end of the lateral wall part 3211 opposite to the base.

In some embodiments, the lateral wall part 3211 has a thickness (at the level of the loading opening 325) ranging from about 0.1 mm to about 1.25 mm, preferably from about 0.25 mm to about 1 mm, more preferably from about 0.5 mm to about 0.75 mm. In some embodiments, the lateral wall part 3211 has a thickness (at the level of the loading opening 325) of about 0.1 mm, about 0.2 mm, about 0.3 mm, about 0.4 mm, about 0.5 mm, about 0.6 mm, about 0.7 mm, about 0.8 mm, about 0.9 mm, about 1 mm, about 1.1 mm, about 1.2 mm or more. In some embodiments, the lateral wall part 3211 has a thickness (at the level of the loading opening 325) of about 0.6 mm.

In some embodiments, the inlet port 330 may be accommodated in the lateral wall part 3211 or in the bottom wall part 3212 of the wall 321, preferably in the bottom wall part 3212.

In some embodiments, the inlet port 330 may comprise an inlet flat 323 extending radially outward from the inlet port 330 in the base plane (x/y). In some embodiments, the inlet flat 323 is a radial area around the inlet port 330 which does not present a slope. In some embodiments, the inlet flat 323 is a radial area around the inlet port 330 which is parallel to the base plane (x/y). In some embodiments, the inlet flat 323 has a diameter ranging from about 0.5 mm to about 3 mm, preferably from about 1 mm to about 2.5 mm, more preferably from about 1.5 mm to about 2 mm. In some embodiments, the inlet flat 323 has a diameter of about 0.5 mm, about 0.75 mm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, about 2 mm, about 2.1 mm, about 2.2 mm, about 2.3 mm, about 2.4 mm, about 2.5 mm, about 2.75 mm, about 3 mm or more. In some embodiments, the inlet flat 323 has a diameter of about 1.8 mm.

In some embodiments, the loading well 320 has an x and/or y dimension of less than about 100 diameters of a drop of sample 313, preferably less than about 90, about 80, about 70, about 60, about 50, about 40, about 30, about 20, about 10, about 9, about 8, about 7, about 6, about 5, about 4, about 3, about 2 diameters of a drop of sample 313. In some embodiments, the loading well 2 has an x and/or y dimension of more than about 1 diameter of a drop of sample 313, preferably more than about 2, about 3, about 4, about 5 diameters of a drop of sample 313.

In some embodiments, the loading well 320 has a length (in the y-axis) ranging from about 2 mm to about 20 mm, preferably from about 5 mm to about 15 mm, more preferably from about 8 mm to about 12 mm. In some embodiments, the loading well 320 has a length (in the y-axis) of about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm or more. In some embodiments, the loading well 320 has a length (in the y-axis) of about 9.3 mm.

In some embodiments, the loading well 320 has a width (in the x-axis) ranging from about 1 mm to about 15 mm, preferably from about 2.5 mm to about 12.5 mm, more preferably from about 5 mm to about 10 mm, even more preferably from about 6.5 mm to about 8 mm. In some embodiments, the loading well 320 has a width (in the x-axis) of about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm or more. In some embodiments, the loading well 320 has a width (in the x-axis) of about 7.2 mm.

In some embodiments, the microfluidic chip 300 is at least partially filled with a continuous phase 312 and the loading well 320 comprises a shallow layer of continuous phase 312 overflowing from the microfluidic network (i.e., the continuous phase in the microfluidic network and the layer of continuous phase in the loading well are in contiguity).

In some embodiments, the height (in the z-axis) of the layer of continuous phase 312 in the loading well 320 at the position of higher depth d is less than about 5 times the diameter of a drop of sample 313, preferably less than about 4, about 3, about 2, about 1, about 0.9, about 0.8, about 0.7, about 0.6, about 0.5, about 0.4, about 0.3, about 0.2, about 0.1 times the diameter of a drop of sample 313. In some embodiments, the height in the z-axis of the layer of continuous phase 312 in the loading well 320 at the position of higher depth d of the loading well 320 is less than about 1 time the diameter of a drop of sample 313, preferably less than about 0.9, about 0.8, about 0.7, about 0.6, about 0.5, about 0.4, about 0.3, about 0.2, about 0.1 times the diameter of a drop of sample 313. In some embodiments, the height (in the z-axis) of the layer of continuous phase 312 in the loading well 320 at the position of higher depth d is about 0.4 times the diameter of a drop of sample 313.

In some embodiments, the height (in the z-axis) of the layer of continuous phase 312 in the loading well 320 at the position of higher depth d is less than about 12.5 mm, preferably less than about 10 mm, about 7.5 mm, about 5 mm, about 2.5 mm, about 2.25 mm, about 2 mm, about 1.75 mm, about 1.5 mm, about 1.25 mm, about 1 mm, about 0.75 mm, about 0.5 mm, about 0.25 mm. In some embodiments, the height in the z-axis of the layer of continuous phase 312 in the loading well 320 at the position of higher depth d of the loading well 320 is less than about 2.5 mm, preferably less than about 2.25 mm, about 2 mm, about 1.75 mm, about 1.5 mm, about 1.25 mm, about 1 mm, about 0.75 mm, about 0.5 mm, about 0.25 mm. In some embodiments, the height (in the z-axis) of the layer of continuous phase 312 in the loading well 320 at the position of higher depth d is about 1 mm±0.2 mm.

In some embodiments, the volume of the layer of continuous phase 312 in the loading well 320 is less than about 150 μL, preferably less than about 100 μL, about 95 μL, about 90 μL, about 85 μL, about 80 μL, about 75 μL, about 70 μL, about 65 μL, about 60 μL, about 55 μL, about 50 μL, about 45 μL, about 40 μL, about 35 μL, about 30 μL, about 25 μL, about 20 μL, about 15 μL, about 10 μL. In some embodiments, the volume of the layer of continuous phase 312 in the loading well 320 is about 35 μL±2.5 μL.

In some embodiments, the wetting angle (i.e., the contact angle θ) between the lateral wall part 3211 of the loading well 320 and the continuous phase 312 is less than about 90°, preferably less than about 80°, about 70°, about 60°, about 50°, about 40°, about 30°, about 20°, about 10° or lesser. In a preferred embodiment, the wetting angle between the lateral wall part 3211 of the loading well 320 and the continuous phase 312 is flat, i.e., is about 0°.

In a first alternative embodiment seen on FIGS. 8-9, the loading well 320 is configured to move and/or trap a drop of sample 313 in a defined z position within the loading well 320.

In some embodiments, the bottom wall part 3212 is non-flat and comprises a slopped bottom 32121. Accordingly, the bottom wall part 3212 of the loading well 320 may be trough-shaped, cup-shaped or bowl-shaped. In some embodiments, the depth d of the loading well 320 (from the loading opening 325 to the bottom wall part 3212) is non-uniform. In some embodiments, the slopped bottom 32121 comprises at least one slope. In some embodiments, the position of higher depth of the sloped bottom 32121 accommodates the loading port 330. In some embodiments, the position of higher depth of the sloped bottom 32121 accommodates the inlet flat 323.

In some embodiments, the height of the sloped bottom 32121 (from the well bottom plane wbp to the position of higher depth of the sloped bottom 32121) ranges from about 0.1 mm to about 5 mm, preferably from about 0.1 mm to about 2.5 mm, more preferably from about 0.5 mm to about 1.5 mm. In some embodiments, the height of the sloped bottom 32121 (from the well bottom plane wbp to the position of higher depth of the sloped bottom 32121) is about 0.1 mm, about 0.2 mm, about 0.3 mm, about 0.4 mm, about 0.5 mm, about 0.6 mm, about 0.7 mm, about 0.8 mm, about 0.9 mm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, about 2 mm, about 2.5 mm, about 3 mm, about 3.5 mm, about 4 mm, about 4.5 mm, about 5 mm or more. In some embodiments, the height of the sloped bottom 32121 (from the well bottom plane wbp to the position of higher depth of the sloped bottom 32121) is about 1.01 mm.

In some embodiments, the slope of the sloped bottom 32121 is constant from the lateral wall part 3211 to the position of higher depth of the sloped bottom 32121. In some embodiments, the slope of the sloped bottom 32121 is not constant, i.e., varies from the lateral wall part 3211 to the position of higher depth of the sloped bottom 32121. In the latter embodiment, an average slopping angle may be defined from the well bottom plane wbp (i.e., at the level of the lateral wall part 3211) to the position of higher depth of the sloped bottom 32121.

In some embodiments, the sloped bottom 32121 comprises a main slope according to a longitudinal axis (in the y-axis), with an average slopping angle δ (from the well bottom plane wbp to the position of higher depth of the sloped bottom 32121), as seen on FIG. 9. In some embodiments, the average slopping angle δ has a value ranging from about 1° to about 45°, preferably from about 1° to about 30°, more preferably from about 1° to about 20°, even more preferably from about 5° to about 15°, even more preferably from about 5° to about 10°. In some embodiments, the average slopping angle δ has a value of about 1°, about 2°, about 3°, about 4°, about 5°, about 6°, about 7°, about 8°, about 9°, about 10°, about 11°, about 12°, about 13°, about 14°, about 15°, about 16°, about 17°, about 18°, about 19°, about 20°, about 21°, about 22°, about 23°, about 24°, about 25°, about 30°, about 35°, about 40°, about 45°. In some embodiments, the average slopping angle δ has a value of about 8.5°±2°.

In some embodiments, the sloped bottom 32121 comprises a first lateral slope according to a first transversal axis (in the $x_1$-axis), with an average slopping angle γ (from the well bottom plane wbp to the position of higher depth of the sloped bottom 32121), as seen on FIG. 8. In some embodiments, the average slopping angle γ has a value ranging from about 1° to about 45°, preferably from about 5° to about 35°, more preferably from about 10° to about 25°, even more preferably from about 15° to about 20°. In some embodiments, the average slopping angle γ has a value of about 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 30°, 35°, 40°, 45°. In some embodiments, the average slopping angle γ has a value of about 19.2°±2°.

In some embodiments, the sloped bottom 32121 comprises a second lateral slope according to a second transversal axis (in the $x_2$-axis), with an average slopping angle β (from the well bottom plane wbp to the position of higher depth of the sloped bottom 32121), as seen on FIG. 8. In some embodiments, the average slopping angle β has a value ranging from about 1° to about 45°, preferably from about 5° to about 35°, more preferably from about 10° to about 25°, even more preferably from about 15° to about 20°. In some embodiments, the average slopping angle β has a value of about 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 30°, 35°, 40°, 45°. In some embodiments, the average slopping angle β has a value of about 19.2°±2°.

In some embodiments, the slopped bottom 32121 of the bottom wall part 3212 is defined by at least one, in particular two or three average slopping angles β, γ, δ relatively to the well bottom plane wbp.

In some embodiments, at least two, in particular the three of 1) the main slopped bottom section, 2) the first lateral slopped bottom section and 3) the second lateral slopped bottom section converge toward a converging point cp. In some embodiments, the converging point cp is located on the bottom wall part 3212. In some embodiments, the converging point cp is located on the bottom wall part 3212 at the position of higher depth d relatively to the loading opening 325.

In a second alternative embodiment seen on FIG. 10, the loading well 320 is configured to move and/or trap the drop of sample 313 in a defined in-plane (x and/or y) position within the loading well 320.

In some embodiments, the lateral wall part 3211 of the loading well 320 has a variable in-plane local curvature.

In some embodiments, the lateral wall part 3211 of the loading well 320 has a general shape of an ellipse in cross-section parallel to the base plane (x/y).

As illustrated on FIG. 10, from C to C', the lateral wall part 3211 comprises a plurality of sections that are depicted in a cross-section plane parallel to the base plane (x/y) of the upper slab 310.

A first straight section 32111 is coupled to a first curved section 32112.

The first curved section 32112 is coupled to a second straight section 32113.

The second straight section 32113 is coupled to a second curved section 32114.

The second curved section 32114 is coupled to a third straight section 32115.

The third straight section 32115 is coupled to a third curved section 32116.

The third curved section 32116 is coupled to a fourth straight section 32117.

The fourth straight section 32117 is coupled to a fourth curved section 32118.

The fourth curved section 32118 is coupled to a fifth straight section 32119.

In some embodiments, the sections 32111-32119 are symmetrical relatively to a major axis MA of the ellipse. As seen on FIG. 10, the first straight section 32111 and a fifth straight section 32119 are crossed in their center by the major axis MA.

In some embodiments, the first straight section 32111 has a length (from the major axis MA to the first curved section 32112) ranging from about 0.1 mm to about 1 mm, preferably from about 0.25 mm to about 0.75 mm, more preferably from about 0.3 mm to about 0.7 mm, even more preferably from about 2.2 mm to about 2.4 mm. In some embodiments, the first straight section 32111 has a length (from the major axis MA to the first curved section 32112) of about 0.5 mm.

In some embodiments, the first curved section 32112 has a length ranging from about 0.5 mm to about 3 mm, preferably from about 0.75 mm to about 2 mm, more preferably from about 1 mm to about 1.75 mm, even more preferably from about 1.25 mm to about 1.5 mm. In some embodiments, the first curved section 32112 has a length of about 1.4 mm.

In some embodiments, the first curved section 32112 has a curvature radius ranging from about 1.5 mm to about 3.5 mm, preferably from about 1.75 mm to about 3.0 mm, more preferably from about 2.0 mm to about 2.6 mm, even more preferably from about 2.2 mm to about 2.4 mm. In some embodiments, the first curved section 32112 has a curvature radius of about 2.3 mm.

In some embodiments, the second straight section 32113 has a length ranging from about 0.5 mm to about 3 mm, preferably from about 0.75 mm to about 2 mm, more preferably from about 1 mm to about 1.75 mm, even more preferably from about 1.25 mm to about 1.5 mm. In some embodiments, the second straight section 32113 has a length of about 1.4 mm.

In some embodiments, the two second straight sections 32113 on each side of the major axis MA converge towards the major axis MA with an angle ε ranging from about 45° to about 90°, preferably from about 50° to about 85°, more preferably from about 60° to about 80°, even more preferably from about 65° to about 75°. In some embodiments, the angle ¿ has a value of about 45°, about 50°, about 55°, about 60°, about 65°, about 70°, about 75°, about 80°, about 85°, about 90°. In some embodiments, the angle ε has a value of about 70°.

In some embodiments, the second curved section 32114 has a length ranging from about 1.5 mm to about 3.5 mm, preferably from about 1.75 mm to about 3.0 mm, more preferably from about 2.0 mm to about 2.6 mm, even more preferably from about 2.1 mm to about 2.3 mm. In some embodiments, the second curved section 32114 has a length of about 2.21 mm.

In some embodiments, the second curved section 32114 has a curvature radius ranging from about 1.5 mm to about 3.5 mm, preferably from about 1.75 mm to about 3.0 mm, more preferably from about 2.0 mm to about 2.6 mm, even more preferably from about 2.2 mm to about 2.4 mm. In some embodiments, the second curved section 32114 has a curvature radius of about 2.3 mm.

In some embodiments, the third straight section 32115 has a length ranging from about 0.25 mm to about 2.5 mm, preferably from about 0.5 mm to about 2 mm, more preferably from about 0.75 mm to about 2.5 mm, even more preferably from about 1 mm to about 1.25 mm. In some embodiments, the third straight section 32115 has a length of about 1.1 mm.

In some embodiments, the third curved section 32116 has a length ranging from about 0.25 mm to about 2.5 mm, preferably from about 0.5 mm to about 2 mm, more preferably from about 0.75 mm to about 2.5 mm, even more preferably from about 1 mm to about 1.25 mm. In some embodiments, the third curved section 32116 has a length of about 1.12 mm.

In some embodiments, the third curved section 32116 has a curvature radius ranging from about 1.5 mm to about 3.5 mm, preferably from about 1.75 mm to about 3.0 mm, more preferably from about 2.0 mm to about 2.6 mm, even more preferably from about 2.2 mm to about 2.4 mm. In some embodiments, the third curved section 32116 has a curvature radius of about 2.3 mm.

In some embodiments, the fourth straight section 32117 has a length ranging from about 1 mm to about 5 mm, preferably from about 2 mm to about 4 mm, more preferably from about 2.5 mm to about 3.5 mm, even more preferably from about 2.75 mm to about 3.25 mm. In some embodiments, the fourth straight section 32117 has a length of about 3.1 mm.

In some embodiments, the two fourth straight sections 32117 on each side of the major axis MA converge towards the major axis MA with an angle λ ranging from about 20° to about 90°, preferably from about 30° to about 80°, more preferably from about 40° to about 70°, even more preferably from about 50° to about 60°. In some embodiments, the angle λ has a value of about 20°, about 25°, about 30°, about 35°, about 40°, about 45°, about 50°, about 55°, about 60°, about 65°, about 70°, about 75°, about 80°, about 85°, about 90°. In some embodiments, the angle λ has a value of about 56°.

In some embodiments, the fourth curved section 32118 has a length ranging from about 1 mm to about 3 mm, preferably from about 1.25 mm to about 2.5 mm, more preferably from about 1.5 mm to about 2.25 mm, even more preferably from about 1.75 mm to about 2 mm. In some embodiments, the fourth curved section 32118 has a length of about 1.95 mm.

In some embodiments, the fourth curved section 32118 has a curvature radius ranging from about 1 mm to about 2.5 mm, preferably from about 1.25 mm to about 2.25 mm, more preferably from about 1.5 mm to about 2.0 mm, even more preferably from about 1.7 mm to about 1.9 mm. In some embodiments, the fourth curved section 32118 has a curvature radius of about 1.8 mm.

In some embodiments, the fifth straight section 32119 has a length (from the fourth curved section 32118 to the major axis MA) ranging from about 0.05 mm to about 1 mm, preferably from about 0.1 mm to about 0.75 mm, more preferably from about 0.2 mm to about 0.5 mm, even more preferably from about 0.25 mm to about 0.4 mm. In some embodiments, the fifth straight section 32119 has a length (from the fourth curved section 32118 to the major axis MA) of about 0.3 mm.

In a third alternative embodiment combining the features seen on FIGS. 8-10, the loading well 320 is configured to move and/or trap the drop of sample 313 in a defined in-plane (x and/or y) and z position within the loading well 320.

In this embodiment, the lateral wall part 3211 has a variable in-plane local curvature and the bottom wall part 3212 is non-flat, as described hereinabove.

Figure 11:
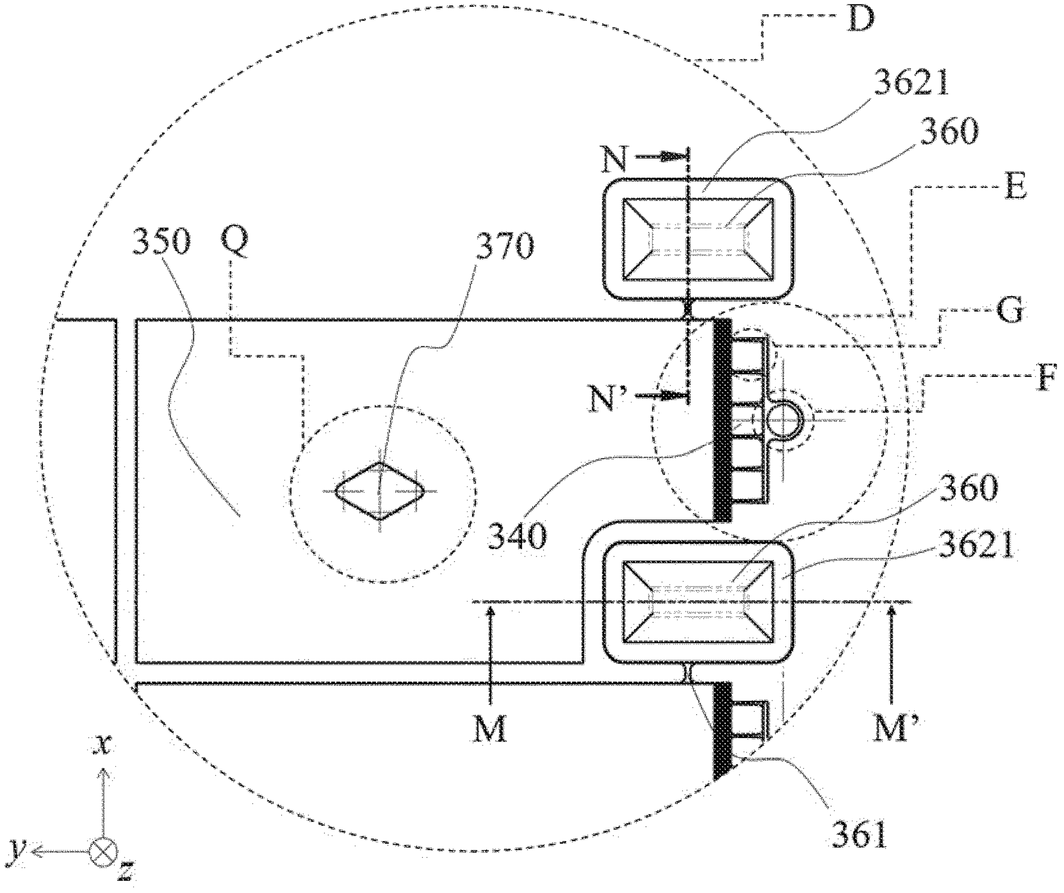
FIG. 11 is a bottom view of one microfluidic unit 301, comprising in particular a droplet generator 340, a droplet chamber 350, an air tank 360 and a chamber pillar 370, depicted in an enlarged fashion from the region indicated at “D” in FIG. 7.

In the embodiment shown in FIG. 11, the inlet port 330 in the loading well 320 leads to the droplet generator 340, operatively coupled to the droplet chamber 350 and an air tank 360. The droplet chamber 350 comprises a chamber pillar 370.

In some embodiments, the inlet port 330 has a height (in the z-axis) ranging from about 0.1 mm to about 1.25 mm, preferably from about 0.25 mm to about 1 mm, more preferably from about 0.5 mm to about 0.75 mm. In some embodiments, the inlet port 330 has a height (in the z-axis) of about 0.1 mm, about 0.2 mm, about 0.3 mm, about 0.4 mm, about 0.5 mm, about 0.6 mm, about 0.7 mm, about 0.8 mm, about 0.9 mm, about 1 mm, about 1.1 mm, about 1.2 mm. In some embodiments, the inlet port 330 has a height (in the z-axis) of about 0.6 mm.

In some embodiments, the inlet port 330 has a diameter (at the inner edge 3412, in the x/y-axis) ranging from about 0.1 mm to about 1.5 mm, preferably from about 0.25 mm to about 1.25 mm, more preferably from about 0.5 mm to about 1 mm. In some embodiments, the inlet port 330 has a diameter (at the inner edge 3412, in the x/y-axis) of about 0.1 mm, about 0.2 mm, about 0.3 mm, about 0.4 mm, about 0.5 mm, about 0.6 mm, about 0.7 mm, about 0.8 mm, about 0.9 mm, about 1 mm, about 1.1 mm, about 1.2 mm, about 1.3 mm, about 1.4 mm, about 1.5 mm. In some embodiments, the inlet port 330 has a diameter (at the inner edge 3412, in the x/y-axis) of about 0.8 mm.

Figure 12:
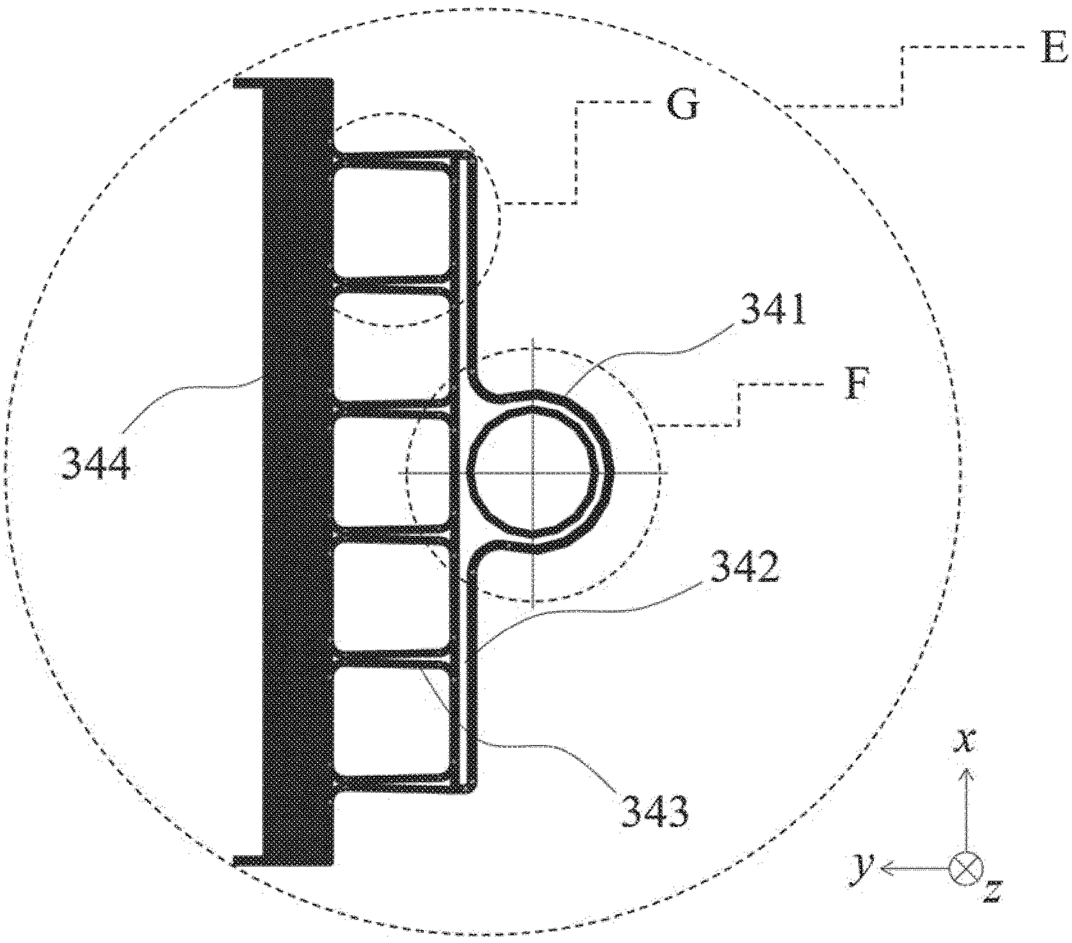
FIG. 12 is a plane bottom view of the droplet generator 340, depicted in an enlarged fashion from the region indicated at “E” in FIG. 11.

The droplet generator 340 is further illustrated in the enlarged view of the region indicated at "E" in FIG. 11, shown in FIG. 12. It may be divided into several parts: a landing pad 341, opening on a longitudinal (in the x-axis) distribution channel 342 which connects at least one (or in some embodiment, several) transversal (in the y-axis) injectors 343 opening on a longitudinal (in the x-axis) slopped area 344. The slopped area 344 is in direct continuity with the droplet chamber 350.

Figure 13:
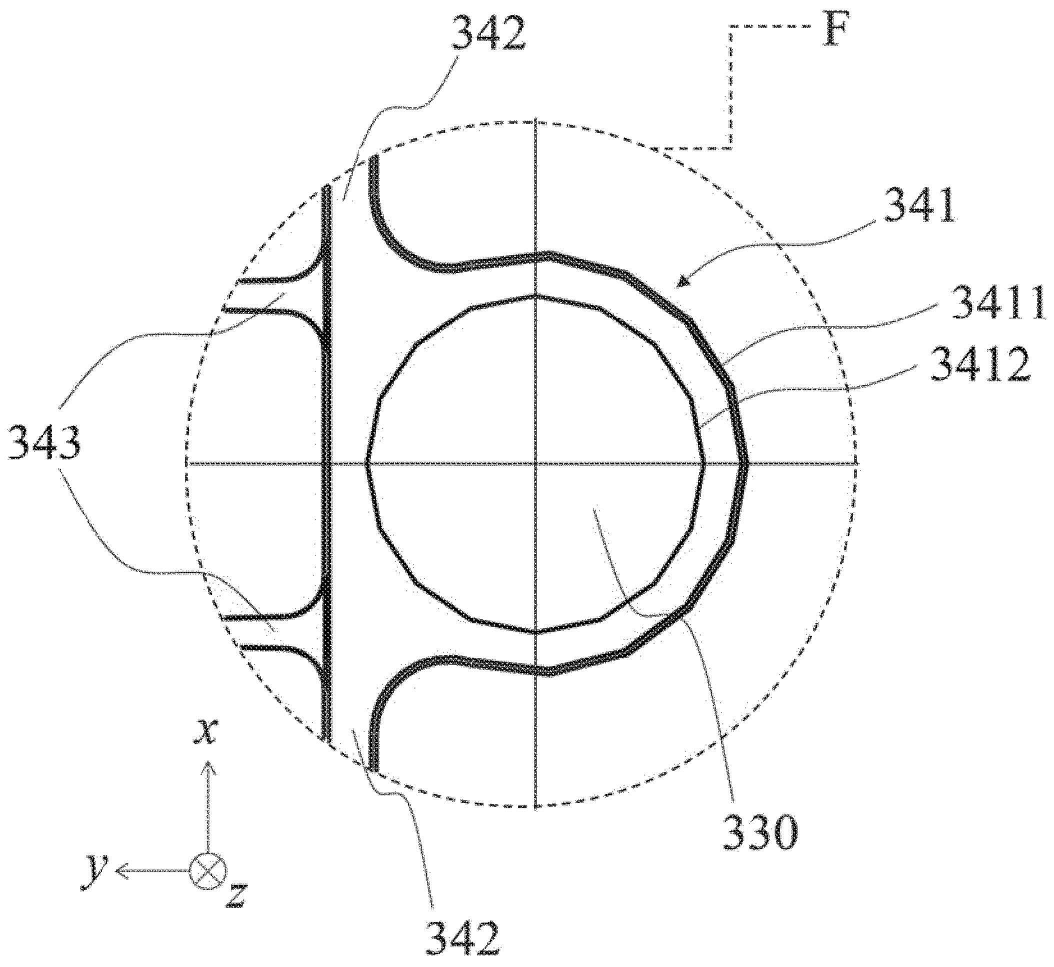
FIG. 13 is a view of a landing pad 341, depicted in an enlarged fashion from the region indicated at “F” in FIGS. 11-12.
Figure 16:
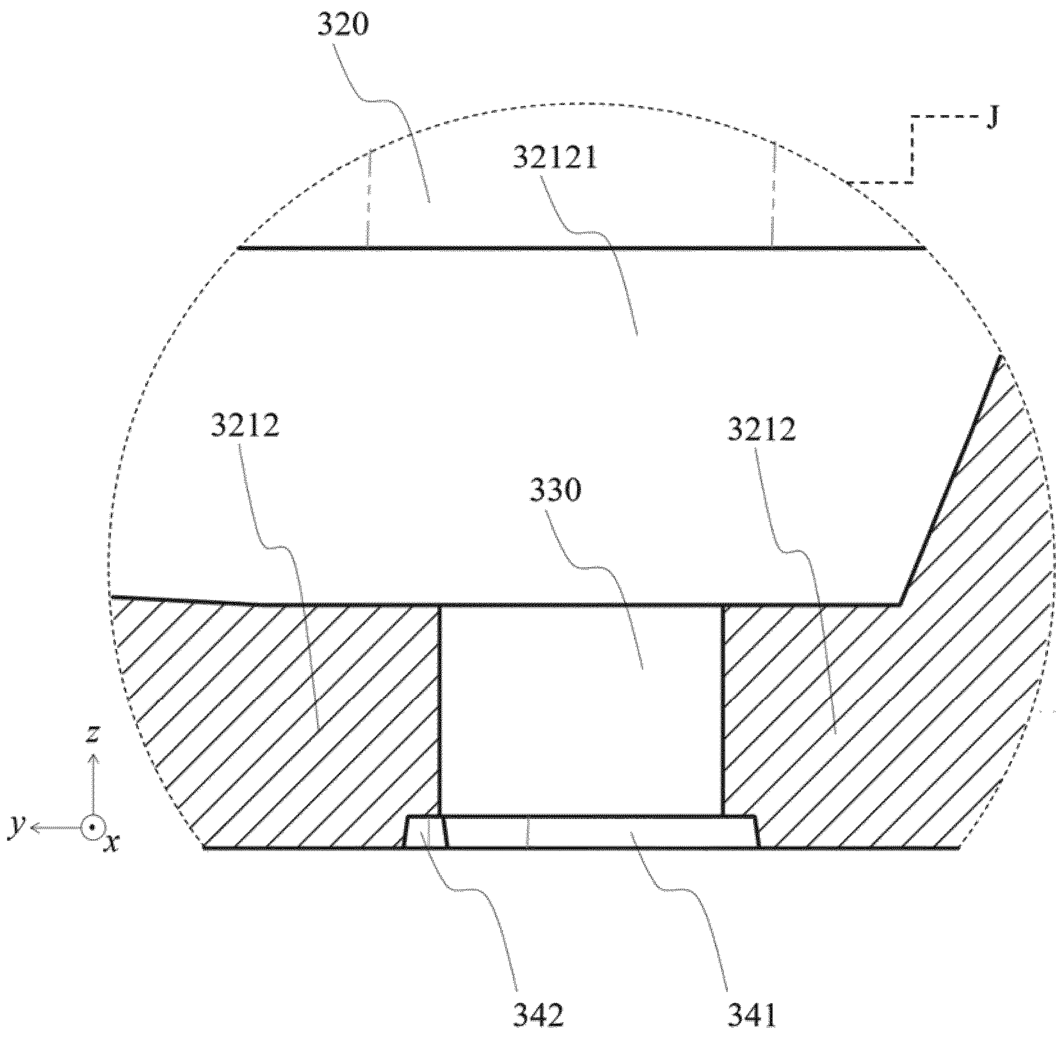
FIG. 16 is a side cross-section view of the inlet port 330, depicted in an enlarged fashion from the region indicated at “J” in FIG. 15.

In the embodiment shown in FIG. 13, a close-up view of the landing pad 341 is shown. The landing pad has a round shape, etched on the bottom side of the upper slab 310, and receives, for example in its center, the output of the inlet port 330 as seen in FIG. 16. In the embodiment shown in FIG. 13, the landing pad 341 is etched so as to define a ring shape surrounding the output of the inlet port 330, comprising an outer edge 3411 and an inner edge 3412, the latter forming the outlines of the output of the inlet port 330.

In some embodiments, the landing pad 341 has an external diameter (at the outer edge 3411, in the x/y-axis) ranging from about 0.5 mm to about 2 mm, preferably from about 0.75 mm to about 1.5 mm, more preferably from about 0.9 mm to about 1.25 mm. In some embodiments, the landing pad 341 has an external diameter (at the outer edge 3411, in the x/y-axis) of about 0.5 mm, about 0.6 mm, about 0.7 mm, about 0.8 mm, about 0.9 mm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, about 2 mm. In some embodiments, the landing pad 341 has an external diameter (at the outer edge 3411, in the x/y-axis) of about 1 mm.

In some embodiments, the landing pad 341 has an internal diameter (at the inner edge 3412, in the x/y-axis) ranging from about 0.1 mm to about 1.5 mm, preferably from about 0.25 mm to about 1.25 mm, more preferably from about 0.5 mm to about 1 mm. In some embodiments, the landing pad 341 has an internal diameter (at the inner edge 3412, in the x/y-axis) of about 0.1 mm, about 0.2 mm, about 0.3 mm, about 0.4 mm, about 0.5 mm, about 0.6 mm, about 0.7 mm, about 0.8 mm, about 0.9 mm, about 1 mm, about 1.1 mm, about 1.2 mm, about 1.3 mm, about 1.4 mm, about 1.5 mm. In some embodiments, the landing pad 341 has an internal diameter (at the inner edge 3412, in the x/y-axis) of about 0.8 mm.

In some embodiments, the landing pad 341 has a height (in the z-axis) ranging from about 0.01 mm to about 0.175 mm, preferably from about 0.025 mm to about 0.15 mm, more preferably from about 0.05 mm to about 0.125 mm, even more preferably from about 0.075 mm to about 0.1 mm. In some embodiments, the landing pad 341 has a height (in the z-axis) of about 0.01 mm, about 0.02 mm, about 0.03 mm, about 0.04 mm, about 0.05 mm, about 0.06 mm, about 0.07 mm, about 0.08 mm, about 0.09 mm, about 0.1 mm, about 0.11 mm, about 0.12 mm, about 0.13 mm, about 0.14 mm, about 0.15 mm, about 0.16 mm, about 0.17 mm, about 0.18 mm. In some embodiments, the landing pad 341 has a height (in the z-axis) of about 0.09 mm.

In some embodiments, the landing pad 341 is positioned centrally on the x-axis of the distribution channel 342. Other embodiments where the landing pad 341 is not positioned centrally on the x-axis of the distribution channel 342 are also encompassed.

Figure 14:
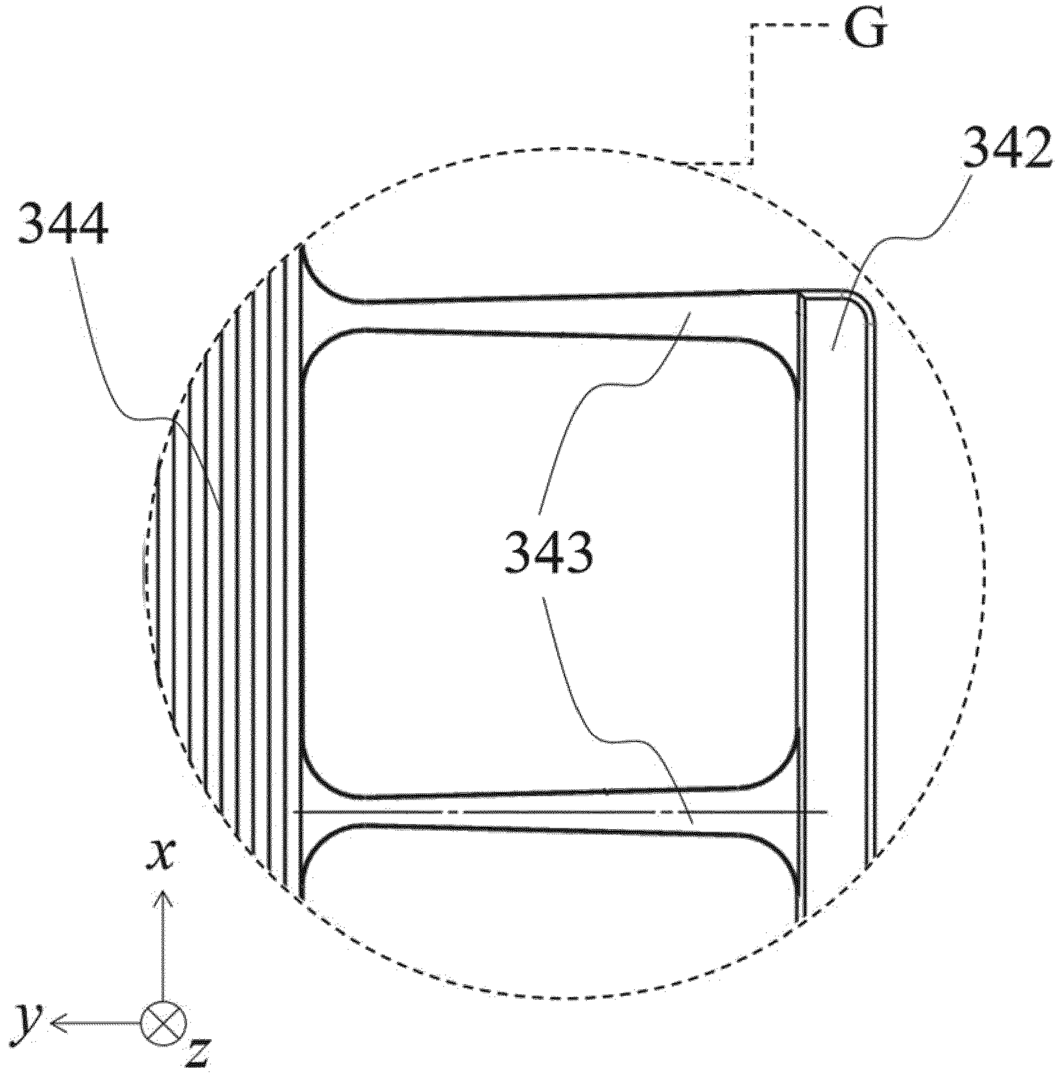
FIG. 14 is a plane bottom view of the injectors 343, depicted in an enlarged fashion from the region indicated at “G” in FIGS. 11-12.

In the embodiment shown in FIG. 14, a close-up view of the longitudinal (in the x-axis) distribution channel 342 connecting the transversal (in the y-axis) injectors 343 is shown.

In some embodiments, the distribution channel 342 has a length (in the x-axis) ranging from about 1 mm to about 50 mm, preferably from about 1 mm to about 25 mm, more preferably from about 1 mm to about 10 mm, even more preferably from about 2.5 mm to about 5 mm. In some embodiments, the distribution channel 342 has a length (in the x-axis) of about 1 mm, about 2 mm, about 3 mm, about 4 mm, about 5 mm, about 6 mm, about 7 mm, about 8 mm, about 9 mm, about 10 mm or more. In some embodiments, the distribution channel 342 has a length (in the x-axis) of about 4 mm.

In some embodiments, the distribution channel 342 has a width (in the y-axis) ranging from about 0.01 mm to about 1 mm, preferably from about 0.025 mm to about 0.75 mm, more preferably from about 0.05 mm to about 0.5 mm, even more preferably from about 0.075 mm to about 0.25 mm. In some embodiments, the distribution channel 342 has a width (in the y-axis) of about 0.01 mm, about 0.025 mm, about 0.05 mm, about 0.075 mm, about 0.1 mm, about 0.25 mm, about 0.5 mm, about 0.75 mm, about 1 mm or more. In some embodiments, the distribution channel 342 has a width (in the y-axis) of about 0.125 mm.

In some embodiments, the distribution channel 342 has a height (in the z-axis) ranging from about 0.01 mm to about 0.175 mm, preferably from about 0.025 mm to about 0.15 mm, more preferably from about 0.05 mm to about 0.125 mm, even more preferably from about 0.075 mm to about 0.1 mm. In some embodiments, the distribution channel 342 has a height (in the z-axis) of about 0.01 mm, about 0.02 mm, about 0.03 mm, about 0.04 mm, about 0.05 mm, about 0.06 mm, about 0.07 mm, about 0.08 mm, about 0.09 mm, about 0.1 mm, about 0.11 mm, about 0.12 mm, about 0.13 mm, about 0.14 mm, about 0.15 mm, about 0.16 mm, about 0.17 mm, about 0.18 mm. In some embodiments, the distribution channel 342 has a height (in the z-axis) of about 0.09 mm.

In some embodiments, the droplet generator 340 comprises at least 1, preferably at least 2, 3, 4, 5, 6, 7, 8, 9, 10 or more injectors 343. In the embodiment shown in FIG. 8, the droplet generator 340 comprises 6 injectors 343.

In some embodiments, the injector 343 has a length (in the y-axis) ranging from about 0.1 mm to about 5 mm, preferably from about 0.25 mm to about 2.5 mm, more preferably from about 0.5 mm to about 1 mm. In some embodiments, the injector 343 has a length (in the y-axis) of about 0.1 mm, about 0.2 mm, about 0.3 mm, about 0.4 mm, about 0.5 mm, about 0.6 mm, about 0.7 mm, about 0.8 mm, about 0.9 mm, about 1 mm, about 1.25 mm, about 1.5 mm, about 1.75 mm, about 2 mm, about 3 mm, about 4 mm, about 5 mm or more. In some embodiments, the injector 343 has a length (in the y-axis) of about 0.8 mm.

In some embodiments, the injector 343 has a width (in the x-axis) ranging from about 0.01 mm to about 0.5 mm, preferably from about 0.02 mm to about 0.25 mm, more preferably from about 0.03 mm to about 0.1 mm, even more preferably from about 0.04 mm to about 0.08 mm. In some embodiments, the injector 343 has a width (in the x-axis) of about 0.01 mm, about 0.02 mm, about 0.03 mm, about 0.04 mm, about 0.05 mm, about 0.06 mm, about 0.07 mm, about 0.08 mm, about 0.09 mm, about 0.1 mm, about 0.2 mm, about 0.3 mm, about 0.4 mm, about 0.5 mm or more. In some embodiments, the injector 343 has a width (in the x-axis) of about 0.075 mm. In some embodiments, the injector 343 has a width (in the x-axis) of about 0.045 mm.

In some embodiments, the injector 343 has a variable width (in the x-axis). As seen on FIG. 14, the width (in the x-axis) of the injector 343 may gradually decrease from the proximal (on the side of the distribution channel 342) to the distal position (on the side of the slopped area 344). In some embodiments, the injector 343 has a variable width (in the x-axis) ranging from about 0.03 mm to about 0.3 mm, preferably from about 0.04 mm to about 0.2 mm, more preferably from about 0.05 mm to about 0.1 mm at the proximal position; and from about 0.01 mm to about 0.2 mm, preferably from about 0.02 mm to about 0.1 mm, more preferably from about 0.03 mm to about 0.08 mm at the distal position. In some embodiments, the injector 343 has a variable width (in the x-axis) of about 0.075 mm at the proximal position and of about 0.045 mm at the distal position.

In some embodiments, the injector 343 has a height (in the z-axis) ranging from about 0.005 mm to about 0.05 mm, preferably from about 0.01 mm to about 0.03 mm, more preferably from about 0.015 mm to about 0.02 mm. In some embodiments, the injector 343 has a height (in the z-axis) of about 0.005 mm, about 0.0075 mm, about 0.01 mm, about 0.011 mm, about 0.012 mm, about 0.013 mm, about 0.014 mm, about 0.015 mm, about 0.016 mm, about 0.017 mm, about 0.018 mm, about 0.019 mm, about 0.02 mm, about 0.025 mm, about 0.03 mm, about 0.035 mm, about 0.04 mm, about 0.045 mm, about 0.05 mm or more. In some embodiments, the injector 343 has a height (in the z-axis) of about 0.018 mm.

Figure 15:
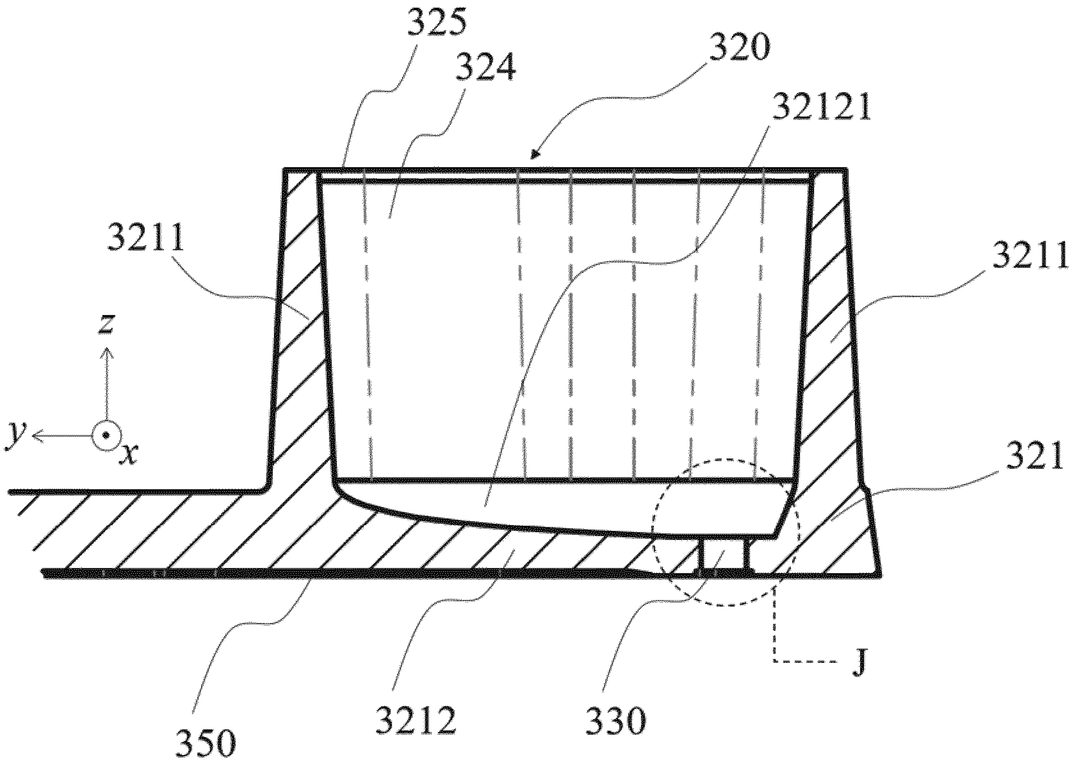
FIG. 15 is a side cross-section view of a part of the microfluidic chip 300 according to plane H-H' in FIG. 5 or 7.

In the embodiment shown in FIG. 15, the operative couple between the loading well 320 and the inlet port 330 is shown. FIG. 16 is a close-up view, showing the inlet port 330 operatively connecting the loading well 320 on the one hand to the landing pad 341 on the other hand. The landing pad 341 further opens on the longitudinal (in the x-axis) distribution channel 342.

Figure 17:
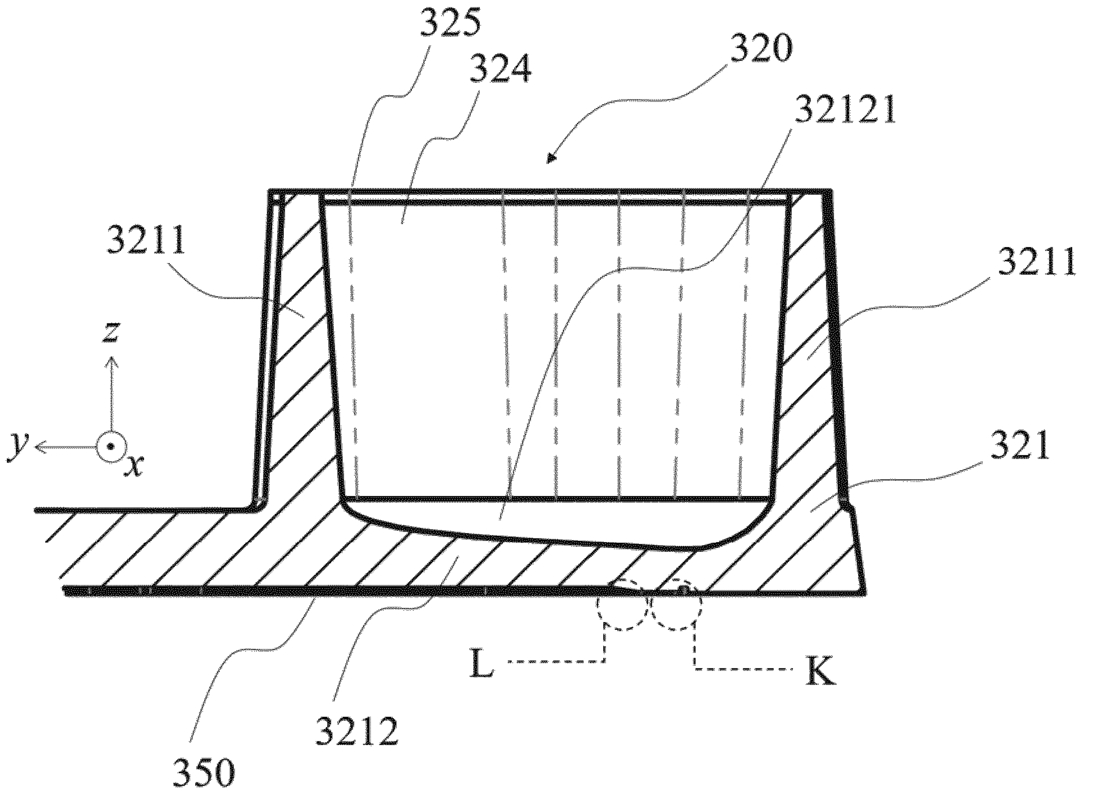
FIG. 17 is a side cross-section view of a part of the microfluidic chip 300 according to plane I-I' in FIG. 5 or 7.
Figure 18:
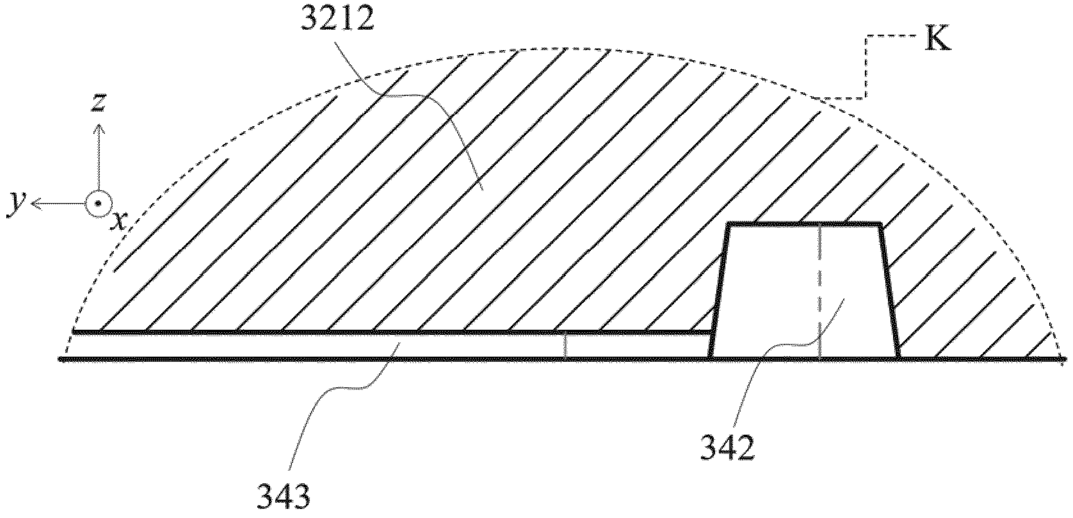
FIG. 18 is a side cross-section view of the distribution channel 342 and injector 343, depicted in an enlarged fashion from the region indicated at “K” in FIG. 17.
Figure 19:
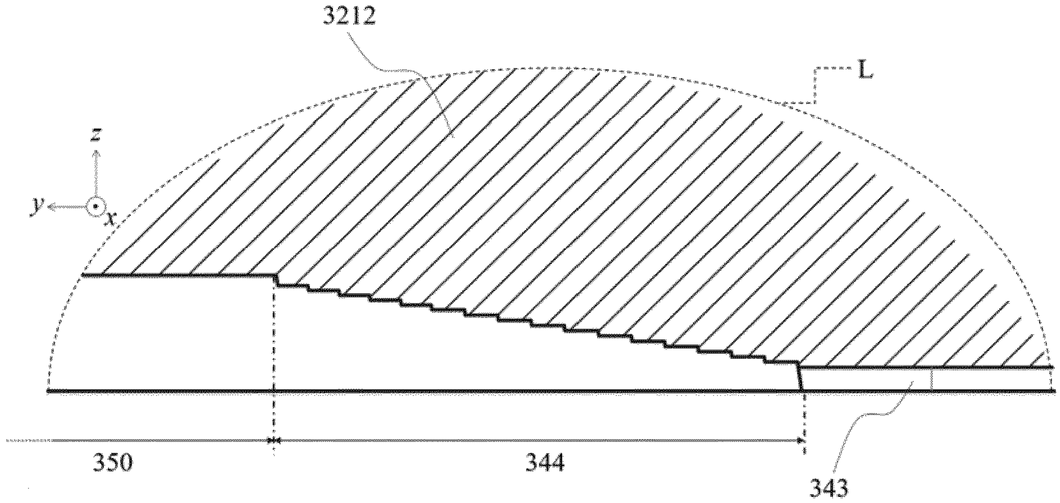
FIG. 19 is a side cross-section view of the injector 343 and slopped area 344, operatively coupled to a droplet chamber 350, depicted in an enlarged fashion from the region indicated at “L” in FIG. 17.

In the embodiment shown in FIG. 17, the position of the droplet generator 340 below the loading well 320 and its operative connection with the droplet chamber 350 is shown. FIG. 18 is a close-up view, showing the longitudinal (in the x-axis) distribution channel 342 opening on injectors 343. FIG. 19 is a close-up view, showing the connection between the injectors 343 and the droplet chamber 350, through the slopped area 344.

In some embodiments, the droplet generator 340 is located below the bottom wall part 3212 of the loading well 320 and is included within said bottom wall part (3212) in projection within the base plane (x/y). In some embodiments, the droplet generator 340 is located below the bottom wall part 3212 of the loading well 320 and is surrounded in projection within the base plane (x/y) by the lateral wall part 3211 of the loading well 320. In some embodiments, the droplet generator 340 is located below the bottom wall part 3212 of the loading well 320 and does not extend beyond the lateral wall part 3211 of the loading well 320 in projection within the base plane (x/y).

In some embodiments, the slopped area 344 has a width (in the x-axis) ranging from about 1 mm to about 50 mm, preferably from about 1 mm to about 25 mm, more preferably from about 1 mm to about 10 mm, even more preferably from about 2 mm to about 7.5 mm, even more preferably from about 4 mm to about 6 mm. In some embodiments, the slopped area 344 has a width (in the x-axis) of about 1 mm, about 2 mm, about 3 mm, about 4 mm, about 5 mm, about 6 mm, about 7 mm, about 8 mm, about 9 mm, about 10 mm or more. In some embodiments, the slopped area 344 has a width (in the x-axis) of about 5 mm.

The width (in the x-axis) of the slopped area 344 is dependent upon the number of injectors 343 in the droplet generator 340. In some embodiments, the slopped area 344 takes up at least the width (in the x-axis) required to operatively couple all the injectors 343, if more than one. The present invention therefore encompasses cases where each injector 343 opens on a single slopped area 344. The present invention however also encompasses cases where each injector 343 opens on one slopped area 344, the several slopped areas being ultimately operatively coupled to the droplet chamber 350.

In some embodiments, the slopped area 344 has a length (in the y-axis) ranging from about 0.1 mm to about 3 mm, preferably from about 0.1 mm to about 2 mm, about 0.1 mm to about 1 mm, about 0.2 mm to about 0.75 mm, more preferably from about 0.3 mm to about 0.5 mm. In some embodiments, the slopped area 344 has a length (in the y-axis) of about 0.1 mm, about 0.2 mm, about 0.3 mm, about 0.4 mm, about 0.5 mm, about 0.6 mm, about 0.7 mm, about 0.8 mm, about 0.9 mm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, about 2 mm, about 2.1 mm, about 2.2 mm, about 2.3 mm, about 2.4 mm, about 2.5 mm, about 2.6 mm, about 2.7 mm, about 2.8 mm, about 2.9 mm, about 3 mm or more. In some embodiments, the slopped area 344 has a length (in the y-axis) of about 0.4 mm.

In some embodiments, the slopped area 344 has a variable height (in the z-axis), i.e., the upper and lower surfaces of the slopped area diverge relative to each other in at least one direction, for example in the y-axis.

As seen on FIG. 19, the height (in the z-axis) of the slopped area 344 may gradually increase from the proximal (on the side of the injector 343) to the distal position (on the side of the droplet chamber 350). In some embodiments, the slopped area 344 has a variable height (in the z-axis) ranging from about 0.005 mm to about 0.05 mm, preferably from about 0.01 mm to about 0.03 mm, more preferably from about 0.015 mm to about 0.02 mm at the proximal position; and from about 0.02 mm to about 0.5 mm, preferably from about 0.04 mm to about 0.2 mm, more preferably from about 0.06 mm to about 0.15 mm, even more preferably from about 0.08 mm to about 0.1 mm at the distal position. In some embodiments, the slopped area 344 has a variable height (in the z-axis) of about 0.018 mm at the proximal position and of about 0.09 mm at the distal position.

In some embodiments, the slopped area 344 has a variable height with a slope value ranging from about 1%±5% to about 30%±5%, preferably from about 5%±2.5% to about 25%±2.5%, more preferably from about 10%±2% to about 20%±2%, even more preferably from about 14%±1% to about 18%±1% over the length (in the y-axis) of the slopped area 344. In some embodiments, the slopped area 344 has a variable height with a slope value ranging from about 1%±0.25% to about 30%±0.25%, preferably from about 5%±0.25% to about 25%±0.25%, more preferably from about 10%±0.25% to about 20%±0.25%, even more preferably from about 14%±0.25% to about 18%±0.25% over the length (in the y-axis) of the slopped area 344. In some embodiments, the slopped area 344 has a variable height with a slope value of about 1%±0.5%, about 2%±0.5%, about 3%±0.5%, about 4%±0.5%, about 5%±0.5%, about 6%±0.5%, about 7%±0.5%, about 8%±0.5%, about 9%±0.5%, about 10%±0.5%, about 11%±0.5%, about 12%=0.5%, about 13%±0.5%, about 14%+0.5%, about 15%±0.5%, about 16%±0.5%, about 17%±0.5%, about 18%±0.5%, about 19%±0.5%, about 20%±0.5%, about 21%±0.5%, about 22%±0.5%, about 23%±0.5%, about 24%±0.5%, about 25%±0.5%, about 26%±0.5%, about 27%±0.5%, about 28%+0.5%, about 29%±0.5%, about 30%±0.5% over the length (in the y-axis) of the slopped area 344. In some embodiments, the slopped area 344 has a variable height with a slope value of about 1%=0.25%, about 2%±0.25%, about 3%±0.25%, about 4%±0.25%, about 5%+0.25%, about 6%±0.25%, about 7%±0.25%, about 8%±0.25%, about 9%±0.25%, about 10%±0.25%, about 11%±0.25%, about 12%±0.25%, about 13%±0.25%, about 14%+0.25%, about 15%±0.25%, about 16%±0.25%, about 17%±0.25%, about 18%±0.25%, about 19%±0.25%, about 20%±0.25%, about 21%=0.25%, about 22%±0.25%, about 23%±0.25%, about 24%±0.25%, about 25%±0.25%, about 26%±0.25%, about 27%+0.25%, about 28%±0.25%, about 29%±0.25%, about 30%±0.25% over the length (in the y-axis) of the slopped area 344. In some embodiments, the slopped area 344 has a variable height with a slope value of about 16%±0.5%. In some embodiments, the slopped area 344 has a variable height with a slope value of about 16%±0.25%.

In some embodiments, the slope of the slopped area 344 is smooth.

In some embodiments, the slope of the slopped area 344 comprises steps. In some embodiments, the slope of the slopped area 344 comprises at least 2, preferably at least 3, 4, 5, 6, 7, 8, 9, 10, 11, 12, 13, 14, 15, 16, 17, 18, 19, 20, 21, 22, 23, 24, 25, 26, 27, 28, 29, 30 or more steps. In the embodiment shown in FIG. 19, the slope of the slopped area 344 comprises 16 steps. In some embodiments, the steps of the slope of the slopped area 344 have a length (in the y-axis) ranging from about 0.001 mm to about 0.1 mm, preferably from about 0.005 mm to about 0.075 mm, more preferably from about 0.01 mm to about 0.05 mm, even more preferably from 0.02 mm to about 0.03 mm. In some embodiments, the steps of the slope of the slopped area 344 have a length (in the y-axis) of about 0.001 mm, about 0.005 mm, about 0.01 mm, about 0.02 mm, about 0.03 mm, about 0.04 mm, about 0.05 mm, about 0.06 mm, about 0.07 mm, about 0.08 mm, about 0.09 mm, about 0.1 mm or more. In some embodiments, the steps of the slope of the slopped area 344 have a length (in the y-axis) of about 0.025 mm.

Similar droplet generators are disclosed in patent applications US20130078164 and US20180037934, which are hereby incorporated by reference in their entirety. The embodiments disclosed herein, in particular the dimensions of the various elements of the droplet generator 340, are not limitative, and it is well known to the skilled artisan that these dimensions, in particular the dimensions of the injector 343, may be modified to obtain smaller or larger droplets 314.

As seen on FIG. 11 and FIG. 19, the droplet generator 340 opens, from the slopped area 344, on a droplet chamber 350, configured to or suitable for storing droplets 314.

In some embodiments, the droplet chamber 350 has a length (in the y-axis) ranging from about 1 mm to about 100 mm, preferably from about 2.5 mm to about 75 mm, more preferably from about 5 mm to about 50 mm, even more preferably from about 7.5 mm to about 25 mm, even more preferably from about 10 mm to about 18 mm. In some embodiments, the droplet chamber 350 has a length (in the y-axis) of about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 30 mm, about 35 mm, about 40 mm, about 45 mm, about 50 mm, about 60 mm, about 70 mm, about 80 mm, about 90 mm, about 100 mm or more. In some embodiments, the droplet chamber 350 has a length (in the y-axis) of about 14.3 mm.

In some embodiments, the droplet chamber 350 has a width (in the x-axis) ranging from about 1 mm to about 80 mm, preferably from about 2 mm to about 65 mm, more preferably from about 3 mm to about 50 mm, even more preferably from about 4 mm to about 40 mm, even more preferably from about 5 mm to about 25 mm, even more preferably from about 6 mm to about 15 mm, even more preferably from about 7 mm to about 10 mm. In some embodiments, the droplet chamber 350 has a width (in the x-axis) of about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 30 mm, about 35 mm, about 40 mm, about 45 mm, about 50 mm, about 60 mm, about 70 mm, about 80 mm or more. In some embodiments, the droplet chamber 350 has a width (in the x-axis) of about 8.5 mm.

In the embodiment shown in FIG. 11, the droplet chamber 350 has a L-shape. Such shape is necessary in the conformation shown in FIG. 11 to accommodate the air tank 360. The present invention however encompasses droplet chambers 350 having any suitable shape, in particular in the x-axis and y-axis, depending on the available surface on the microfluidic chip 300, and number of microfluidic units on the microfluidic chip 300.

In some embodiments, the droplet chamber 350 has a height (in the z-axis) ranging from about 0.01 mm to about 0.175 mm, preferably from about 0.025 mm to about 0.15 mm, more preferably from about 0.05 mm to about 0.125 mm, even more preferably from about 0.075 mm to about 0.1 mm. In some embodiments, the droplet chamber 350 has a height (in the z-axis) of about 0.01 mm, about 0.02 mm, about 0.03 mm, about 0.04 mm, about 0.05 mm, about 0.06 mm, about 0.07 mm, about 0.08 mm, about 0.09 mm, about 0.1 mm, about 0.11 mm, about 0.12 mm, about 0.13 mm, about 0.14 mm, about 0.15 mm, about 0.16 mm, about 0.17 mm, about 0.18 mm or more. In some embodiments, the droplet chamber 350 has a height (in the z-axis) of about 0.09 mm.

In some embodiments, the droplet chamber 350 is configured to or suitable for storing a population of droplets 314. For example, a population of droplets 314 ranging from about 1'000 to about 5'000'000 droplets or more may be stored in the droplet chamber 350. The number of droplets 314 stored in the droplet chamber 350 depends of the dimensions of the droplet chamber 350 but also the diameter of the droplets 314. In some embodiments, a population of droplets 314 ranging from about 10'000 to about 25'000 droplets 314 may be stored in the droplet chamber 350, such as about 15'000 or about 20'000 droplets 314.

In some embodiments, the droplet chamber 350 is not a droplet channel, i.e., the droplet chamber 350 has at least two dimensions, in particular the length (in the y-axis) and the width (in the x-axis), greater than at least twice the diameter of a droplet 314, such as twice, three times, four times, five times, ten times, fifty times, a hundred times, five hundred times, a thousand times, five thousand times or even more.

In the embodiment shown in FIG. 7 and FIG. 11, the droplet chamber 350 may comprise a chamber pillar 370.

In some embodiments, the chamber pillar 370 has not a cylindrical shape in cross-section parallel to the base plane (x/y).

In some embodiments, the chamber pillar 370 has a rhombus shape in cross-section parallel to the base plane (x/y). In some embodiments, the chamber pillar 370 has a lozenge or diamond shape in cross-section parallel to the base plane (x/y).

Figure 23:
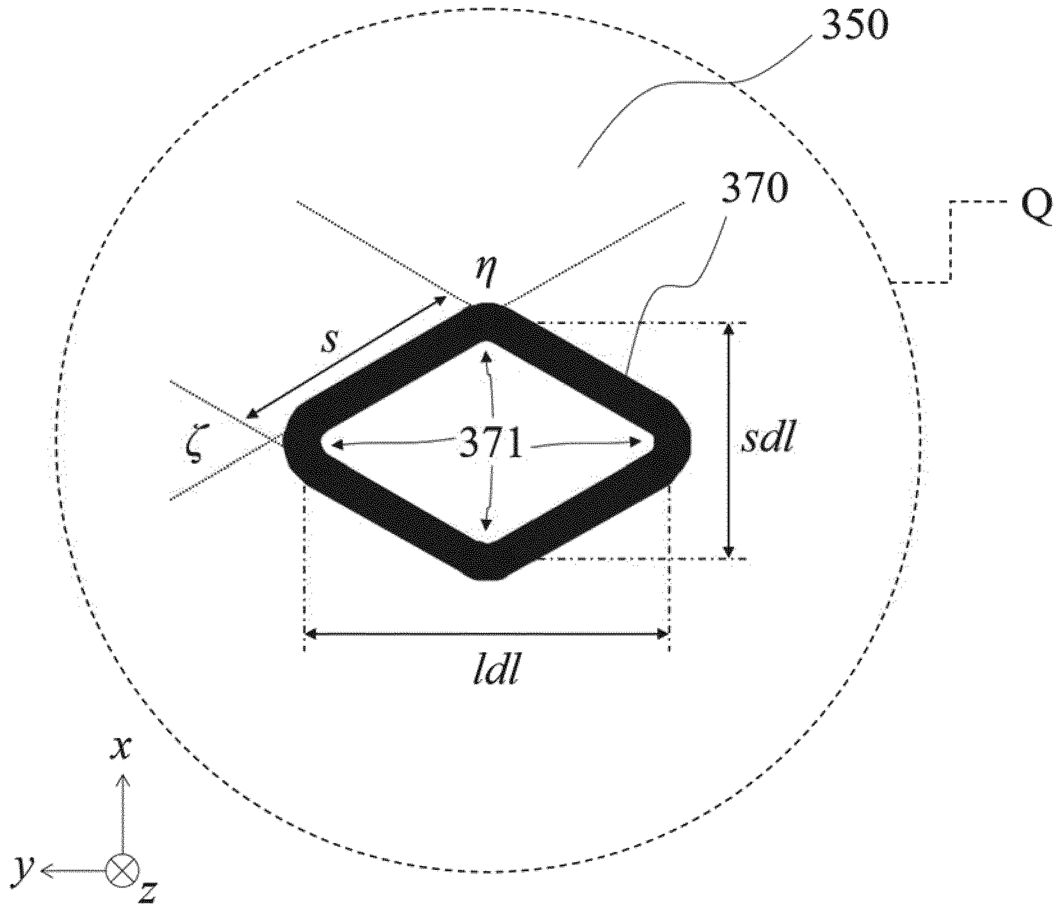
FIG. 23 is a bottom view of the chamber pillar 370, depicted in an enlarged fashion from the region indicated at “Q” in FIG. 11.

As illustrated on FIG. 23, a lozenge or diamond can be defined by four sides of same or equivalent length s, a long diagonal of length ldl, a small diagonal of length sdl (the two latter forming a right angle at their intersection), two opposite acute angles $\zeta$ and two opposite obtuse angles $\eta$, wherein $\zeta+\eta\cong 180°$ and $sdl=2\times s\times \sin \zeta/2$.

In some embodiments, the length of the sides s of the chamber pillar 370 is an integer multiple of the diameter of a droplet 314 in the droplet chamber 350, such as about 2 times the diameter, 3 times, 4 times, 5 times, 6 times, 7 times, 8 times, 9 times, 10 times, 15 times, 20 times, 25 times, 30 times, 35 times, 40 times or more the diameter of a droplet 314 in the droplet chamber 350.

In some embodiments, the long diagonal (in the y-axis) of the chamber pillar 370 has a length ldl ranging from about 0.1 mm to about 5 mm, preferably from about 0.5 mm to about 4 mm, more preferably from about 1 mm to about 3 mm, even more preferably from about 1.5 mm to about 2 mm. In some embodiments, the long diagonal (in the y-axis) of the chamber pillar 370 has a length ldl of about 0.1 mm, 0.2 mm, 0.3 mm, 0.4 mm, about 0.5 mm, about 0.6 mm, about 0.7 mm, about 0.8 mm, about 0.9 mm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, about 2 mm, about 2.1 mm, about 2.2 mm, about 2.3 mm, about 2.4 mm, about 2.5 mm, about 2.6 mm, about 2.7 mm, about 2.8 mm, about 2.9 mm, about 3 mm, about 3.5 mm, about 4 mm, about 4.5 mm, about 5 mm or more. In some embodiments, the long diagonal (in the y-axis) of the chamber pillar 370 has a length ldl of about 1.8 mm.

In some embodiments, the acute angle $\zeta$ of the chamber pillar 370 has a measure ranging from about 10° to about 50°, preferably from about 20° to about 40°, more preferably from about 25° to about 35°. In some embodiments, the acute angle $\zeta$ of the chamber pillar 370 has a measure ranging from about 40° to about 80°, preferably from about 50° to about 70°, more preferably from about 55° to about 65°. In some embodiments, the acute angle $\zeta$ of the chamber pillar 370 has a measure of about 10°, about 15°, about 20°, about 25°, about 30°, about 35°, about 40°, about 45°, about 50°, about 55°, about 60°, about 65°, about 70°, about 75°, about 80°, about 85° or more. In some embodiments, the acute angle $\zeta$ of the chamber pillar 370 has a measure of about 30°. In some embodiments, the acute angle $\zeta$ of the chamber pillar 370 has a measure of about 60°.

In some embodiments, at least one, in particular at least two, three, or even the four apexes 371 of the chamber pillar 370 are sharp-edged.

In some embodiments, at least one, in particular at least two, three, or even the four apexes 371 of the chamber pillar 370 are round-edged. For example, such as in the embodiment shown in FIG. 23, the four apexes 371 of the chamber pillar 370 may be round-edged, each apex 371 having a curvature radius ranging from about 0.01 mm to about 0.5 mm, preferably from about 0.05 mm to about 0.4 mm, more preferably from about 0.1 mm to about 0.3 mm, even more preferably from about 0.15 mm to about 0.2 mm. In some embodiments, each apex 371 of the chamber pillar 370 has a curvature radius of about 0.01 mm, about 0.05 mm, about 0.1 mm, about 0.125 mm, about 0.15 mm, about 0.175 mm, about 0.2 mm, about 0.225 mm, about 0.25 mm, about 0.3 mm, about 0.35 mm, about 0.4 mm, about 0.45 mm, about 0.5 mm or more. In some embodiments, each apex 371 of the chamber pillar 370 has a curvature radius of about 0.175 mm.

In some embodiments, the upper slab 310 of the microfluidic chip 300 forms a base supporting at least one air tank 360. In its operation mode, the microfluidic chip 300 comprises a lower slab 311 (as seen on FIG. 6) such that the air tank 360 is a closed cavity 364.

In the embodiment shown in FIG. 11, the air tank 360 is operatively coupled to the droplet chamber 350, through an output channel 361.

In alternative embodiments, the air tank 360 is operatively coupled to the droplet generator 340, in particular, to the slopped area 344, without contacting the droplet chamber 350.

Figure 20:
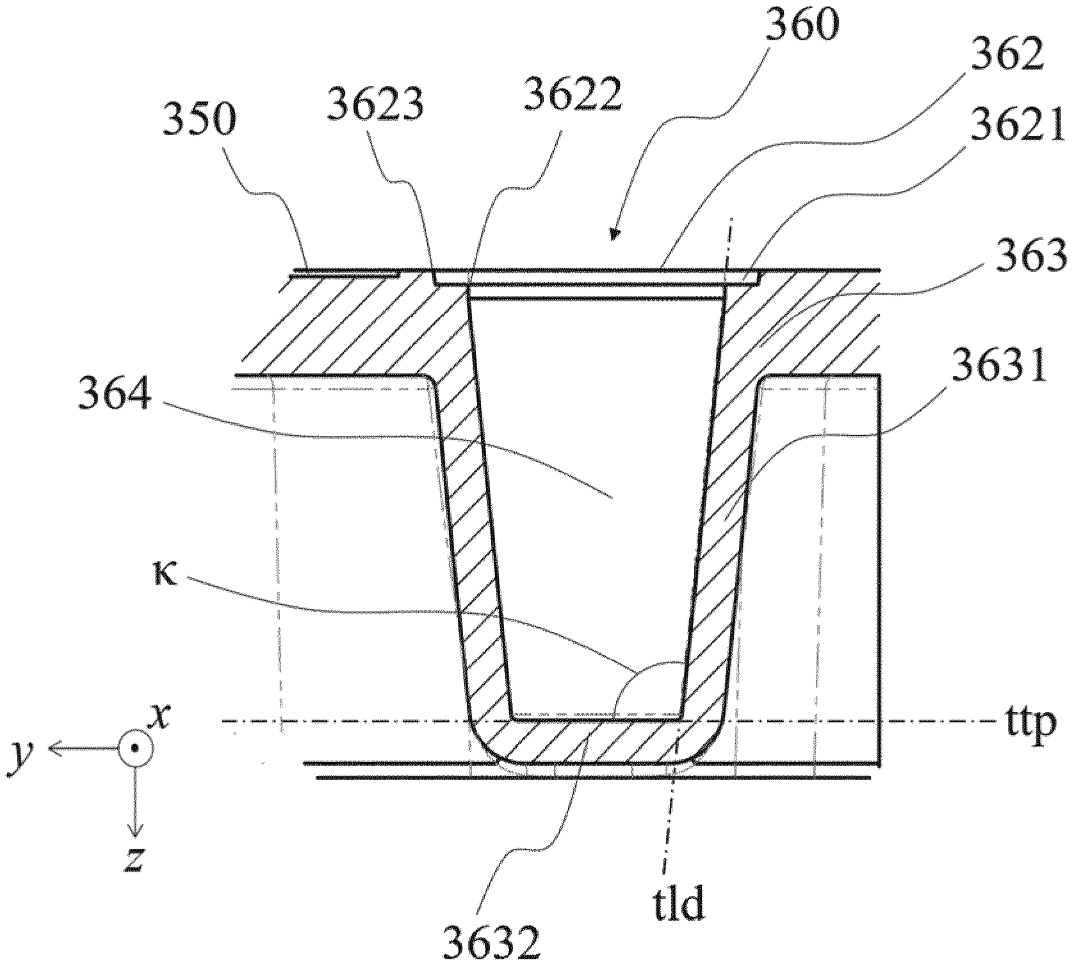
FIG. 20 is a side cross-section view of the air tank 360, depicted in an enlarged fashion and taken according to plane M-M' in FIG. 11.
Figure 21:
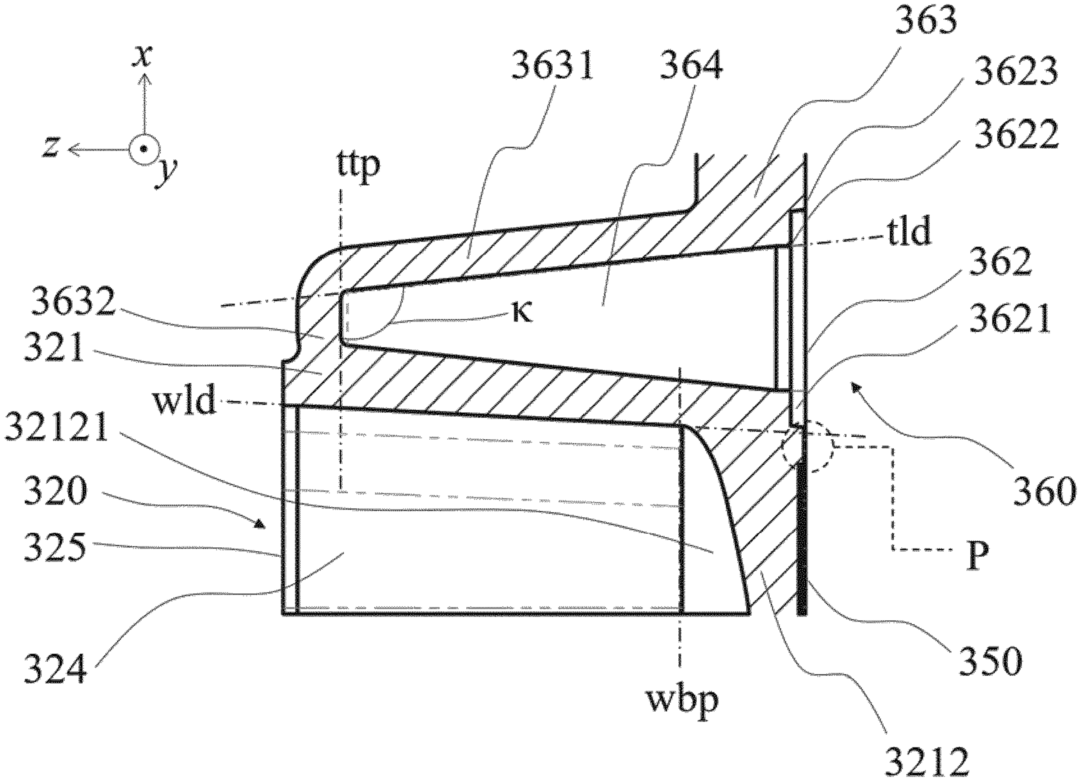
FIG. 21 is a side cross-section view of the air tank 360, depicted in an enlarged fashion and taken according to plane N-N' in FIG. 11.
Figure 22:
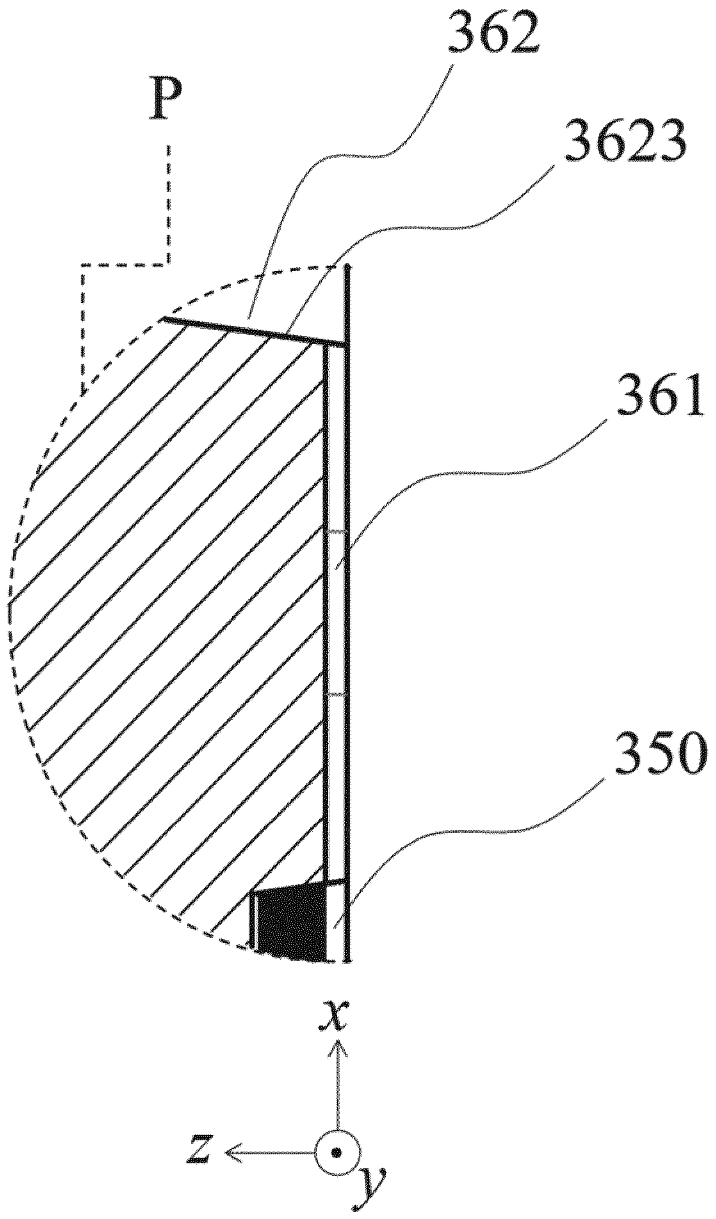
FIG. 22 is a side cross-section view of the output channel 361 operatively coupling the air tank 360 and the droplet chamber 350, depicted in an enlarged fashion from the region indicated at “P” in FIG. 21.

In the embodiment shown in FIGS. 20-21, the air tank 360 is bounded by a wall 363 comprising a bottom wall part 3632 coupled to a lateral wall part 3631.

In some embodiments, the bottom wall part 3632 globally extends according to a tank top plane ttp substantially parallel to the base plane (x/y) (also seen on FIG. 8).

In some embodiments, the lateral wall part 3631 extends along a tank lateral direction tld (in the z-axis) disposed according to an angle $\kappa$ relatively to the tank top plane ttp, as seen on FIGS. 8 and 20-21. In some embodiments, the angle $\kappa$ has a value ranging from about 75° to about 120°, preferably from about 85° to about 110°, more preferably from about 90° to about 105°. In some embodiments, the angle $\kappa$ has a value of about 75°, about 80°, about 85°, about 90°, about 95, about 100°, about 105° or more. In some embodiments, the angle $\kappa$ has a value of about 98°.

As seen in the embodiment of FIG. 8, the wall 363 of the air tank 360 and the wall 321 of the loading 320 well may share a common section. In particular, the lateral wall part 3631 of the air tank 360 and the lateral wall part 3211 of the loading well 320 may share a common section.

triangle having a base 362, a truncated apex formed by the bottom wall part 3632, and a pair of equal sides formed by the lateral wall part 3631, in cross-section perpendicular to the base plane (x/y).

In some embodiments, the air tank 360 has a general shape of a truncated pyramid (such as, e.g., a truncated pyramid with a with a square base, a rectangle base, a rhombus base, a lozenge base, a diamond base, a circle base [i.e., a truncated cone] and the like) having a base 362, a truncated apex formed by the bottom wall part 3632, and four sides formed by the lateral wall part 3631, in cross-section perpendicular to the base plane (x/y).

In some embodiments, the air tank 360 has a length (in the y-axis) at the base 362 level ranging from about 0.1 mm to about 10 mm, preferably from about 0.5 mm to about 7.5 mm, more preferably from about 1 mm to about 5 mm, even more preferably from about 3 mm to about 4 mm. In some embodiments, the air tank 360 has a length (in the y-axis) at the base 362 level of about 0.1 mm, about 0.25 mm, about 0.5 mm, about 0.75 mm, about 1 mm, about 1.25 mm, about 1.5 mm, about 1.75 mm, about 2 mm, about 2.25 mm, about 2.5 mm, about 2.75 mm, about 3 mm, about 3.25 mm, about 3.5 mm, about 3.75 mm, about 4 mm, about 4.25 mm, about 4.5 mm, about 4.75 mm, about 5 mm, about 5.5 mm, about 6 mm, about 7 mm, about 8 mm, about 9 mm, about 10 mm or more. In some embodiments, the air tank 360 has a length (in the y-axis) at the base 362 level of about 3.7 mm.

In some embodiments, the air tank 360 has a length (in the y-axis) at the truncated apex level ranging from about 0.1 mm to about 10 mm, preferably from about 0.5 mm to about 7.5 mm, more preferably from about 1 mm to about 5 mm, even more preferably from about 1.5 mm to about 2.5 mm. In some embodiments, the air tank 360 has a length (in the y-axis) at the truncated apex level of about 0.1 mm, about 0.25 mm, about 0.5 mm, about 0.75 mm, about 1 mm, about 1.25 mm, about 1.5 mm, about 1.75 mm, about 2 mm, about 2.25 mm, about 2.5 mm, about 2.75 mm, about 3 mm, about 3.25 mm, about 3.5 mm, about 3.75 mm, about 4 mm, about 4.25 mm, about 4.5 mm, about 4.75 mm, about 5 mm, about 5.5 mm, about 6 mm, about 7 mm, about 8 mm, about 9 mm, about 10 mm or more. In some embodiments, the air tank 360 has a length (in the y-axis) at the truncated apex level of about 2.1 mm.

In some embodiments, the air tank 360 has a width (in the x-axis) at the base 362 level ranging from about 0.1 mm to about 5 mm, preferably from about 0.5 mm to about 4 mm, more preferably from about 1 mm to about 3 mm, even more preferably from about 1.5 mm to about 2.5 mm. In some embodiments, the air tank 360 has a width (in the x-axis) at the base 362 level of about 0.1 mm, about 0.25 mm, about 0.5 mm, about 0.75 mm, about 1 mm, about 1.25 mm, about 1.5 mm, about 1.75 mm, about 2 mm, about 2.25 mm, about 2.5 mm, about 2.75 mm, about 3 mm, about 3.25 mm, about 3.5 mm, about 3.75 mm, about 4 mm, about 4.25 mm, about 4.5 mm, about 4.75 mm, about 5 mm or more. In some embodiments, the air tank 360 has a width (in the x-axis) at the base 362 level of about 2 mm.

In some embodiments, the air tank 360 has a width (in the x-axis) at the truncated apex ranging from about 0.1 mm to about 5 mm, preferably from about 0.2 mm to about 2.5 mm, more preferably from about 0.3 mm to about 1 mm, even more preferably from about 0.4 mm to about 0.75 mm. In some embodiments, the air tank 360 has a width (in the x-axis) at the truncated apex of about 0.1 mm, about 0.2 mm, about 0.3 mm, about 0.4 mm, about 0.5 mm, about 0.6 mm, about 0.7 mm, about 0.8 mm, about 0.9 mm, about 1 mm, about 1.25 mm, about 1.5 mm, about 1.75 mm, about 2 mm, about 2.5 mm, about 3 mm, about 3.5 mm, about 4 mm, about 4.5 mm, about 5 mm or more. In some embodiments, the air tank 360 has a width (in the x-axis) at the truncated apex of about 0.5 mm.

In some embodiments, the air tank 360 has a depth (in the z-axis) from the base 362 to the truncated apex ranging from about 1 mm to about 15 mm, preferably from about 2 mm to about 12 mm, more preferably from about 3 mm to about 10 mm, even more preferably from about 4 mm to about 8 mm, even more preferably from about 5 mm to about 7 mm. In some embodiments, the air tank 360 has a depth (in the z-axis) from the base 362 to the truncated apex of about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm or more. In some embodiments, the air tank 360 has a depth (in the z-axis) from the base 362 to the truncated apex of about 6.4 mm.

In some embodiments, the base 362 is crowned with a groove 3621 running around the base 362. As seen on FIGS. 20-21, the groove 3621 defines an inner edge 3622 and an outer edge 3623.

In some embodiments, the groove 3621 has a width (from the inner edge 3622 to the outer edge 3623) ranging from about 0.05 mm to about 3 mm, preferably from about 0.1 mm to about 2 mm, more preferably from about 0.25 mm to about 1 mm, even more preferably from about 0.25 mm to about 0.75 mm. In some embodiments, the groove 3621 has a width (from the inner edge 3622 to the outer edge 3623) of about 0.01 mm, about 0.05 mm, about 0.1 mm, about 0.2 mm, about 0.3 mm, about 0.4 mm, about 0.5 mm, about 0.6 mm, about 0.7 mm, about 0.8 mm, about 0.9 mm, about 1 mm, about 1.25 mm, about 1.5 mm, about 1.75 mm, about 2 mm, about 2.5 mm, about 3 mm or more. In some embodiments, the groove 3621 has a width (from the inner edge 3622 to the outer edge 3623) of about 0.5 mm.

In some embodiments, the groove 3621 has a depth (in the z-axis) ranging from about 0.01 mm to about 0.5 mm, preferably from about 0.05 mm to about 0.4 mm, more preferably from about 0.1 mm to about 0.3 mm, even more preferably from about 0.15 mm to about 0.25 mm. In some embodiments, the groove 3621 has a depth (in the z-axis) of about 0.01 mm, about 0.05 mm, about 0.1 mm, about 0.125 mm, about 0.15 mm, about 0.175 mm, about 0.2 mm, about 0.225 mm, about 0.25 mm, about 0.3 mm, about 0.35 mm, about 0.4 mm, about 0.45 mm, about 0.5 mm or more. In some embodiments, the groove 3621 has a depth (in the z-axis) of about 0.2 mm.

In some embodiments, the air tank 360 has a volume (including the groove 3621) ranging from about 5 μL to about 60 μL, preferably from about 10 μL to about 50 μL, more preferably from about 15 μL to about 45 μL, even more preferably from about 20 μL to about 40 μL, even more preferably from about 25 μL to about 35 μL. In some embodiments, the air tank 360 has a volume (including the groove 3621) of about 5 μL, about 10 μL, about 15 μL, about 20 μL, about 25 μL, about 30 μL, about 35 μL, about 40 μL, about 45 μL, about 50 μL, about 55 μL, about 60 μL or more. In some embodiments, the air tank 360 has a volume (including the groove 3621) of about 30 μL.

In some embodiments, the air tank 360 has a volume (including the groove 3621) larger than the volume of a drop of sample 313, such as at least about 1% larger, about 5% larger, about 10% larger, about 50% larger, about 100% larger, about 200% larger, about 300% larger, about 400% larger, about 500% larger or more.

In some embodiments, the air tank 360 has a volume (including the groove 3621) larger than the volume of a population of droplets 314 stored in the droplet chamber 350, such as at least about 1% larger, about 5% larger, about 10% larger, about 50% larger, about 100% larger, about 200% larger, about 300% larger, about 400% larger, about 500% larger, about 600% larger or more.

In some embodiments, the output channel 361 may be accommodated in the lateral wall part 3631 or in the bottom wall part 3632 of the wall 363, preferably in the lateral wall part 3631. In some embodiments, the output channel 361 is accommodated at the end of the lateral wall part 3631 towards the base of the upper slab 310. In some embodiments, the output channel 361 is accommodated at the end of the lateral wall part 3631, in the groove 3621.

In some embodiments, the output channel 361 has a length (in the x-axis) ranging from about 0.1 mm to about 5 mm, preferably from about 0.2 mm to about 2.5 mm, more preferably from about 0.3 mm to about 1 mm, even more preferably from about 0.4 mm to about 0.75 mm. In some embodiments, the output channel 361 has a length (in the x-axis) of about 0.1 mm, about 0.2 mm, about 0.3 mm, about 0.4 mm, about 0.5 mm, about 0.6 mm, about 0.7 mm, about 0.8 mm, about 0.9 mm, about 1 mm, about 1.25 mm, about 1.5 mm, about 1.75 mm, about 2 mm, about 2.5 mm, about 3 mm, about 3.5 mm, about 4 mm, about 4.5 mm, about 5 mm or more. In some embodiments, the output channel 361 has a length (in the x-axis) of about 0.5 mm In some embodiments, the output channel 361 has a width (in the y-axis) ranging from about 0.01 mm to about 1 mm, preferably from about 0.025 mm to about 0.75 mm, more preferably from about 0.05 mm to about 0.5 mm, even more preferably from about 0.075 mm to about 0.25 mm. In some embodiments, the output channel 361 has a width (in the y-axis) of about 0.01 mm, about 0.05 mm, about 0.075 mm, about 0.8 mm, about 0.9 mm, about 0.1 mm, about 0.2 mm, about 0.3 mm, about 0.4 mm, about 0.5 mm, about 0.75 mm, about 1 mm or more. In some embodiments, the output channel 361 has a width (in the y-axis) of about 0.12 mm.

In some embodiments, the output channel 361 has a height (in the z-axis) ranging from about 0.005 mm to about 0.2 mm, preferably from about 0.01 mm to about 0.1 mm, more preferably from about 0.01 mm to about 0.05 mm, even more preferably from about 0.01 mm to about 0.03 mm, even more preferably from about 0.015 mm to about 0.025 mm. In some embodiments, the output channel 361 has a height (in the z-axis) of about 0.005 mm, about 0.0075 mm, about 0.01 mm, about 0.011 mm, about 0.012 mm, about 0.013 mm, about 0.014 mm, about 0.015 mm, about 0.016 mm, about 0.017 mm, about 0.018 mm, about 0.019 mm, about 0.02 mm, about 0.025 mm, about 0.03 mm, about 0.035 mm, about 0.04 mm, about 0.045 mm, about 0.05 mm or more. In some embodiments, the output channel 361 has a height (in the z-axis) of about 0.02 mm.

In some embodiments, the width (in the y-axis) and/or the height (in the z-axis) of the output channel 361 is smaller than the diameter of a droplet 314. In some embodiments, the output channel 361 has a width (in the y-axis), i.e., in a plane parallel to the direction of continuous phase 312 flow, at least greater than about once the diameter of a droplet 314, preferably at least greater than about twice, about three times, about four times, about five times, about ten times, about fifteen times, about twenty times or more the diameter of a droplet 314. In some embodiments, the output channel 361 has a height (in the z-axis), i.e., in a plane perpendicular to the direction of continuous phase 312 flow, at least smaller than about once the diameter of a droplet 314, preferably at least smaller than about 0.75 times, about 0.5 times, about 0.25 times, about 0.1 times, about 0.01 times or less the diameter of a droplet 314.

In some embodiments, the minimal distance between the output channel 361 and the droplet generator 340 is at most about 50% of the largest dimension in the base plane (x/y) of the droplet chamber 350, preferably at most about 40%, about 35%, about 30%, about 25%, about 20%, about 15%, about 10% or less. In some embodiments, the minimal distance between the output channel 361 and the droplet generator 340 is at most about 50% of the smallest dimension in the base plane (x/y) of the droplet chamber 350, preferably at most about 40%, about 35%, about 30%, about 25%, about 20%, about 15%, about 10% or less. In some embodiments, the minimal distance between the output channel 361 and the droplet generator 340 is null, i.e., the output channel 361 and the droplet generator 340 are in direct contiguity.

In some embodiments, the minimal surface of the droplet chamber 350 in the base plane (x/y) covered between an output channel 361, a droplet generator 340 and a corner of the droplet chamber 350, preferably the closest corner of the droplet chamber 350 with respect to the output channel 361, is of at most 50% of the droplet chamber 350, preferably at most about 40%, about 35%, about 30%, about 25%, about 20%, about 15%, about 10%, about 5% or less.

In some embodiments, a straight line between an output channel 361 and a droplet generator 340 divides the droplet chamber 350 into two unequal surfaces. In this embodiment, the ratio between the smallest and the largest area of the two unequal surfaces is at most of 1:2, preferably at most of 1:3, 1:4, 1:5, 1:6, 1:7, 1:8, 1:9, 1:10, 1:15, 1:20, 1:25, 1:50, 1:100 or less.

Exemplary Operations

This section describes exemplary operations of the means, devices and systems disclosed hereinabove.

FIGS. 24-32 schematically represent exemplary operations of the loading well 320 seen on FIGS. 8-10.

The loading well 320 is configured to reduce the dead volume of a drop of sample to be loaded in the microfluidic chip 300. Typically, in a biphasic microfluidic chip, a continuous phase 312 is loaded first and fills at least partially the microfluidic network (e.g., in the presence of an air tank 360, the microfluidic chip 300 is only partially filled with the continuous phase 312 and the air tank 360 is globally filled with air), before placing a drop of dispersed phase (typically, a sample 313) in the loading well 320, at the continuous phase/air interface. Moving the sample 313 to a defined location within the loading well 320 and trapping it at said defined location is required to perform a reproducible loading of the sample into the microfluidic network, while reducing the dead volume of the sample upon loading. In some embodiments, said defined location is in close proximity with the inlet port 330 on at least one axis. In another embodiment, said defined location is in close proximity with the inlet port 330 on at least two axes. In yet another embodiment, said defined location is in close proximity with the inlet port 330 on three axes.

By "in close proximity", it is meant not further away than about once the diameter of a drop of sample, preferably not further away than about 0.9, about 0.8, about 0.7, about 0.6, about 0.5, about 0.4, about 0.3, about 0.2, about 0.1 times the diameter of a drop of sample.

In the embodiment shown in FIGS. 8-10, the loading well 320 aims thus at trapping a drop of sample 313 in a defined location and/or moving a drop of sample 313 to a defined position within said loading well 320, in close proximity with the inlet port 330, regardless of the location within the loading well 320 where the drop of sample 313 is deposited.

Figure 24:
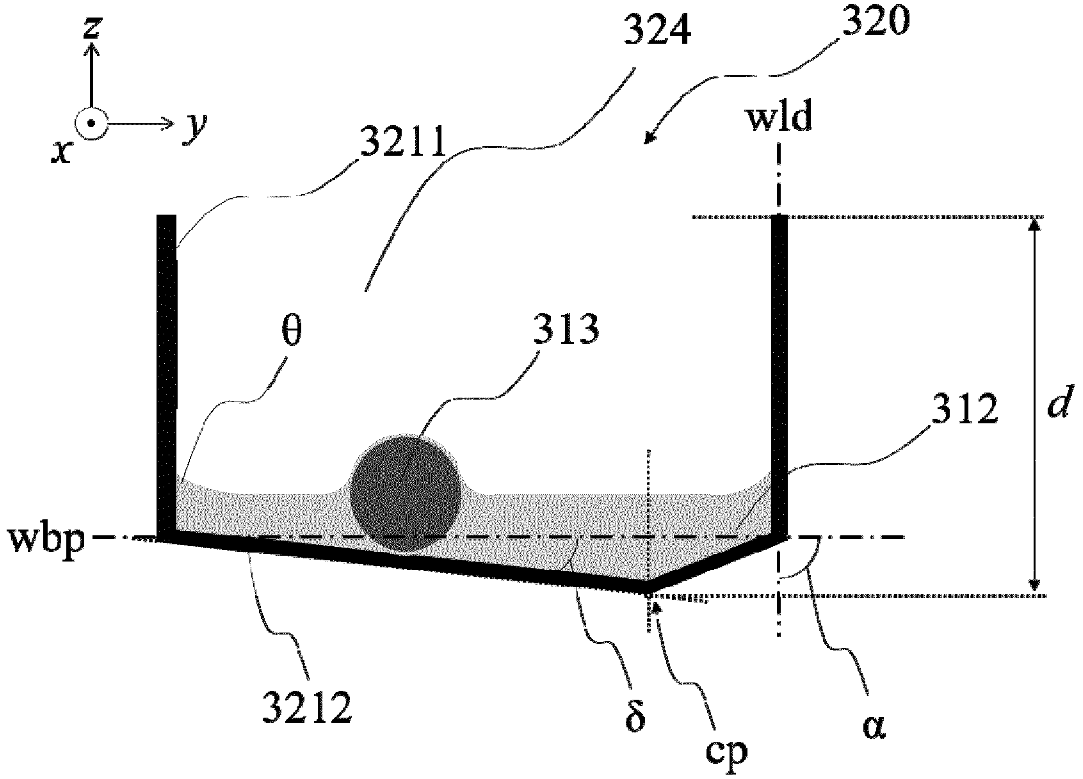
FIG. 24 is a sectional schematic representation of an exemplary embodiment of a loading well 320 according to the present disclosure, filled with a continuous phase 312 and comprising a drop of sample 313.
Figure 25:
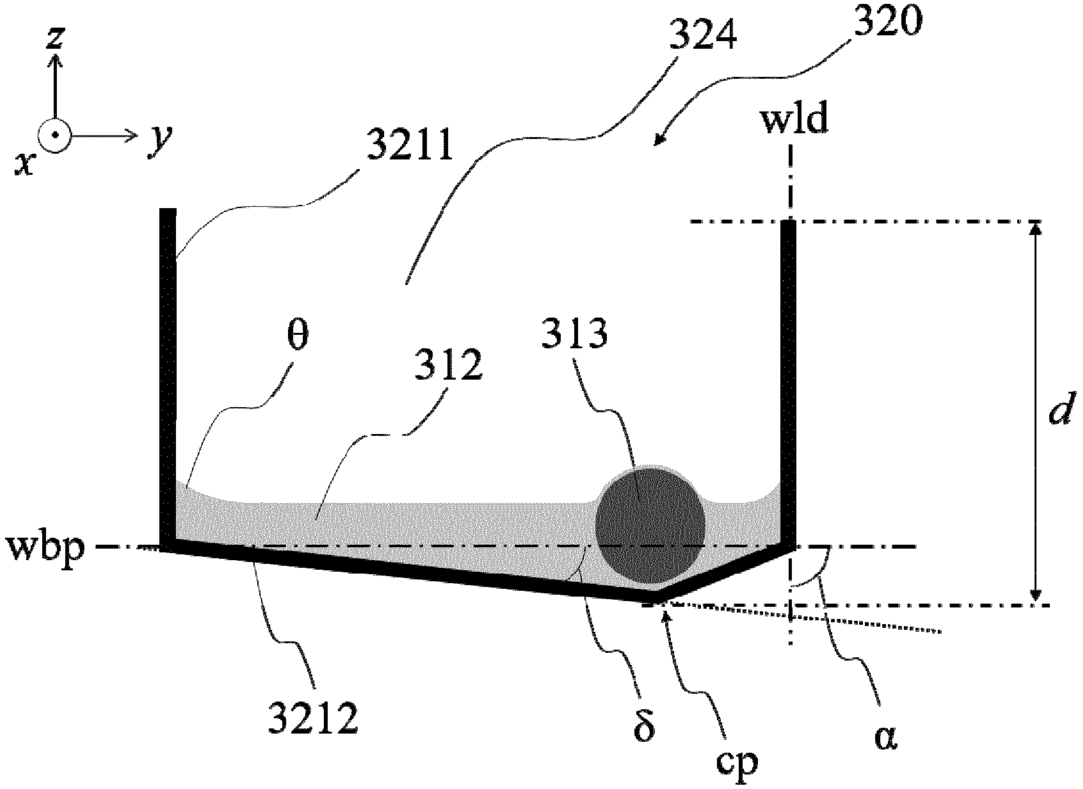
FIG. 25 is a sectional schematic representation of is a schematic representation of an exemplary embodiment of a loading well 320 according to the present disclosure, filled with a continuous phase 312 and comprising a drop of sample 313.
Figure 26:
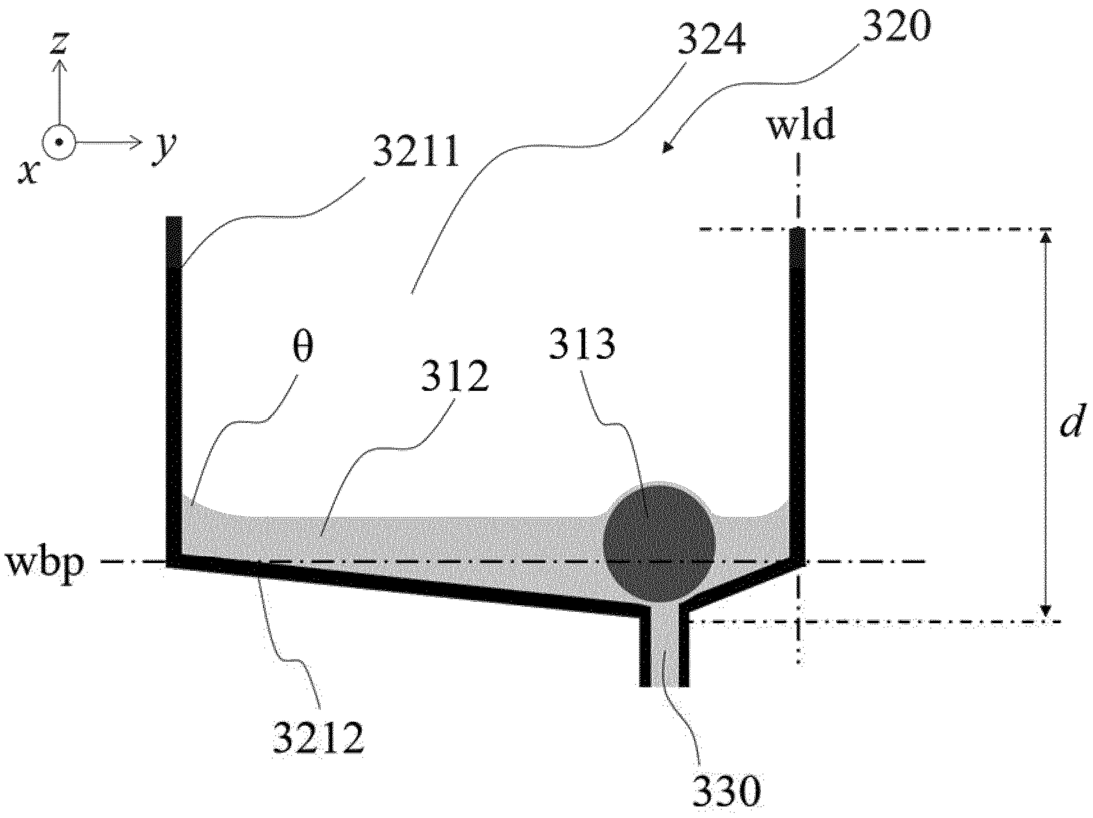
FIG. 26 is a sectional schematic representation of an exemplary embodiment of a loading well 320 according to the present disclosure, filled with a continuous phase 312 and comprising a drop of sample 313.

FIGS. 24-26 schematically represent a first operation of the loading well 320 configured to move and/or trap a drop of sample 313 in a defined in-plane (x and/or y) position within the loading well 320.

As seen on FIG. 24, a drop of sample 313 placed in a loading well 320 filled with a continuous phase 312 touches the bottom wall part 3212 while deforming the continuous phase/air interface. Such deformation increases the continuous phase/air contact area, forming a meniscus. Due to surface tension, the system ultimately evolves toward lowering said continuous phase/air contact area.

This phenomenon moves and traps the drop of sample 313 to the position of higher depth d of the loading well 320, as seen on FIG. 25.

In some embodiments, the height of the continuous phase 312 in the loading well 320 at the position of higher depth d of the loading well 320 is less than about 1 time the diameter of the drop of sample 313, preferably less than about 0.9, about 0.8, about 0.7, about 0.6, about 0.5, about 0.4, about 0.3, about 0.2, about 0.1 times the diameter of the drop of sample 313.

In some embodiments, the inlet port 330 is vertically (in the z-axis) in close proximity with the position of higher depth d of the loading well 320, as seen on FIG. 26.

FIGS. 27-32 schematically represent another exemplary operation of the loading well 320 configured to move and/or trap a drop of sample 313 in a defined in-plane (x and/or y) position within the loading well 320.

Figure 27:
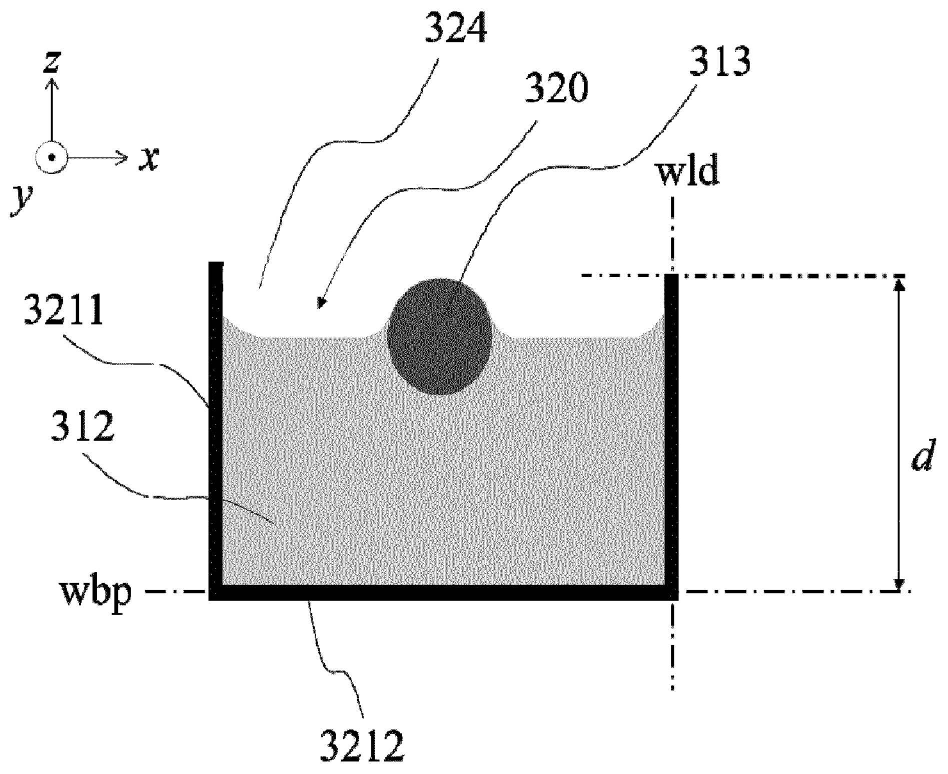
FIG. 27 is a sectional schematic representation of an exemplary embodiment of a loading well 320 according to the present disclosure, filled with a continuous phase 312 and comprising a drop of sample 313.

As seen on FIG. 27, a drop of sample 313 placed in a loading well 320 filled with a continuous phase 312 floats on said continuous phase, thereby deforming the continuous phase/air interface. Such deformation increases the continuous phase/air contact area, forming a meniscus. Due to surface tension, the system ultimately evolves toward lowering said continuous phase/air contact area.

Figure 28:
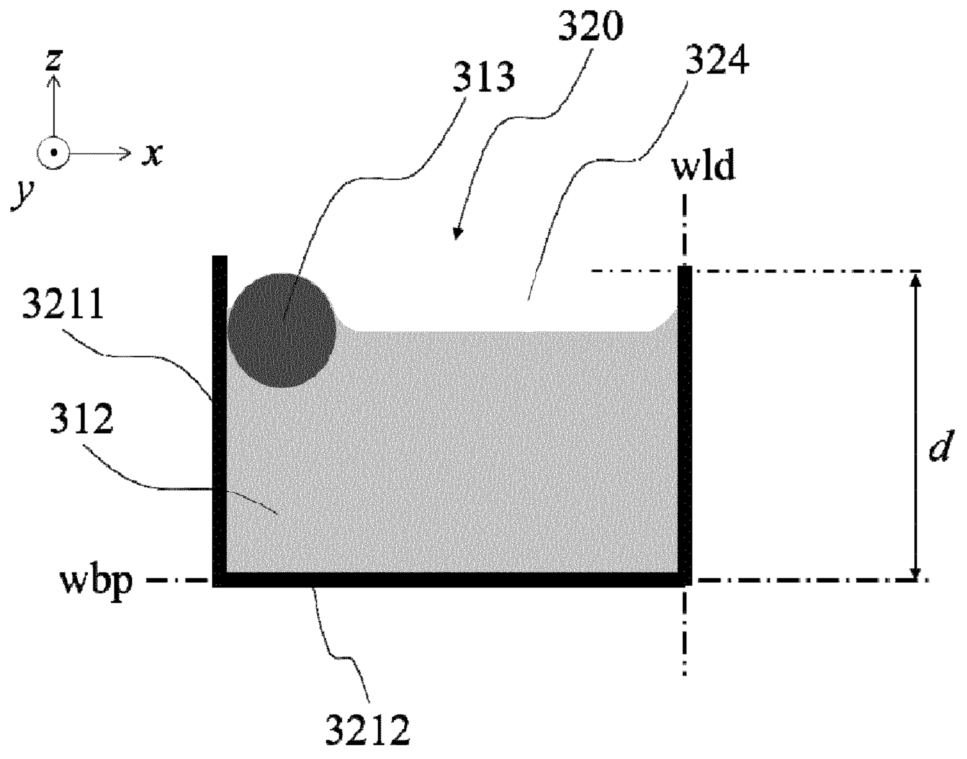
FIG. 28 is a sectional schematic representation of an exemplary embodiment of a loading well 320 according to the present disclosure, filled with a continuous phase 312 and comprising a drop of sample 313.

This phenomenon moves the drop of sample 313 to the lateral wall part 3211 of the loading well 320, as seen on FIG. 28.

Figure 29:
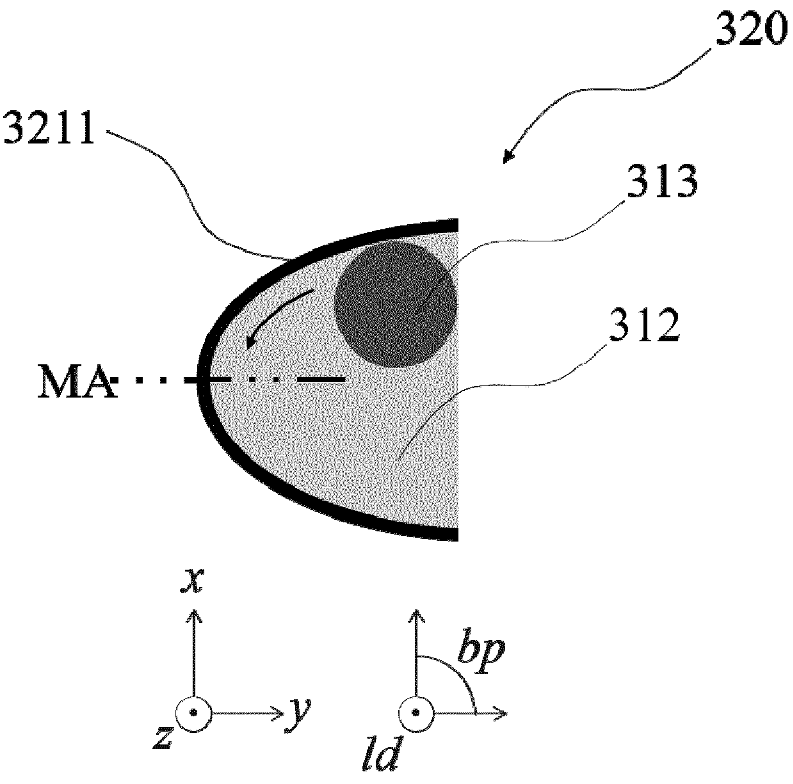
FIG. 29 is a schematic top representation of an exemplary embodiment of a loading well 320 according to the present disclosure, filled with a continuous phase 312 and comprising a drop of sample 313.

There, the drop of sample 313 migrates along the lateral wall part 3211 either towards a lower in-plane curvature of the lateral wall part 3211 (if the value of the local curvature of the lateral wall part 3211 is bigger than ½ of the drop of sample 313 diameter, i.e., the radius of the drop of sample 313) or towards a higher in-plane curvature of the lateral wall part 3211 (if the value of the local curvature of the lateral wall part 3211 is smaller than ½ of the drop of sample 313 diameter, i.e., the radius of the drop of sample 313), as illustrated on FIG. 29 (see the thick black arrow showing migration of the drop of sample). In other words, the drop of sample 313 migrates along the lateral wall part 3211 in a direction where the value of the local curvature is more optimal to the drop of sample 313, i.e., where the value of the local curvature is closer to the radius of the drop of sample 313.

By "local curvature" at a position X (Cp (X)), it is meant the average curvature value of the lateral wall part 3211 over a portion of lateral wall part 3211 (*a*) having a length of 1 diameter of a drop of sample 313 and (b) being centered on position X. The variation of curvature Cp along the lateral wall part 3211 is given by its derivative $$\frac{dCp}{dS}.$$

Figure 30:
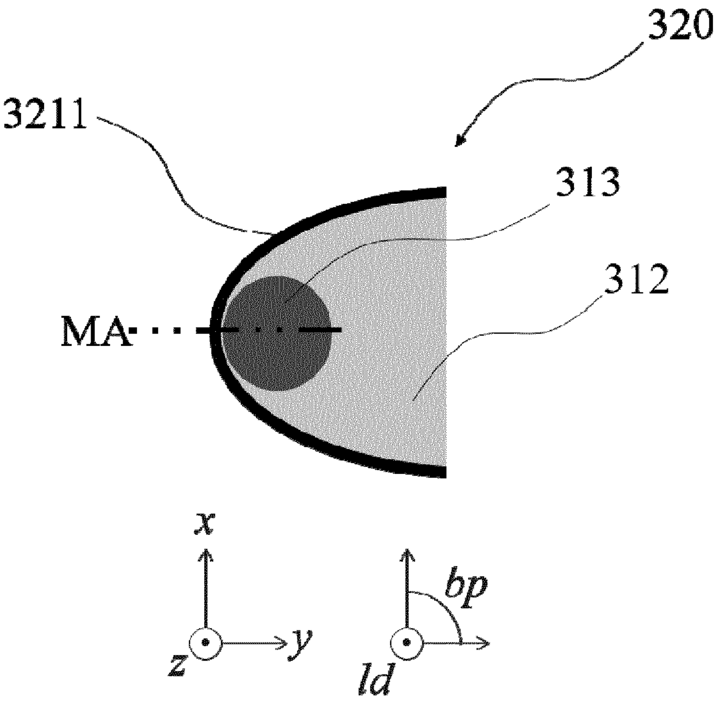
FIG. 30 is a schematic top representation of an exemplary embodiment of a loading well 320 according to the present disclosure, filled with a continuous phase 312 and comprising a drop of sample 313.

The drop of sample 313 stops and remains trapped in the location where either the lateral wall part 3211 local radius of curvature equals half the diameter (i.e., the radius) of the drop of sample 313 or is the closest to it with respect to the local curvature on each side; or the lateral wall part 3211 curvature has an extremum as seen on FIG. 30.

In other words, while in contact with the lateral wall part 3211, the surface of the meniscus between the drop of sample 313 and the lateral wall part 3211 depends on the difference δ between the curvature of the drop of sample 313

$$Cd\left(=\frac{1}{\text{radius of the drop of sample 313}}\right)$$

and the average local curvature of the lateral wall part 3211 Cp at the position X of the drop of sample 313. In order to minimize the total surface energy of the system, the drop of sample 313 moves along the lateral wall part 3211 towards positions with a smaller curvature difference δ=Cp−Cd. The drop of sample 313 ultimately stops when $$\frac{d\delta}{dS}=0.$$

In particular, if $$\frac{d^2\delta}{dS^2}=0,$$

the drop remains stably trapped at this position of the lateral wall part 3211, i.e., the drop spontaneously returns to this position following a disturbance which has moved the drop away from this position.

Figure 31:
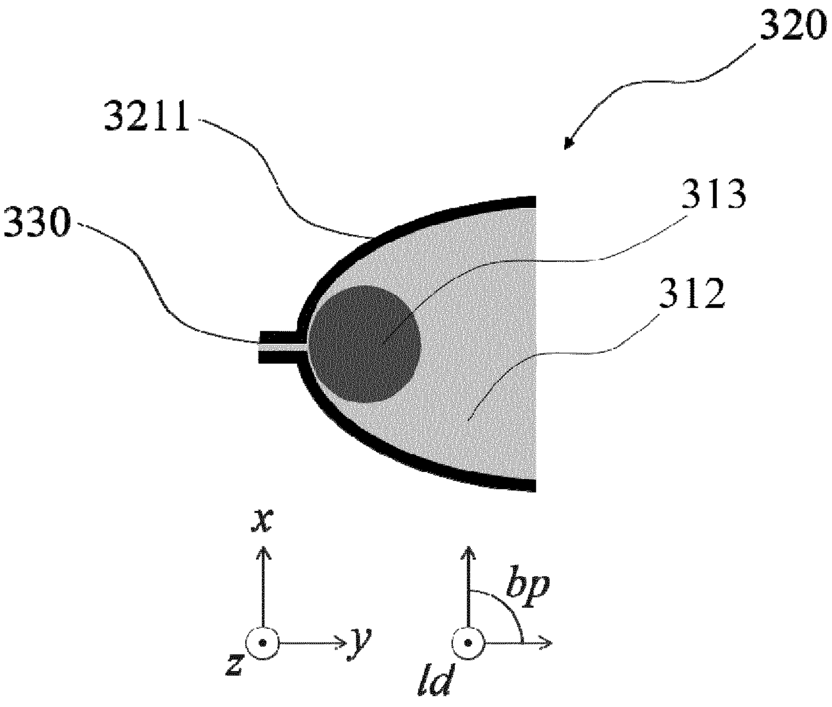
FIG. 31 is a schematic top representation of an exemplary embodiment of a loading well 320 according to the present disclosure, filled with a continuous phase 312 and comprising a drop of sample 313.

In some embodiments, the inlet port 330 is laterally (in the x-axis and/or y-axis) in close proximity with the lateral wall part 3211 optimal curvature position, as seen on FIG. 31.

Figure 32:
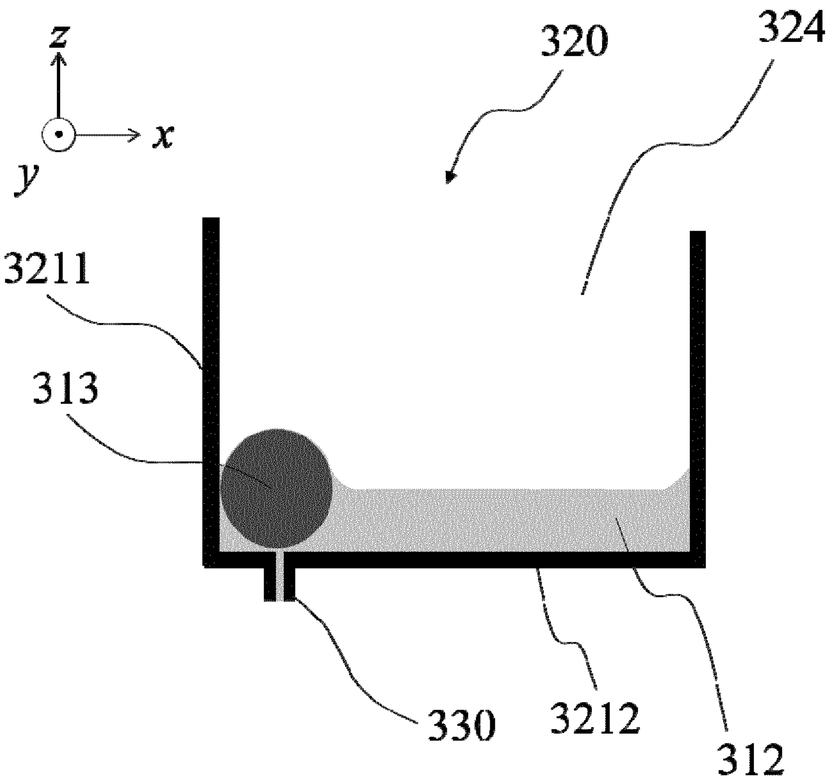
FIG. 32 is a sectional schematic representation of an exemplary embodiment of a loading well 320 according to the present disclosure, filled with a continuous phase 312 and comprising a drop of sample 313.
Figure 33:
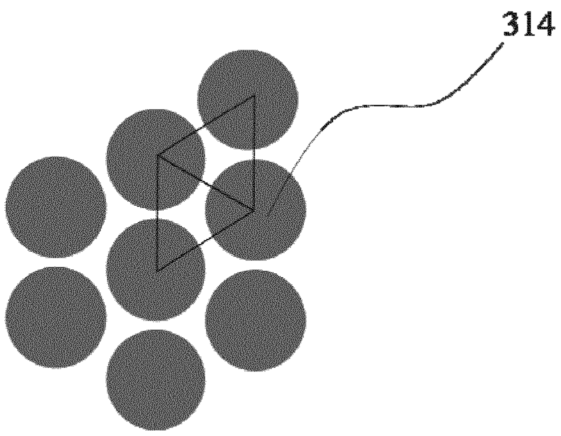
FIG. 33 is a schematic representation of a droplet 314 lattice.
Figure 34:
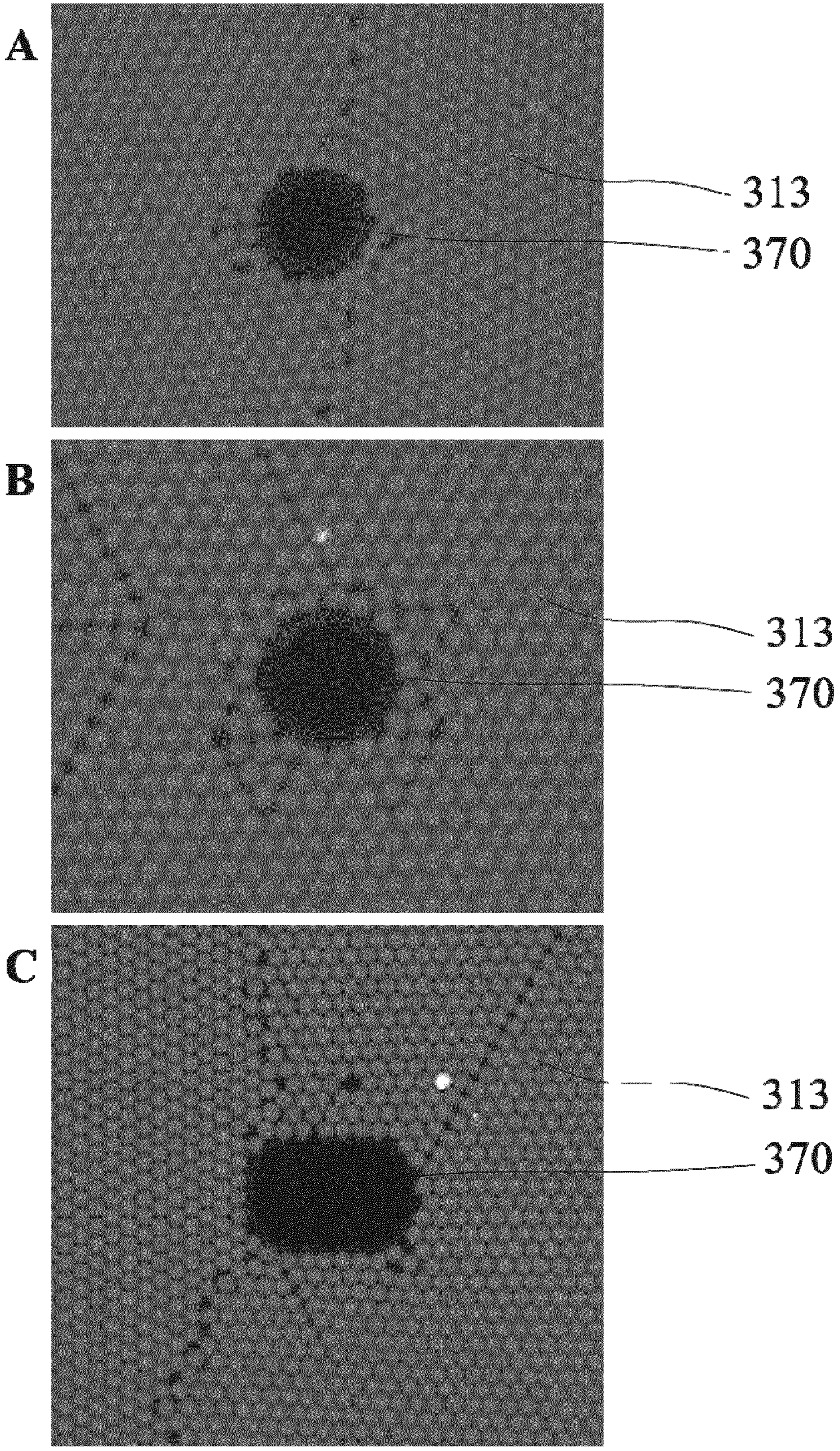
FIGS. 34A-34C is a offset of three photographs showing the droplet 314 lattice of droplets 314 stored in a droplet chamber 350 comprising a round-section (A and B) or oval-section (C) chamber pillar.

In some embodiments, the inlet port 330 is vertically (in the z-axis) in close proximity with the lateral wall part 3211 optimal curvature position, as seen on FIG. 32.

FIGS. 33-36 schematically represent an exemplary operation of a chamber pillar 370 according to the present invention.

The chamber pillar 370 is configured to or suitable for keeping the height of the droplet chamber 350 constant (in the z-axis, i.e., between the opposite surfaces defined by the upper slab 310 and the lower slab 311), and/or for increasing the concentration of droplets 314 per surface of the droplet chamber 350 in a droplet chamber 350 filled with a population of droplets 314. Typically, large droplet chambers can collapse or inflate during operation of a microfluidic chip because, e.g., of pressure differences across their walls and/or variation of temperature, among others. A multitude of small chamber pillars is thus regularly placed to keep the chamber height (in the z-axis) constant. This limits the number of droplets 314 per surface area (i.e., the concentration of droplets 314 per surface of the droplet chamber 350), and hence the overall throughput of the operation.

In addition, chamber pillars interfere with the droplet 314 lattice inside the droplet chamber. Indeed, currently used chamber pillars are cylindrical (i.e., with a round or oval section parallel to the base plane (x/y)). However, droplets 314 spontaneously assemble in a hexagonal closely-packed lattice as seen on FIG. 33. Near the chamber pillars however, defaults in the lattice can form and propagate, thereby leaving empty spaces in the lattice which limit the number of the droplets 314 per surface area, and hence the overall throughput of the operation. Such defaults in the droplet lattice are well-observed on FIGS. 34A-C, where droplets 314 are seen in light grey arranged around a chamber pillar (in the center of the photograph). Black areas between droplets 314 are indicative of lattice defaults. FIGS. 34A-B show a droplet 314 lattice in a droplet chamber 350 comprising a round-section chamber pillar. FIG. 34C show a droplet 314 lattice in a droplet chamber 350 comprising an oval-section chamber pillar.

The number of droplets 314 in a droplet chamber 350 of a given surface may be defined as follows:

$$\frac{2}{\sqrt{3}} \times \frac{\text{surface}}{D^2},$$

wherein:

the surface is the surface of the droplet chamber 350 in $mm^2$, and

D is the mean diameter of the droplets 314 in mm.

The concentration of droplets 314 per surface unit (in $mm^2$) in a droplet chamber 350 may be defined as follows:

$$\frac{2}{\sqrt{3}} \times \frac{1}{D^2},$$

wherein:

D is the mean diameter of the droplets 314 in mm.

The surface concentration of droplets 314, i.e., the number of droplets 314 per surface unit may be defined as follows:

$$2/\sqrt{3}D^{-2},$$

wherein:

D is the mean diameter of the droplets 314 in mm.

The formula $$\frac{2}{\sqrt{3}} \times \frac{1}{D^2}$$

given hereinabove defines the "best achievable concentration" of droplets in a droplet chamber, i.e., in total absence of any default formation in the droplet lattice. However, the use of chamber pillars may be necessary in droplet chambers. These chamber pillars have however been described as disruptive means for the droplet lattice with a negative impact on the concentration of droplets.

In some embodiments, the population of droplets 314 stored in the droplet chamber 350 is monodisperse. In other words, every droplet 314 in the population of droplets 314 stored in the droplet chamber 350 has the same diameter and/or volume within a margin of error of less than about 20%, preferably less than about 15%, about 10%, about 5% or lesser. In some embodiments, the margin of error is of about 10%.

In some embodiments, the population of droplets 314 stored in the droplet chamber 350 is arranged in a 2-dimensional (2D) droplet lattice, in particular in the base plane (x/y) (in other words, in a 2D droplet layer). In some embodiments, the population of droplets 314 stored in the droplet chamber 350 is arranged in a 3-dimensional (3D) droplet lattice.

In some embodiments, a population of droplets 314, comprising droplets with an average diameter of about 72 μm and/or an average volume of about 220 pL, stored in the droplet chamber 350 and arranged in a 2-dimensional (2D) droplet lattice in the base plane (x/y), has a best achievable concentration as defined hereinabove of about 148 droplets/$mm^2$.

In the embodiment shown in FIG. 7 and FIG. 11, the chamber pillar 370 aims thus at keeping the height (in the z-axis) of the droplet chamber 350 constant (i.e., between the opposite surfaces defined by the upper slab 310 and the lower slab 311); while increasing the concentration of droplets 314 per surface of the droplet chamber 350. This can be achieved by reducing, decreasing or otherwise eliminating default formation in the droplet lattice.

Figure 35:
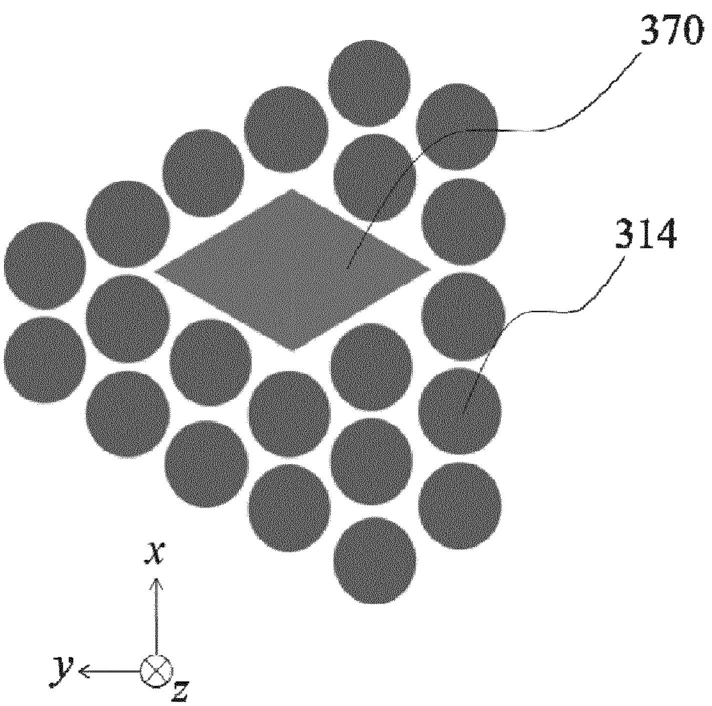
FIG. 35 is a schematic representation of the droplet 314 lattice in a droplet chamber 350 comprising a rhombus-section chamber pillar 370.
Figure 36:
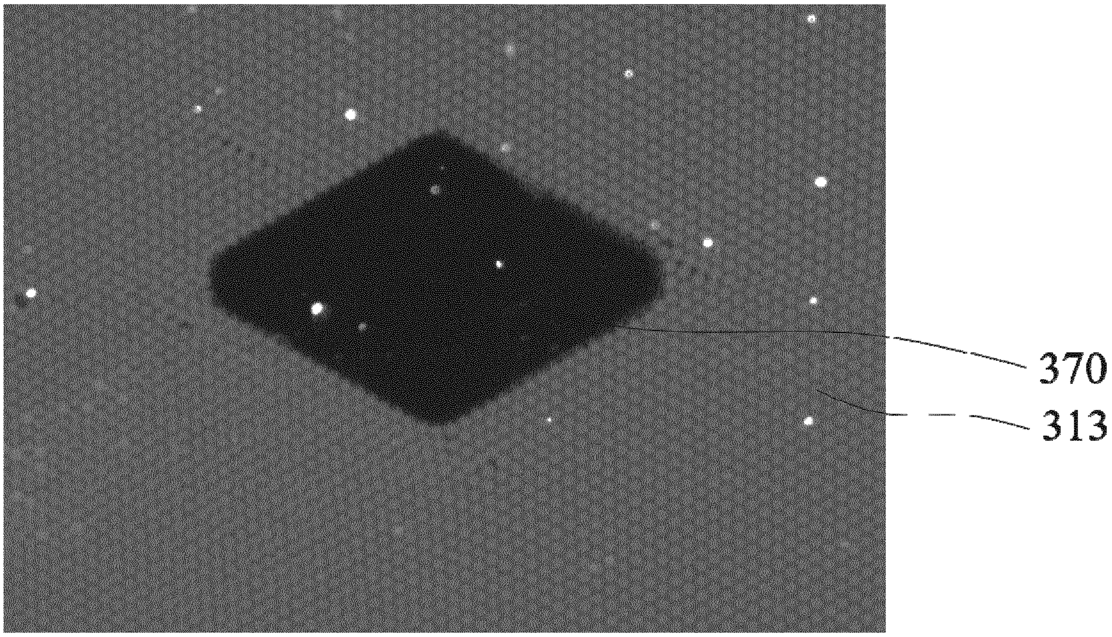
FIG. 36 is a photograph showing the droplet 314 lattice of droplets 314 stored in a droplet chamber 350 comprising a rhombus-section chamber pillar 370.
Figure 37:
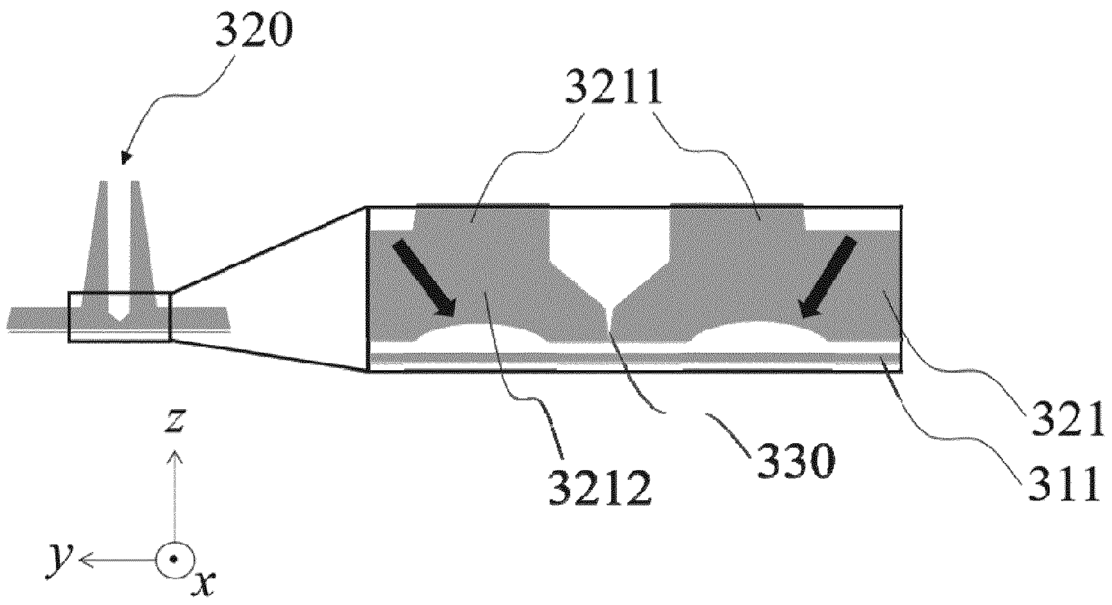
FIG. 37 is a schematic representation of lateral wall parts of a loading well presenting sink marks at the bottom of said lateral wall parts.

As seen on FIGS. 35-36, the rhombus shape (in cross-section along the base plane (x/y)) of the chamber pillar 370 fits the natural pattern of the droplet 314 lattice. In particular, FIG. 36 is a photograph showing the arrangement of droplets 314 in a droplet chamber 350 comprising a rhombus-section chamber pillar 370. The chamber 370 allows therefore to avoid default formation in the lattice, in particular near the chamber pillar 370 and to increase the concentration of droplets 314 per surface of the droplet chamber 350.

In some embodiments, the concentration of droplets per surface of the droplet chamber is increased by at least about 0.5%, preferably at least about 1%, about 2%, about 3%, about 4%, about 5%, about 10%, about 15%, about 20%, about 25% or more using the chamber pillar 370 as compared to a chamber pillar with a round shape in cross-section along the base plane (x/y).

FIGS. 37-40 schematically represent an exemplary operation of a droplet generator 340 located below the bottom wall part 3212 of a loading well 320 and included within said bottom wall part 3212 in projection within the base plane (x/y) according to the present invention.

Typically, microfluidic chips are designed with precision microfluidic channels and loading wells kept well separated in projection within the base plane (x/y). This constraint is compulsory to avoid any deformation or warpage of the precision microfluidic channels due to the discrepancy in aspect ratios and results in microfluidic chips having narrow and tall loading wells, kept apart from the precision microfluidic channels, leaving thus only limited space for droplet chambers. For instance, injected molded parts of a microfluidic chip with tall lateral wall parts of the loading wells present sink marks at the bottom of the lateral wall parts as seen on FIG. 37 (indicated by thick black arrows), because of differential shrinkage of the part during molding. Therefore, if a precision microfluidic channel (such as a droplet generator) is placed in close proximity with the lateral wall part, or more generally, with the loading well, said precision microfluidic channel would be deformed or otherwise warped during molding and its functionality would be impacted.

Figure 38:
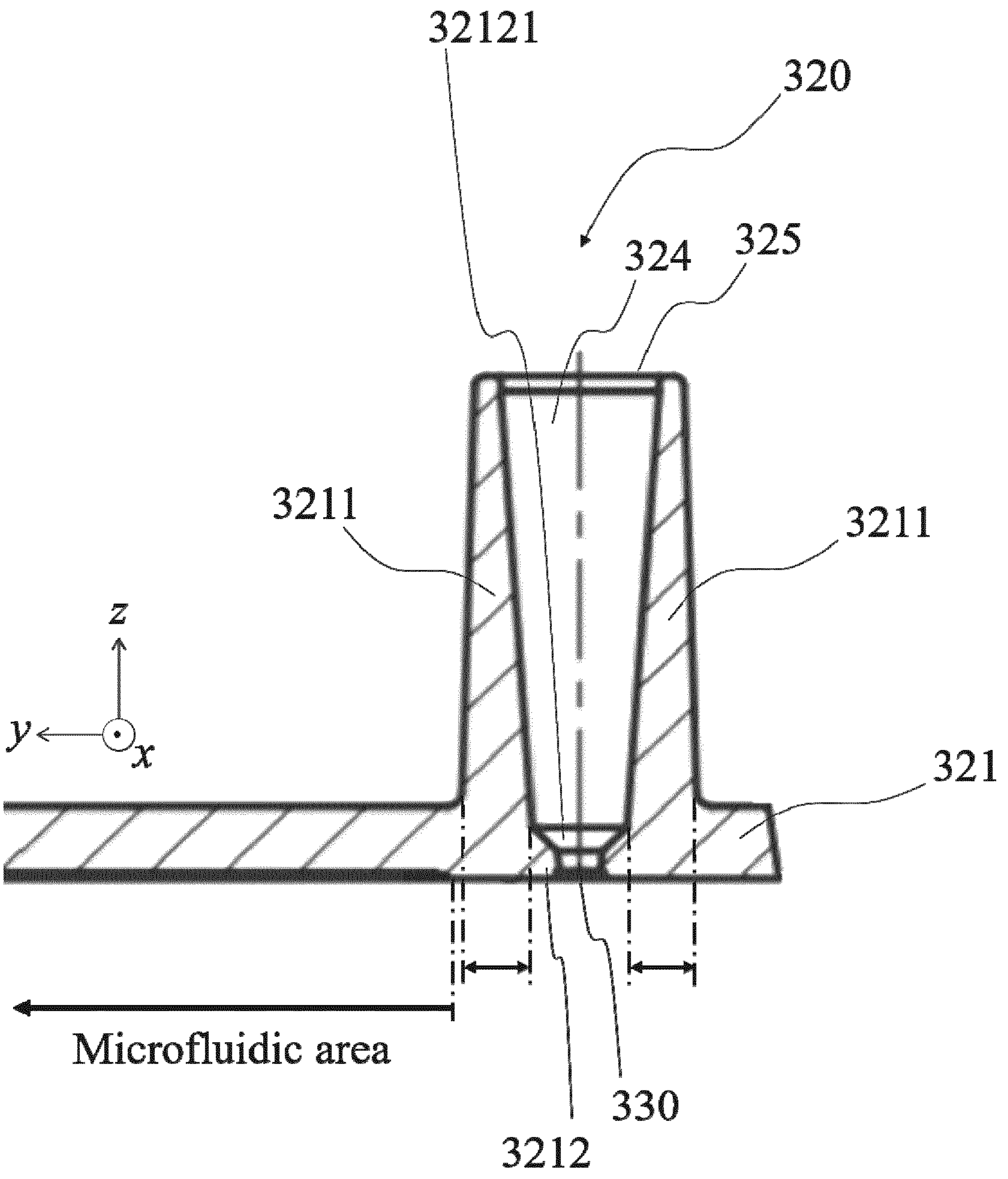
FIG. 38 is a a side cross-section view of a microfluidic chip design comprising a narrow loading well. The operative functional organization of the sensitive microfluidic channels below the loading well is shown.

As a result, placing loading wells accommodating an inlet port 330 close to sensitive microfluidic areas is challenging and limits the design of microfluidic chips comprising large droplet chambers, as seen on FIG. 38 (sink mark areas below lateral wall parts of the loading well are indicated by double headed arrows; useful area for microfluidic channels, including sensitive microfluidic channels, is indicated as "microfluidic area").

A solution to this issue is provided in the present disclosure, and comprises the use of wide loading wells 320. Precision microfluidic channels such as a droplet generator 340 can be placed below the loading well 320 in projection within the base plane (x/y), and the lateral wall part 3212 of the loading well 320 be placed further away, e.g., on top of microfluidic networks not affected by the potential change in shape during manufacturing (e.g., a droplet chamber 350).

Figure 39:
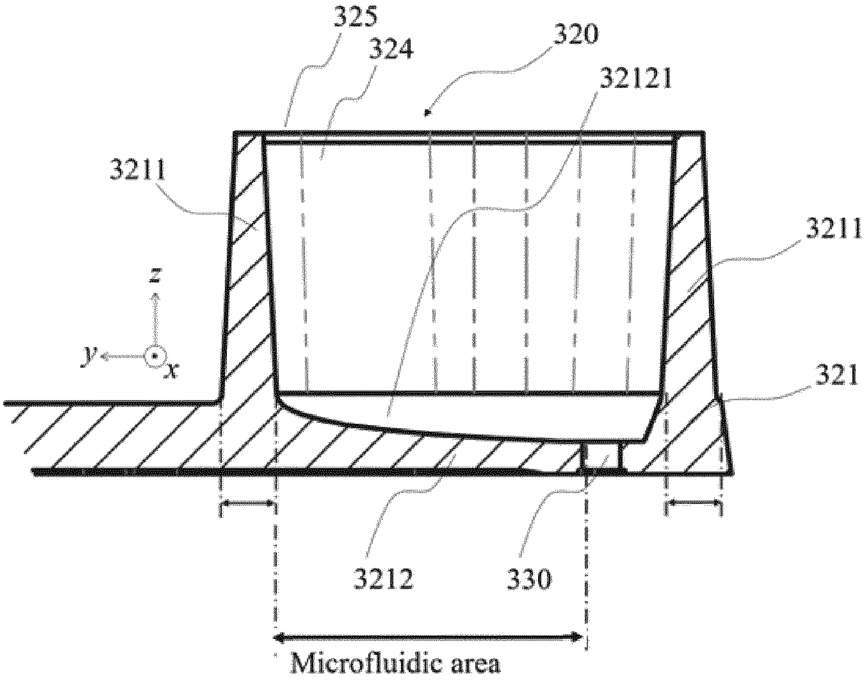
FIG. 39 is a a side cross-section view of a microfluidic chip design comprising a wide loading well 320. The operative functional organization of the sensitive microfluidic channels below the loading well 320 is shown.

FIG. 39 shows an exemplary embodiment of the solution provided herein (sink mark areas below lateral wall parts of the loading well are indicated by double headed arrows; useful area for microfluidic channels, including sensitive microfluidic channels, is indicated as "microfluidic area"). As seen on this figure, precision microfluidic channels (such as, e.g., the droplet generator 340) can be positioned in close proximity with the inlet port 330 below the bottom wall part 3212 of the loading well 320 in projection within the base plane (x/y). The space occupancy of the microfluidic area, and thus of the droplet chamber 350, can therefore be increased as compared to current microfluidic chips designs.

Figure 40:
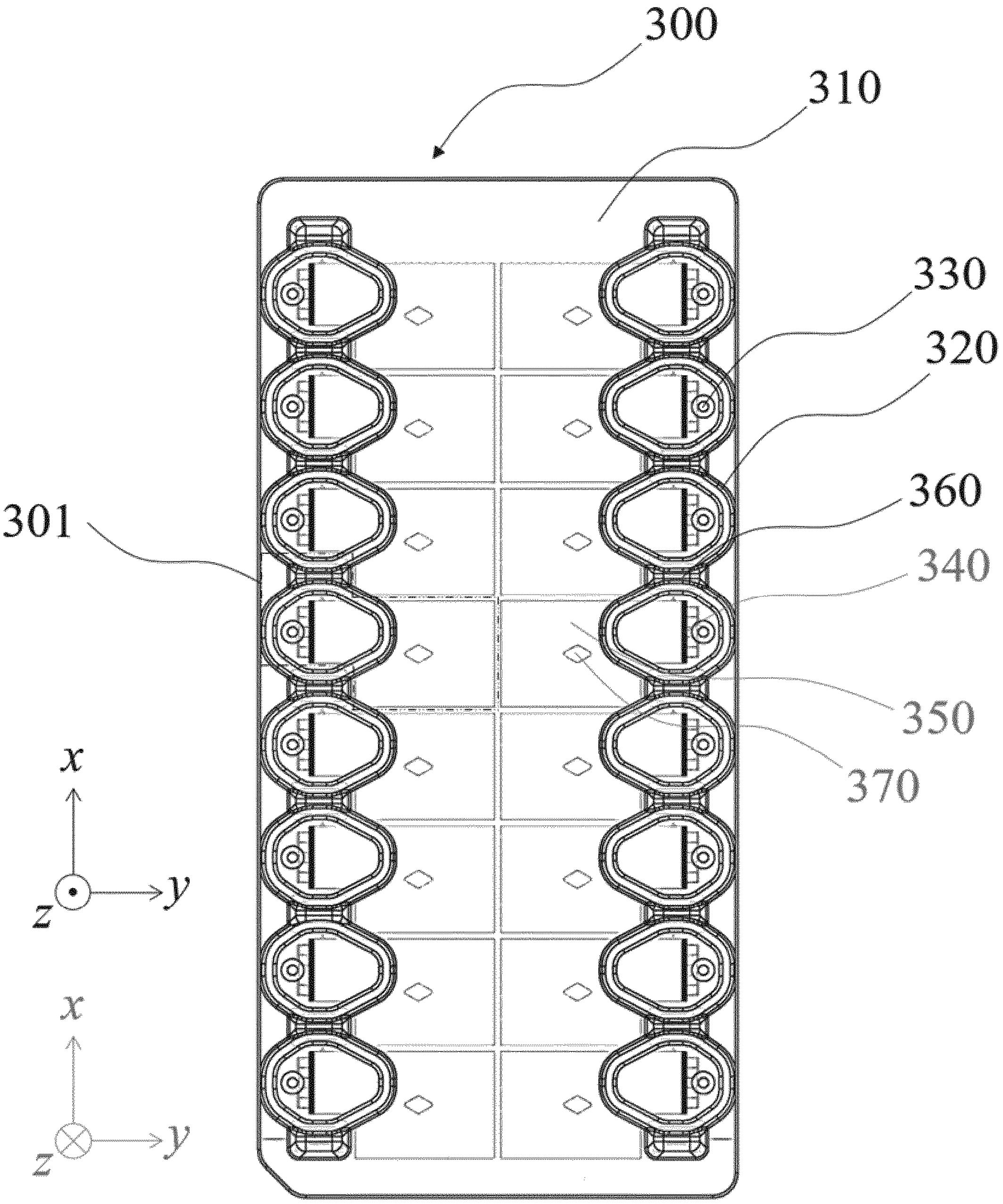
FIG. 40 is a superimposition of the top view of FIG. 5 and bottom view of FIG. 7 seen in transparency, showing a microfluidic chip 300 according to the invention.
Figure 41:
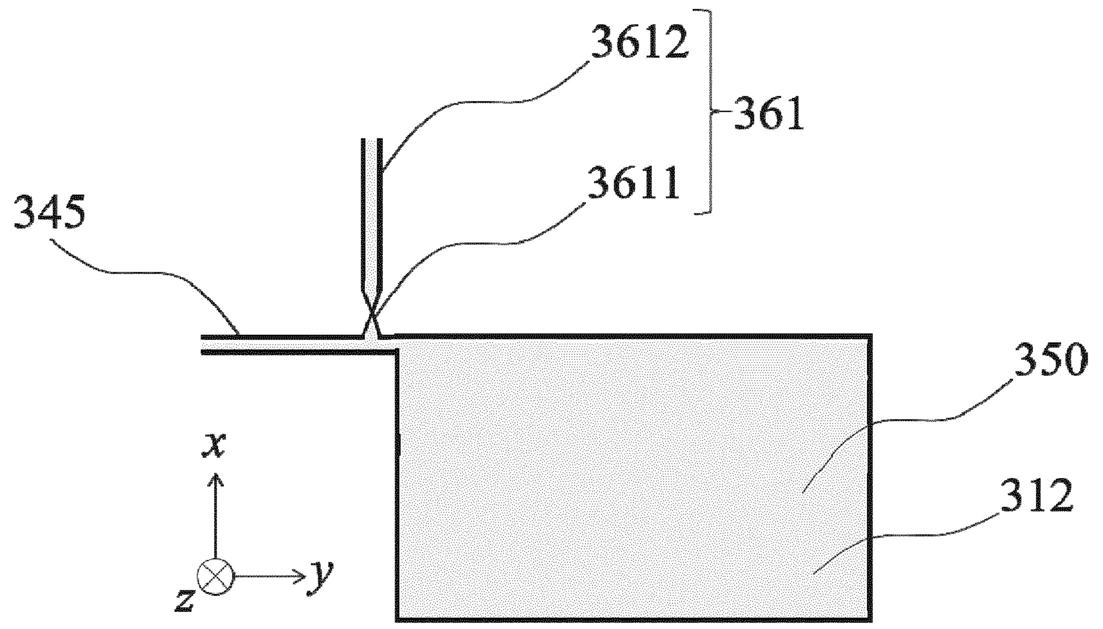
FIG. 41 is a schematic representation of a part of an exemplary microfluidic chip design comprising a droplet chamber operatively coupled to an inlet microchannel and an output channel, through a capillary trap.

FIG. 40 further illustrates this exemplary embodiment of a microfluidic chip 300, and shows, in transparency, the spatial organization of elements placed on the top part of the upper slab 310 (in black) (including the loading well 320) and of elements placed on the bottom part of the upper slab 310 (in grey) (including the droplet generator 340 and the droplet chamber 350).

FIGS. 41-52 schematically represent exemplary operations of the air tank 360 according to the present invention.

Typically, microfluidic chips comprise a microfluidic network in direct connection with an upstream inlet microchannel for loading a sample, and a downstream output channel to release the overflow of continuous phase in the microfluidic chip throughout droplet generation and storage in the microfluidic network.

Such microfluidic design however presents several issues, in particular for keeping the droplets and the continuous phase surrounding the droplets in place independently of any further flow in the microfluidics network. This is the case, e.g., in microfluidic chips where pressure and an air spring is used to drive droplet generation (such as microfluidic chips disclosed in International patent application WO2016170126). In such systems, pressure release (such as after droplet generation) creates a continuous phase backflow which may disrupt the population of droplets.

The solution provided herein allows to flow a continuous phase from at least one inlet microchannel to at least one output channel while keeping a population of droplets in said continuous phase at rest, i.e., without disrupting the integrity of the population of droplets.

By "without disrupting the integrity of the population of droplets", it is meant that the droplets maintain their relative position in the microfluidic network, in particular, the population of droplets maintains its spatial organization in the microfluidic network (e.g., as a 2-dimentional layer of droplets organized in a droplet lattice).

Another issue of existing solutions, where droplets loading or generation implies pushing a sample in a locally static continuous phase, is the gradual impoverishment or depletion in surfactants and/or other components comprised in the continuous phase close to the input channel or droplet generator, which are required to stabilize the population of droplets.

By "locally static continuous phase", it is meant a continuous phase which does not flow in close proximity with the input channel or droplet generator in a microfluidic channel of a microfluidic chip in the same direction than the flow of droplets. Alternatively, it is meant a continuous phase which is not renewed in close proximity with the input channel or droplet generator.

The solution provided herein allows to homogenize a locally static continuous phase and its concentration in surfactant and/or other components throughout droplet loading or generation in said locally static continuous phase.

FIGS. 41-44 illustrate a first exemplary architecture and operation of a microfluidic chip comprising an inlet microchannel 345 operatively coupled to a droplet chamber 350. The inlet microchannel 345 is further operatively coupled to an output channel 361 composed, from proximal to distal, of a capillary trap 3611 and an outlet 3612. In some embodiments, the outlet 3612 is a dead-end, such as, e.g., an air tank 360.

By "capillary trap", it is meant at least a portion or the entirety of an output channel 361 characterized in that its width (in the y-axis) and/or its height (in the z-axis) is smaller than the diameter of a droplet 314.

Figure 42:
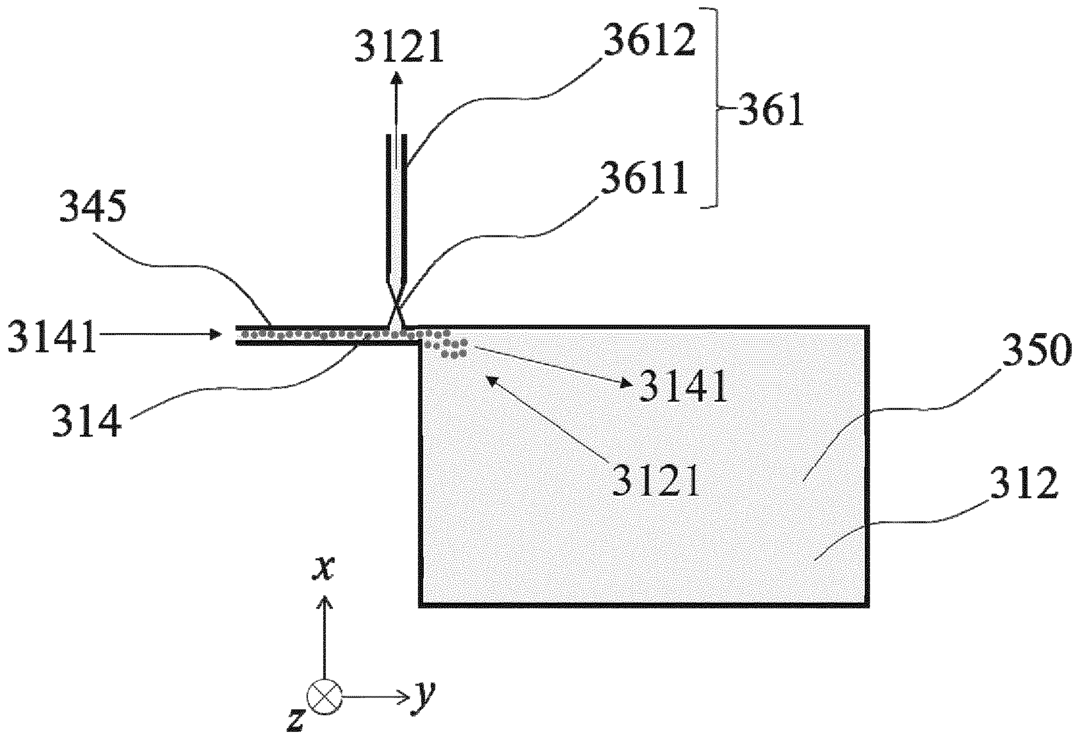
FIG. 42 is a schematic representation of the exemplary microfluidic chip of FIG. 41 during droplet loading.

As shown in FIG. 42, during loading of the droplet chamber with a population of droplets (in this case, with a population of droplets or an emulsion generated outside the microfluidic chip and loaded in said microfluidic chip for storing in the droplet chamber and optionally further processing), droplets flow from the inlet microchannel 345 towards the droplet chamber 350 (flow 3141). When passing by the output channel 361, the droplets do not flow out towards the outlet because of the capillary trap 3611 which is smaller in height than the diameter of a droplet 314. In turn, the continuous phase 312 flows towards the output channel 361 as the droplet chamber 350 fills with droplets 314 (flow 3121).

Figure 43:
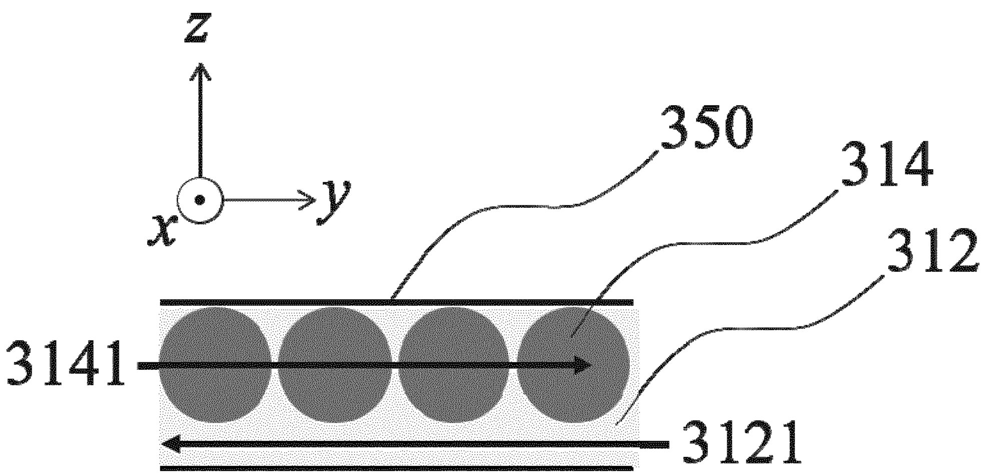
FIG. 43 is a schematic representation of opposite droplet and continuous phase flows in a droplet chamber.

As seen in FIG. 43, it may be advantageous that the height (in the z-axis) of the droplet chamber 350 be more than the average diameter of a droplet 314 (but less than twice the average diameter of a droplet 314 if a 2D droplet layer is intended) to facilitate flow 3121 to circulate through the droplets 314.

Figure 44:
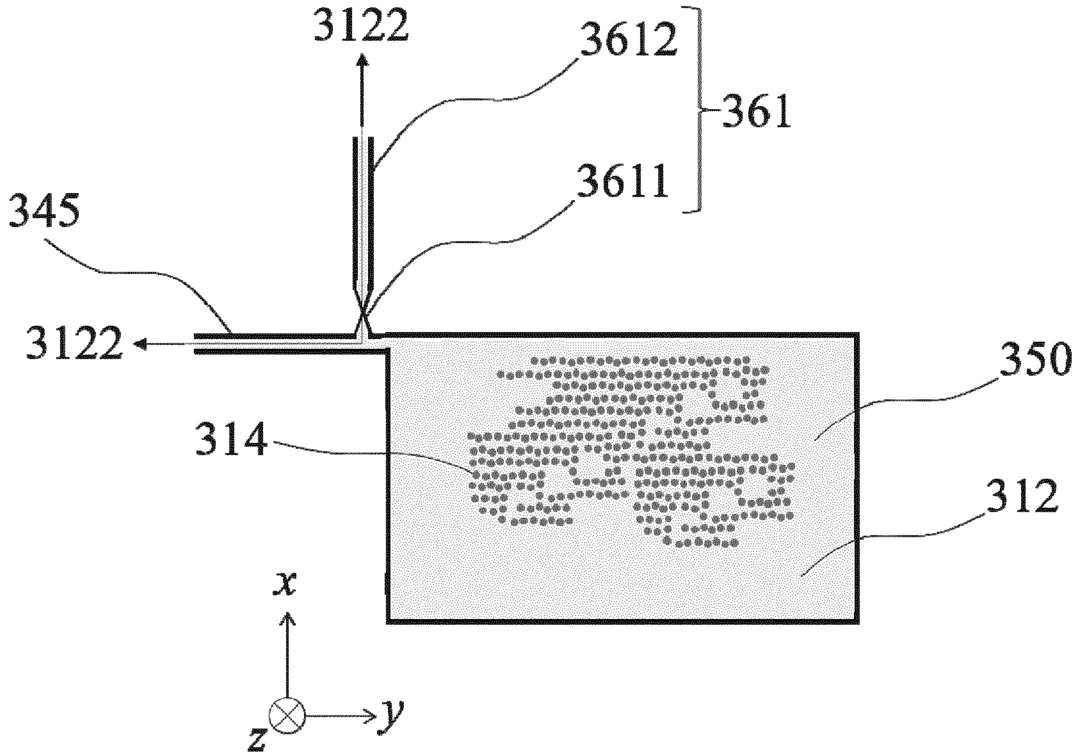
FIG. 44 is a schematic representation of the exemplary microfluidic chip of FIG. 41 after droplet loading completion.
Figure 45:
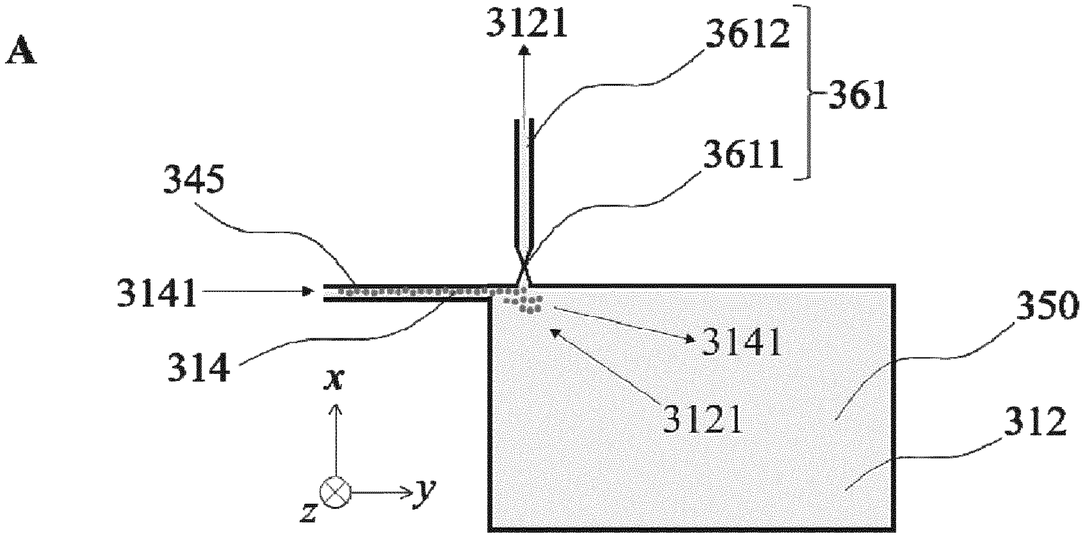
FIGS. 45A and 45B is a schematic representation of an exemplary microfluidic chip design comprising a droplet chamber operatively coupled to an inlet microchannel and an output channel, through a capillary trap. A: operation of the exemplary microfluidic chip design during droplet loading. B: operation of the exemplary microfluidic chip design after droplet loading completion.
Figure 45:
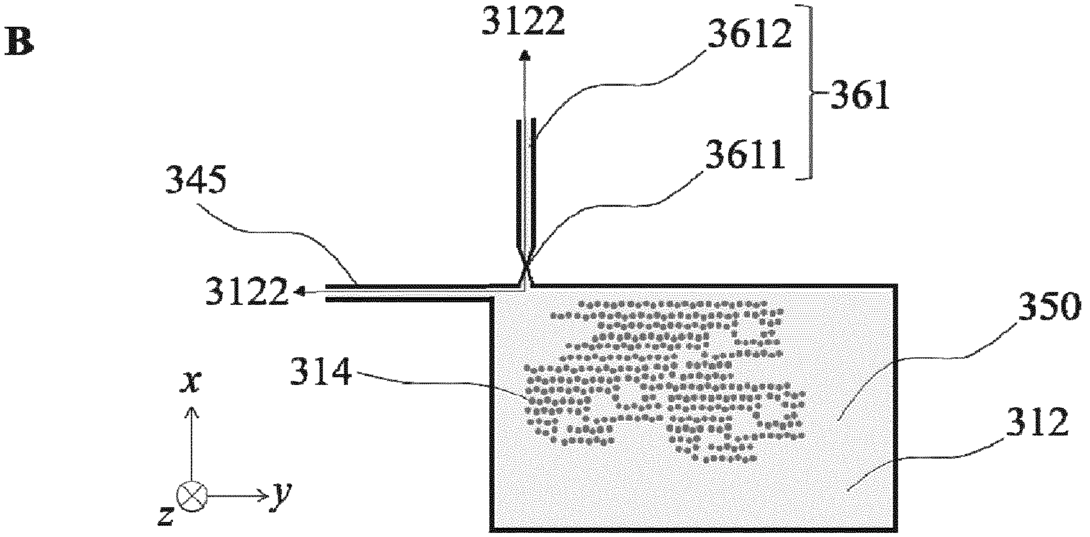
Figure 46:
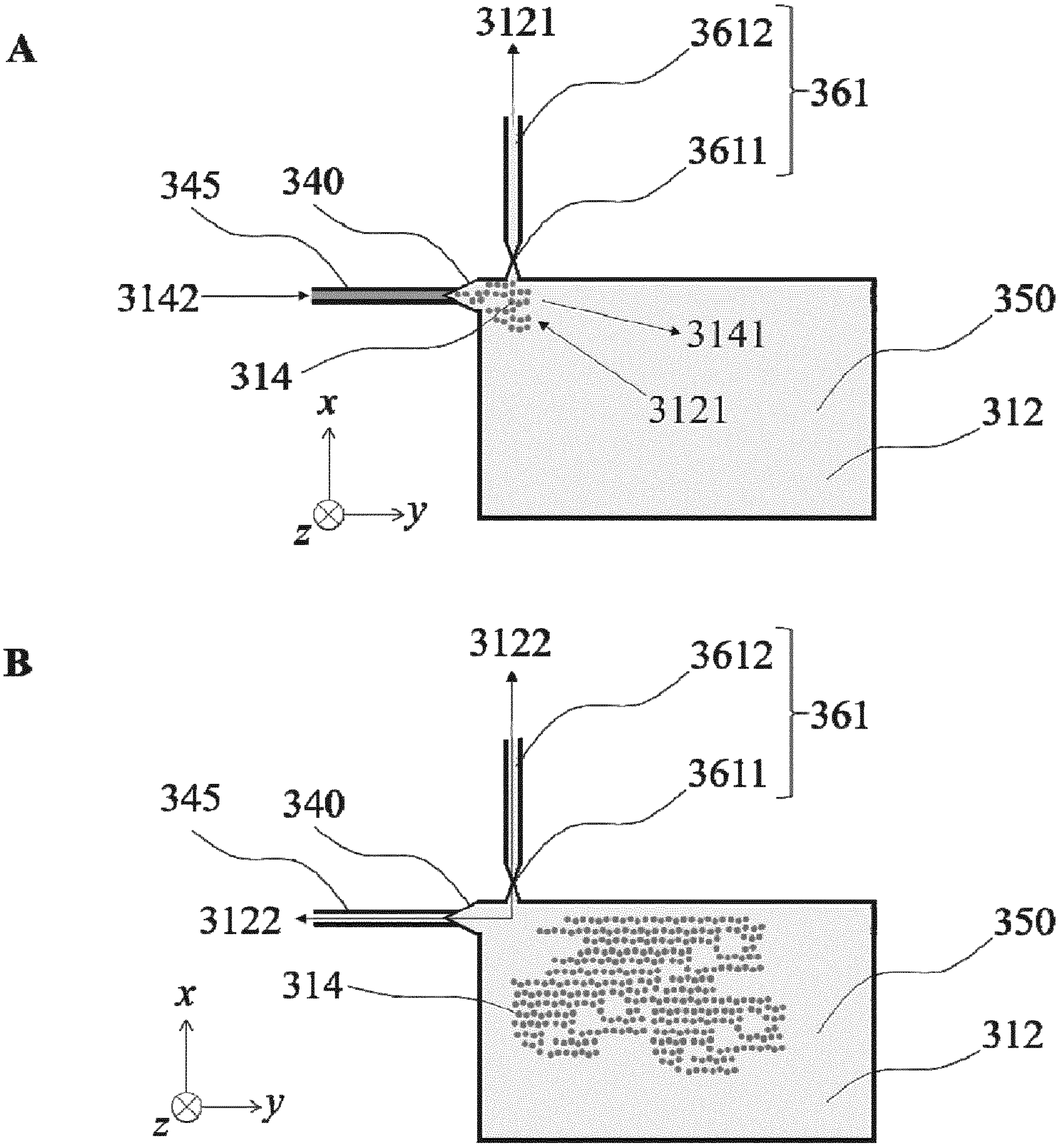
FIGS. 46A and 46B is a schematic representation of an exemplary microfluidic chip design comprising a droplet chamber operatively coupled to an inlet microchannel through a droplet generator, and an output channel, through a capillary trap. A: operation of the exemplary microfluidic chip design during droplet loading. B: operation of the exemplary microfluidic chip design after droplet loading completion.

As seen in FIG. 44, after loading of the droplet chamber 350 with the population of droplets 314, the continuous phase 312 can flow back from the output channel 361 to the inlet microchannel 345 and vice-versa (flow 3122) without contacting, and therefore without disrupting, neither the population of droplets 314 nor the continuous phase 312 in the droplet chamber 350.

FIGS. 45A-B illustrate an alternative exemplary architecture and operation of a microfluidic chip comprising an inlet microchannel 345 operatively coupled to a droplet chamber 350. In this alternative architecture, the output channel 361 composed, from proximal to distal, of a capillary trap 3611 and an outlet 3612, is operatively coupled to the droplet chamber 350, preferably near the inlet microchannel 345 junction with the droplet chamber 350. In some embodiments, the outlet 3612 is a dead-end, such as, e.g., an air tank 360. As previously described, the flow 3141 of droplets 314 does not enter the output channel 361 because of the capillary trap 3611 which is smaller in height than the diameter of a droplet 314. In turn, the continuous phase 312 flows towards the output channel 361 as the droplet chamber 350 fills with droplets 314 (flow 3121) (FIG. 45A). After loading of the droplet chamber 350 with the population of droplets 314, the continuous phase 312 can flow back from the output channel 361 to the inlet microchannel 345 and vice-versa (flow 3122) without contacting (or, at least, with minimal contact), and therefore without disrupting (or, at least, with minimal disruption), neither the population of droplets 314 nor the continuous phase 312 in the droplet chamber 350 (FIG. 45B).

FIG. 46A-B illustrate an alternative exemplary architecture and operation of a microfluidic chip comprising an inlet microchannel 345 operatively coupled a droplet generator 340 opening on a droplet chamber 350. In this alternative architecture, the output channel 361 composed, from proximal to distal, of a capillary trap 3611 and an outlet 3612, is operatively coupled to the droplet chamber 350, preferably near the droplet generator 340 junction with the droplet chamber 350. In some embodiments, the outlet 3612 is a dead-end, such as, e.g., an air tank 360. In this alternative embodiment, a sample is injected through the inlet microchannel 345 (flow 3142). A population of droplets 314 is generated when the sample passes through the droplet generator 340, ultimately stored in the droplet chamber 350 (flow 3141). As previously described, the flow 3141 of generated droplets 314 does not enter the output channel 361 because of the capillary trap 3611 which is smaller in height than the diameter of a droplet 314. In turn, the continuous phase 312 flows towards the output channel 361 as the droplet chamber 350 fills with droplets 314 (flow 3121) (FIG. 46A). After loading of the droplet chamber 350 with the population of droplets 314, the continuous phase 312 can flow back from the output channel 361 to the inlet microchannel 345 and vice-versa (flow 3122) without contacting (or, at least, with minimal contact), and therefore without disrupting (or, at least, with minimal disruption), neither the population of droplets 314 nor the continuous phase 312 in the droplet chamber 350 (FIG. 46B).

Figure 47:
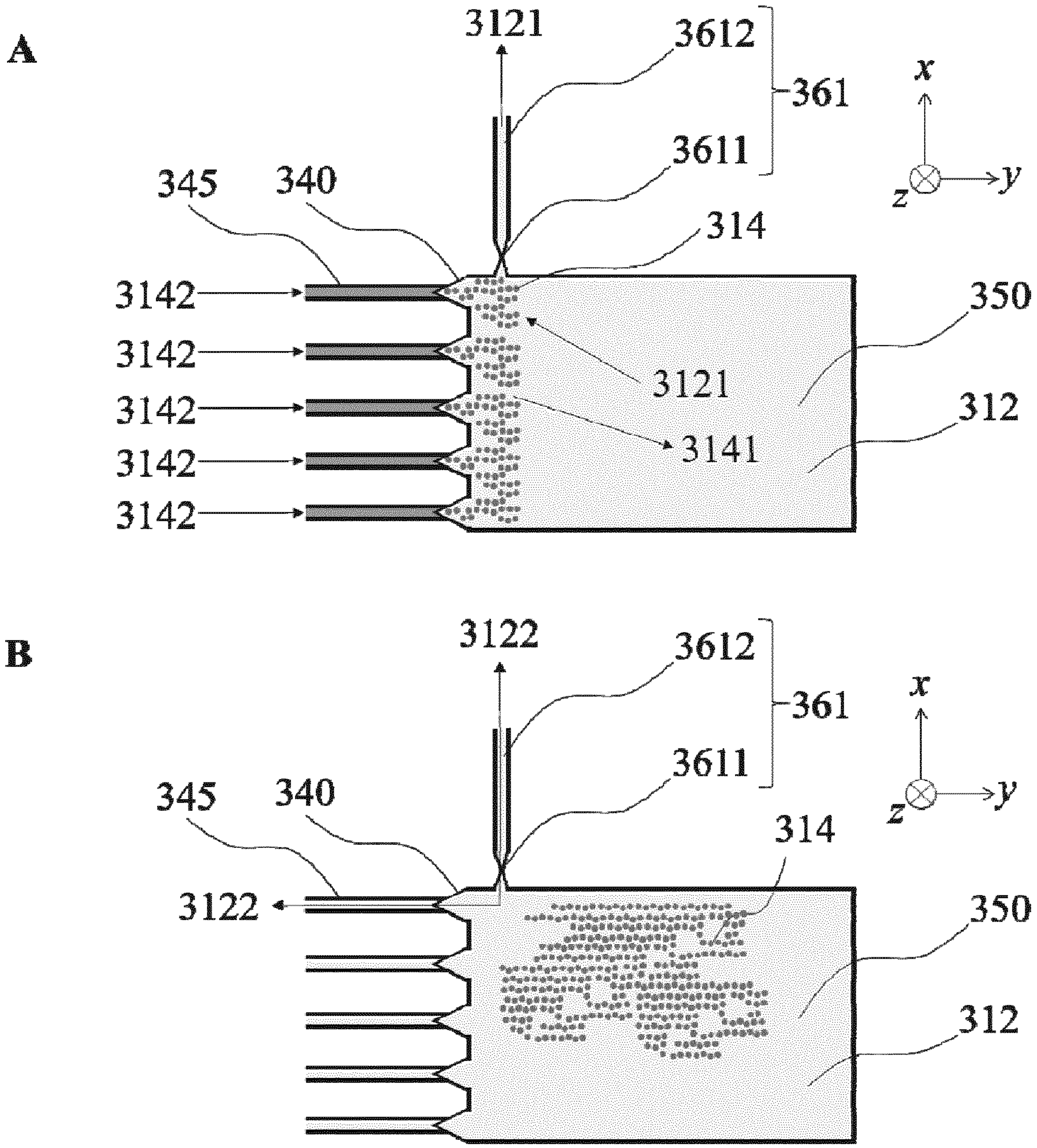
FIGS. 47A and 47B is a schematic representation of an exemplary microfluidic chip design comprising a droplet chamber operatively coupled to multiple inlet microchannels through droplet generators, and an output channel, through a capillary trap. A: operation of the exemplary microfluidic chip design during droplet loading. B: operation of the exemplary microfluidic chip design after droplet loading completion.

FIG. 47 illustrate an alternative exemplary architecture and operation of a microfluidic chip comprising several inlet microchannels 345 operatively coupled droplet generators 340 opening together on a single droplet chamber 350. In this alternative architecture, the output channel 361 composed, from proximal to distal, of a capillary trap 3611 and an outlet 3612, is operatively coupled to the droplet chamber 350, preferably near the droplet generator 340 junction with the droplet chamber 350. In some embodiments, the outlet 3612 is a dead-end, such as, e.g., an air tank 360. In this alternative embodiment, a sample is injected through the inlet microchannels 345 (flow 3142). A population of droplets 314 is generated when the sample passes through the droplet generators 340, ultimately stored in the droplet chamber 350 (flow 3141). As previously described, the flow 3141 of generated droplets 314 does not enter the output channel 361 because of the capillary trap 3611 which is smaller in height than the diameter of a droplet 314. In turn, the continuous phase 312 flows towards the output channel 361 as the droplet chamber 350 fills with droplets 314 (flow 3121) (FIG. 47A). After loading of the droplet chamber 350 with the population of droplets 314, the continuous phase 312 can flow back from the output channel 361 to the nearest inlet microchannel 345 and vice-versa (flow 3122) without contacting (or, at least, with minimal contact), and therefore without disrupting (or, at least, with minimal disruption), neither the population of droplets 314 nor the continuous phase 312 in the droplet chamber 350 (FIG. 47B).

Figure 48:
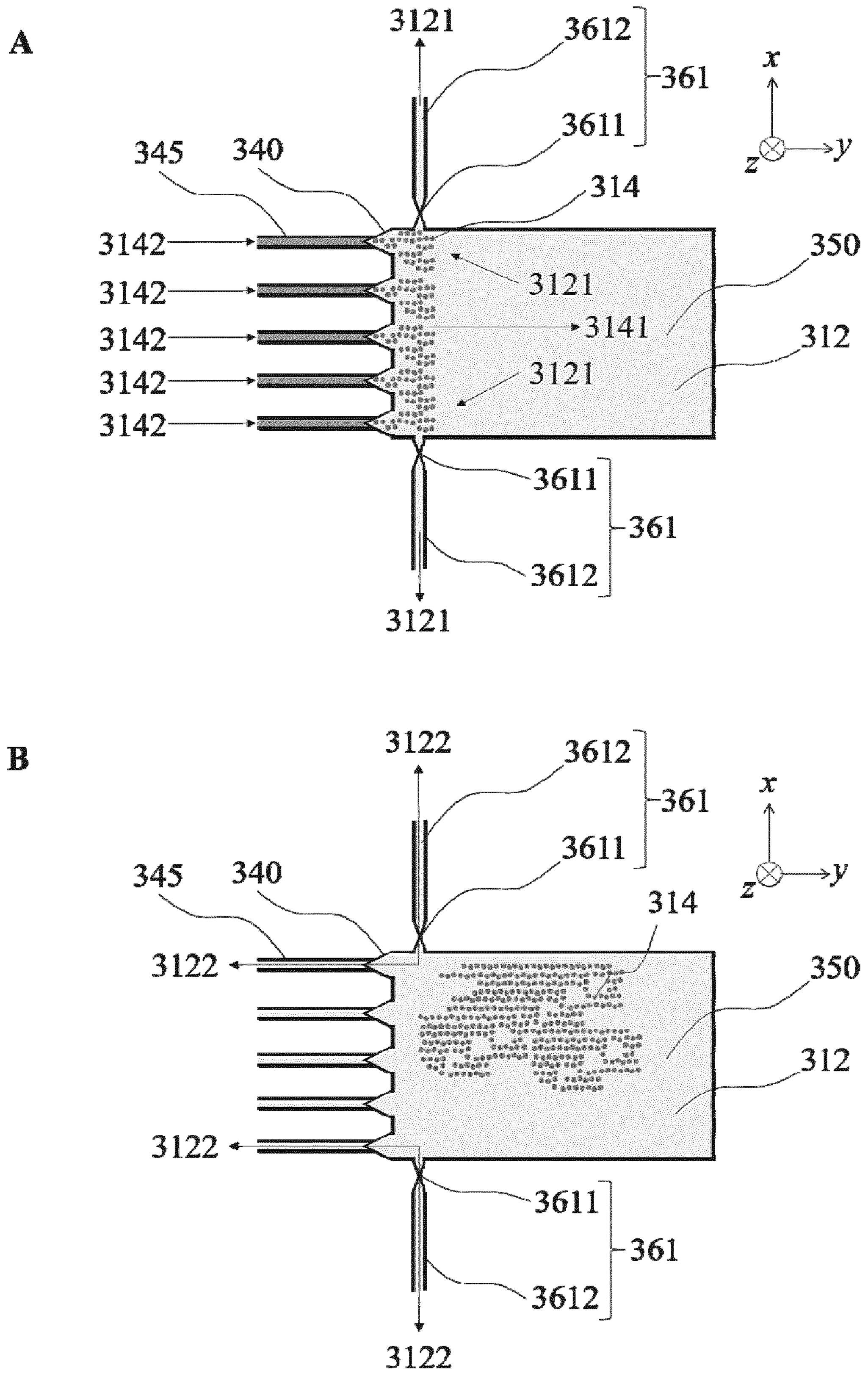
FIGS. 48A and 48B is a schematic representation of an exemplary microfluidic chip design comprising a droplet chamber operatively coupled to multiple inlet microchannels through droplet generators, and multiple output channels, through capillary traps. A: operation of the exemplary microfluidic chip design during droplet loading. B: operation of the exemplary microfluidic chip design after droplet loading completion.

FIG. 48 illustrate an alternative exemplary architecture and operation of a microfluidic chip comprising several inlet microchannels 345 operatively coupled droplet generators 340 opening together on a single droplet chamber 350. In this alternative architecture, two output channels 361 each composed, from proximal to distal, of a capillary trap 3611 and an outlet 3612, are operatively coupled to the droplet chamber 350, preferably near the droplet generator 340 junction with the droplet chamber 350. In some embodiments, one or both of the outlets 3612 are dead-ends, such as, e.g., air tanks 360. In this alternative embodiment, a sample is injected through the inlet microchannels 345 (flow 3142). A population of droplets 314 is generated when the sample passes through the droplet generators 340, ultimately stored in the droplet chamber 350 (flow 3141). As previously described, the flow 3141 of generated droplets 314 does not enter any of the output channels 361 because of the capillary traps 3611 which are smaller in height than the diameter of a droplet 314. In turn, the continuous phase 312 flows towards both output channels 361 as the droplet chamber 350 fills with droplets 314 (flow 3121) (FIG. 48A). After loading of the droplet chamber 350 with the population of droplets 314, the continuous phase 312 can flow back from both output channels 361 to the nearest inlet microchannels 345 and vice-versa (flow 3122) without contacting (or, at least, with minimal contact), and therefore without disrupting (or, at least, with minimal disruption), neither the population of droplets 314 nor the continuous phase 312 in the droplet chamber 350 (FIG. 48B).

FIGS. 49-52 show an exemplary design of a microfluidic unit 301 suitable for or configured to allow to (1) flow a continuous phase from an inlet microchannel to an output channel while keeping a population of droplets in said continuous phase at rest and (2) homogenize a locally static continuous phase and its concentration in surfactant and/or other components throughout droplet loading or generation in said locally static continuous phase.

Figure 49:
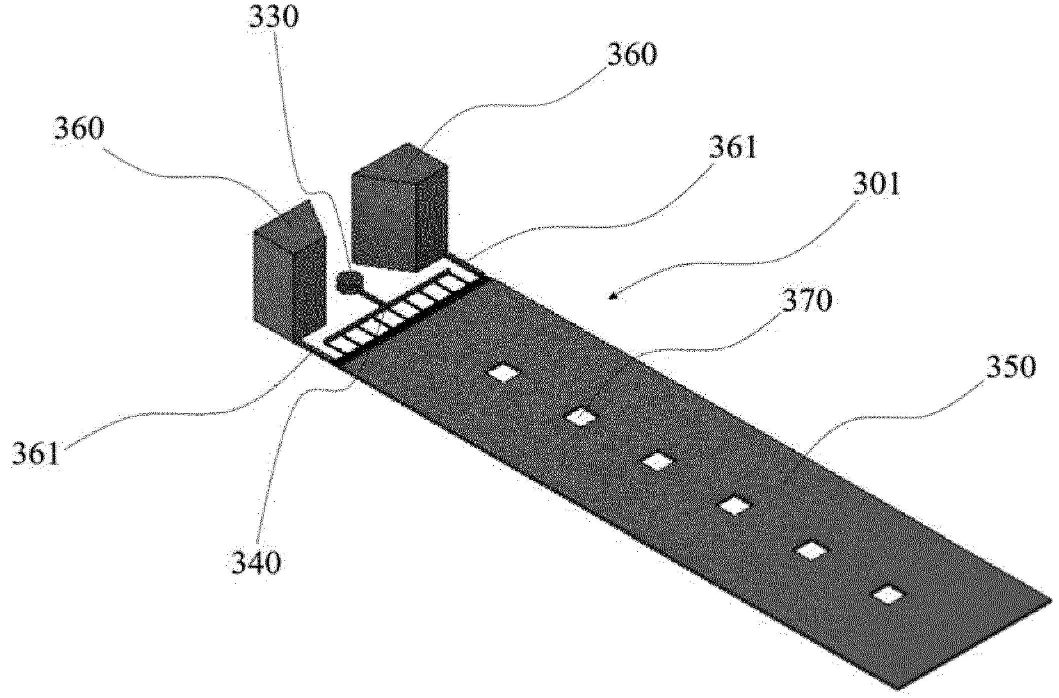
FIG. 49 is a perspective view of an exemplary microfluidic chip design comprising a droplet chamber operatively coupled to a droplet generator comprising multiple injectors, and two air tanks through an output channel comprising a capillary trap.

FIG. 49 is a perspective view of such a microfluidic unit 301 design comprising an inlet port 330, operatively coupled to a droplet generator 340 opening on a droplet chamber 350. This exemplary chip comprises two air tanks operatively coupled to the droplet generator 340 through output channels 361.

Figure 50:
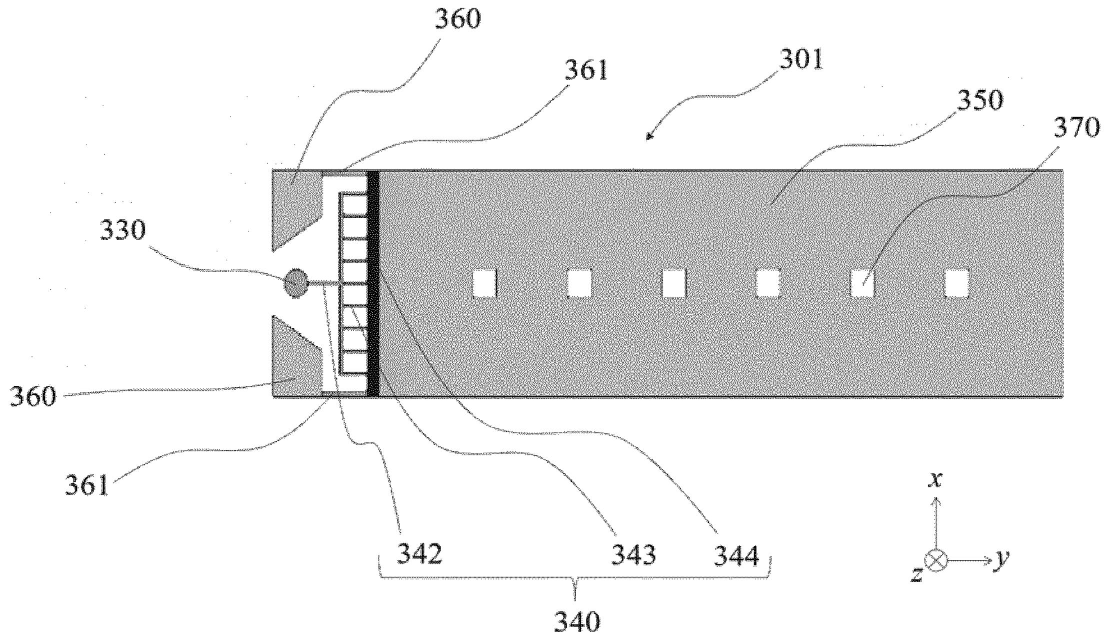
FIG. 50 is a plane bottom view of the exemplary microfluidic chip design of FIG. 49.
Figure 51:
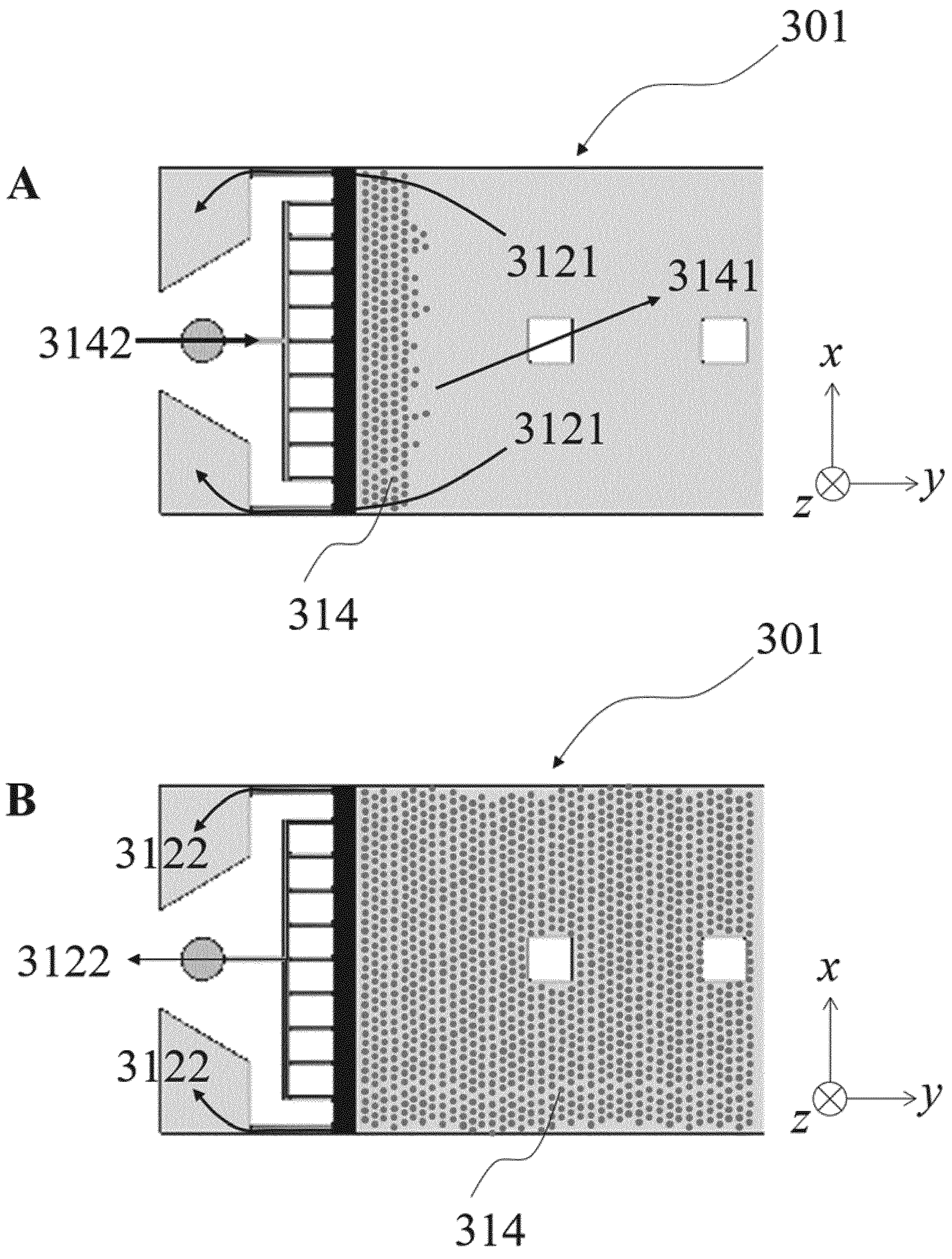
FIGS. 51A and B is a schematic representation of the exemplary microfluidic chip of FIGS. 49-50 in operation. A: operation during droplet loading. B: operation after droplet loading completion.
Figure 52A:
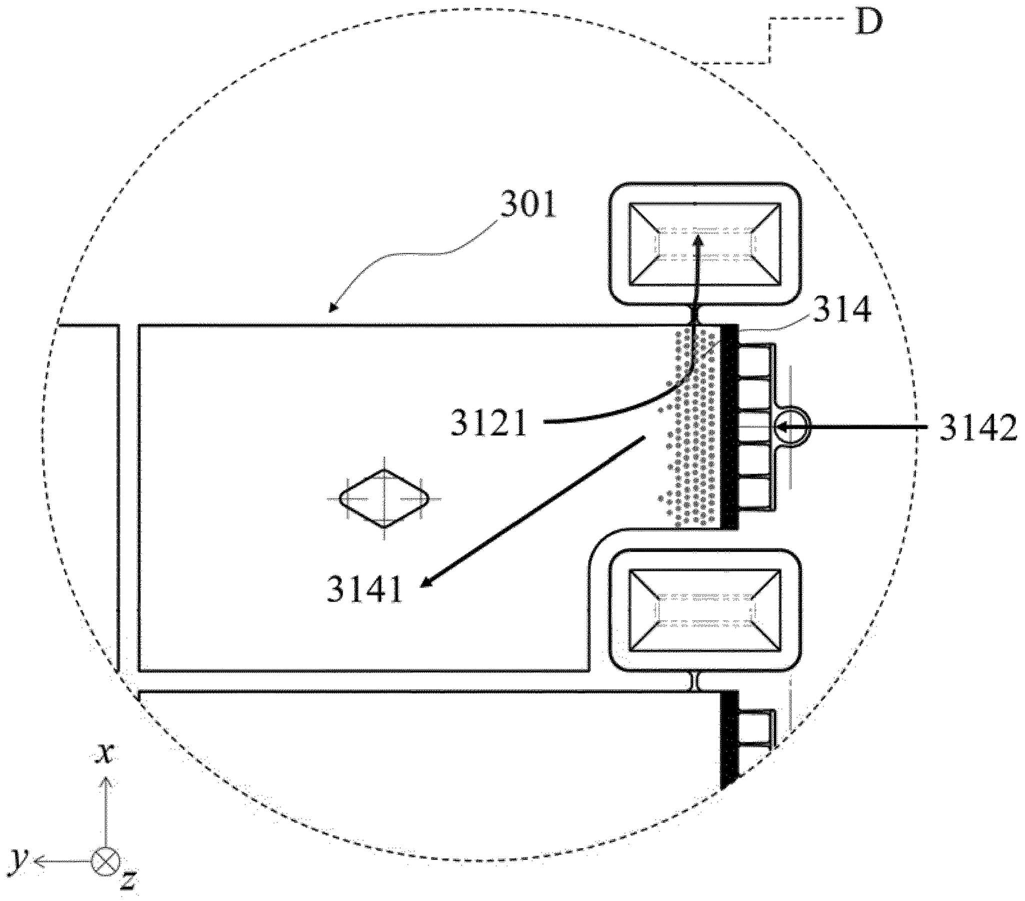
Figure 52B:
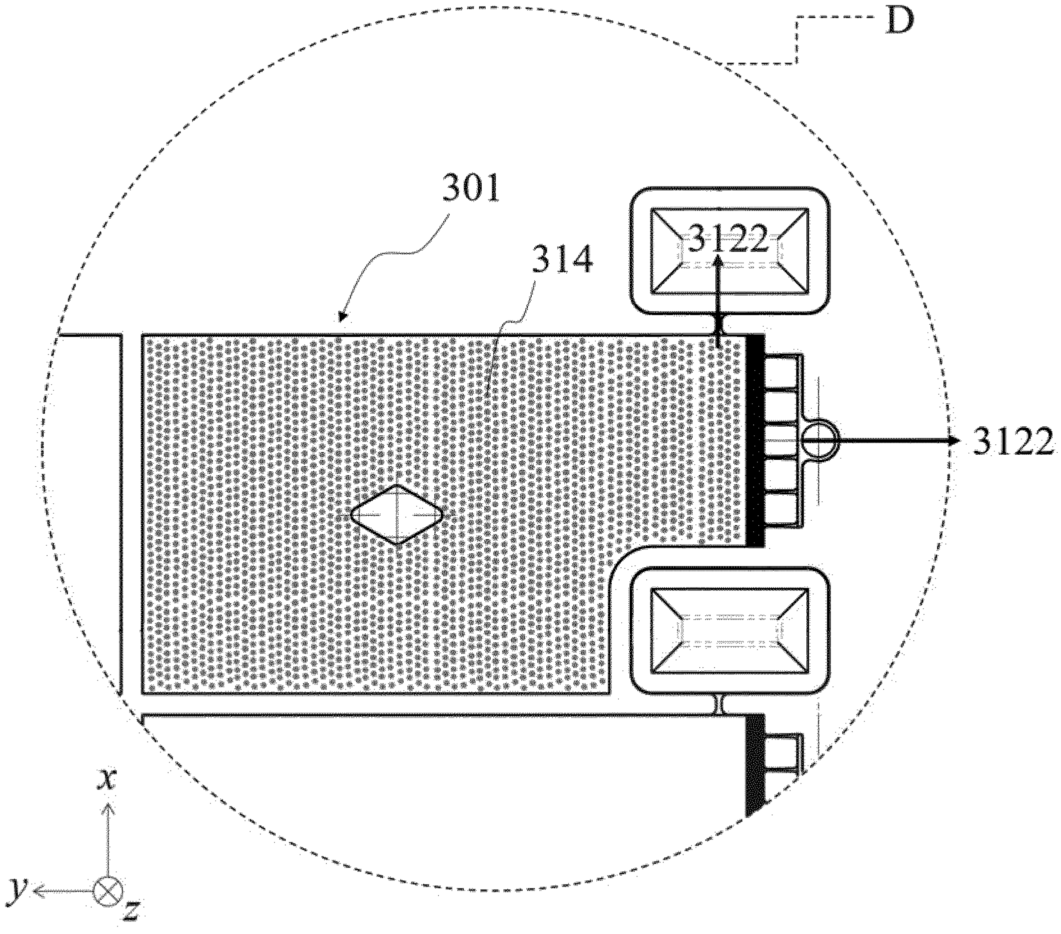

FIG. 50 is a plane view of the microfluidic unit 301 design shown in FIG. 19. It is seen from FIG. 50 that the droplet generator 340 comprises 10 injectors 343 and a single slopped area 344 taking up the width necessary to operatively couple all the injectors 343. It is also noticeable that the output channels 361 operatively couple the air tanks 360 with the slopped area 344.

FIGS. 51A-B illustrate an exemplary operation of the microfluidic unit 301 of FIGS. 49-50.

A sample deposited in the inlet port 330 is injected through the inlet microchannel 345 (flow 3142). A population of droplets 314 is generated when the sample passes through the droplet generators 340, ultimately stored in the droplet chamber 350. As previously described, the flow 3141 of generated droplets 314 does not enter any of the output channels 361 because of the capillary traps 3611 which are smaller in height than the diameter of a droplet 314. In turn, the continuous phase 312 flows towards both output channels 361 as the droplet chamber 350 fills with droplets 314 (flow 3121), as seen on FIG. 51A.

After loading of the droplet chamber 350 with the population of droplets 314, the continuous phase 312 can flow back from both output channels 361 to the inlet microchannels 345 (flow 3122) without contacting (or, at least, with minimal contact), and therefore without disrupting (or, at least, with minimal disruption), neither the population of droplets 314 nor the continuous phase 312 in the droplet chamber 350, as seen on FIG. 51B.

REFERENCES

| | |
|---|---|
| 100 | System including 200 and 300 |
| 200 | Instrument |
| 210 | Receiving area |
| 220 | Lid |
| 230 | Tray |
| 240 | User interface |
| 300 | Microfluidic chip |
| 301 | Microfluidic unit |
| 310 | Upper slab |
| 311 | Lower slab |
| 312 | Continuous phase |
| 3121 | Flow of 312 from 350 towards 361 |
| 3122 | Flow of 312 from 361 towards 345 and/or from 345 towards 361 |
| 313 | Drop of sample |
| 314 | Droplet |
| 3141 | Flow of 314 from 345 towards 350 |
| 320 | Loading well |
| 321 | Wall |
| 3211 | Lateral wall part |
| 32111 | First straight section |
| 32112 | First curved section |
| 32113 | Second straight section |
| 32114 | Second curved section |
| 32115 | Third straight section |
| 32116 | Third curved section |
| 32117 | Fourth straight section |
| 32118 | Fourth curved section |
| 32119 | Fifth straight section |
| 3212 | Bottom wall part |
| 32121 | Sloped bottom |
| 323 | Inlet flat |
| 324 | Open cavity |
| 325 | Loading opening |
| wbp | Well bottom plan |
| wld | Well lateral direction |
| cp | Converging point |
| MA | Major axis |
| d | Depth of 320 |
| α | Angle between wbp and wld |
| β | Average sloping angle in the $x_2$-axis from wbp to 32121 |
| γ | Average sloping angle in the $x_1$-axis from wbp to 32121 |
| δ | Average sloping angle in the y-axis from wbp to 32121 |
| ε | Angle between 32113 on each side of MA |
| λ | Angle between 32117 on each side of MA |
| 330 | Inlet port |
| 340 | Droplet generator |
| 341 | Landing pad |
| 3411 | Outer edge of 341 |
| 3412 | Inner edge of 341 |
| 342 | Distribution channel |
| 343 | Injector |
| 344 | Sloped area |
| 345 | Inlet microchannel |
| 350 | Droplet chamber |
| 360 | Air tank |
| 361 | Output channel |
| 3611 | Capillary trap |
| 3612 | Outlet |
| 362 | Base |
| 3621 | Groove |
| 3622 | Inner edge of 3621 |
| 3623 | Outer edge of 3621 |
| 363 | Wall |
| 3631 | Lateral wall part |
| 3632 | Bottom wall part |
| 364 | Closed cavity |
| ttp | tank top plane |
| tld | tank lateral direction |
| κ | Angle between ttp and tld |
| 370 | Chamber pillar |
| 371 | Apexes of 370 |
| ldl | Long diagonal of 370 |
| sdl | Small diagonal of 370 |
| ζ | Acute angles of 370 |
| η | Obtuse angles of 370 |

The invention claimed is:

1. A well (320) for loading a sample into a microfluidic chip, the well comprising a loading opening (325) having an open cavity (324), wherein the well prior to loading of said sample is at least partially filled with an oil continuous phase (312), wherein the well is bounded by a wall (321) which comprises a bottom wall part (3212) globally extending according to a bottom plane (wbp) parallel to the base plane (x/y) and a lateral wall part (3211) extending along a well lateral direction (wld) disposed according to an angle $0° < \alpha < 180°$ relative to the bottom plane (wbp), wherein the loading opening (325) is defined by a free end of the lateral wall part (3211) opposite to the bottom plane (wbp), wherein the bottom wall part (3212) comprises at least one sloped bottom section (32121), which has a main slope with an average sloping angle δ from about 5° to about 15° from the bottom plane (wbp) at the level of the lateral wall part (3211) to a position of higher depth d of the sloped bottom section (32121), and wherein an inlet port (330) is accommodated in the bottom wall part (3212), located off-center in the bottom wall part (3212) and at the position of higher depth d of the sloped bottom section (32121).

2. The well (320) according to claim 1, wherein the angle α has a value ranging from about 80° to about 105° relative to the bottom plane (wbp).

3. The well (320) according to claim 1, wherein the oil continuous phase has a relative density greater than 1.01.

4. The well (320) according to claim 1, wherein the inlet port (330) is located at a distance $d_{inlet\text{-}wall}$ in the base plane (x/y) from a curved section of the lateral wall part (3211) ranging from about 0.5 mm to about 2.5 mm.

5. The well (320) according to claim 4, wherein the curved section of the lateral wall part (3211) has a curvature radius ranging from about 0.5 mm to about 2.5 mm.

6. A microfluidic chip (300) comprising the well (320) according to claim 1.

7. The microfluidic chip (300) according to claim 6, further comprising a microfluidic network which is partially or completely filled with the oil continuous phase (312).

8. A system for reducing the dead volume of a drop of sample (313) to be loaded in a microfluidic chip (300), the system comprising a Polymerase Chain Reaction (PCR) instrument and the microfluidic chip (300) according to claim 6.

9. The well (320) according to claim 1, wherein the oil continuous phase has a relative density greater than 1.05.

10. The well (320) according to claim 1, wherein the oil continuous phase has a relative density greater than 1.1.

11. The well (320) according to claim 1, wherein the oil continuous phase has a relative density greater than 1.5.

12. The well (320) according to claim 4, wherein the curved section of the lateral wall part (3211) has a curvature radius of about $d_{inlet\text{-}wall}$.

13. A method for generating a population of droplets of a sample, the method comprising in succession:

providing the microfluidic chip (300) according to claim 6, loading a sample into the well (320) of said microfluidic chip (300), and passing the sample through a droplet generator (340).

14. The well (320) according to claim 1, wherein the sample is an aqueous sample.

* * * * *